United States Patent
Shimoyama et al.

(10) Patent No.: US 10,507,803 B2
(45) Date of Patent: Dec. 17, 2019

(54) WIPER APPARATUS AND NOZZLE UNIT

(71) Applicants: Mitsuba Corporation, Gunma (JP); Honda Motor Co., Ltd., Tokyo (JP)

(72) Inventors: Masayuki Shimoyama, Gunma (JP); Masayuki Arima, Gunma (JP); Masaya Yonaga, Gunma (JP); Takeshi Sasaki, Saitama (JP); Tatsuya Ohmaru, Saitama (JP); Taisuke Goto, Saitama (JP)

(73) Assignees: Mitsuba Corporation, Kiryu-shi, Gunma (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/502,310

(22) PCT Filed: May 27, 2015

(86) PCT No.: PCT/JP2015/065201
§ 371 (c)(1),
(2) Date: Feb. 7, 2017

(87) PCT Pub. No.: WO2016/021284
PCT Pub. Date: Feb. 11, 2016

(65) Prior Publication Data
US 2017/0225661 A1    Aug. 10, 2017

(30) Foreign Application Priority Data

Aug. 8, 2014 (JP) .................. 2014-162458
Aug. 8, 2014 (JP) .................. 2014-162459
Aug. 8, 2014 (JP) .................. 2014-162460

(51) Int. Cl.
*B60S 1/52* (2006.01)
*B60S 1/34* (2006.01)
(Continued)

(52) U.S. Cl.
CPC ............. *B60S 1/522* (2013.01); *B60S 1/3415* (2013.01); *B60S 1/38* (2013.01); *B60S 1/40* (2013.01); *B60S 1/381* (2013.01); *B60S 1/3881* (2013.01)

(58) Field of Classification Search
CPC ........ B60S 1/3862; B60S 1/522; B60S 1/524; B60S 1/526; B60S 1/528; B60S 1/3415; B60S 1/38; B60S 1/40
(Continued)

(56) References Cited

U.S. PATENT DOCUMENTS 2,632,911 A * 3/1953 Deibel .................... B60S 1/522
                                                    15/250.04
2,763,023 A * 9/1956 Horton ..................... B60S 1/48
                                                    15/250.04
(Continued)

FOREIGN PATENT DOCUMENTS

CN    201592699 U    9/2010
DE    3639537 A1    6/1988
(Continued)

OTHER PUBLICATIONS

International Search Report for PCT Serial No. PCT/JP2015/065201 dated Jun. 16, 2015.
(Continued)

*Primary Examiner* — Gary K. Graham
(74) *Attorney, Agent, or Firm* — McCormick, Paulding & Huber LLP

(57) ABSTRACT

A nozzle unit 34 which jets washer fluid toward a windshield is fixed to an arm piece 33 whose front end side is fitted to a hook fixing member 23e. As a result, the nozzle unit 34 can be fixed without using the fitting member adopted in the conventional case, and located closer to the hook fixing member 23e. This reduces a positional shift of the nozzle (Continued)

unit 34 relative to the wiper blade 20 to the minimum, thus stabilizing the injection-target locations of washer fluid on the windshield.

5 Claims, 33 Drawing Sheets

(51) Int. Cl.
  *B60S 1/38* (2006.01)
  *B60S 1/40* (2006.01)
(58) Field of Classification Search
  USPC .......................................... 15/250.04, 250.32
  See application file for complete search history.

(56) References Cited

U.S. PATENT DOCUMENTS

| | | | |
|---|---|---|---|
| 2,866,996 A * | 1/1959 | Krusche | B60S 1/48 15/250.04 |
| 3,428,992 A * | 2/1969 | Giorgio | B60S 1/522 15/250.04 |
| 3,827,101 A * | 8/1974 | Wubbe | B60S 1/522 15/250.04 |
| 3,913,167 A * | 10/1975 | Frigon | B60S 1/522 15/250.04 |
| 5,383,602 A | 1/1995 | Edele et al. | |
| 5,433,382 A | 7/1995 | Baumgarten et al. | |
| 9,260,085 B2 * | 2/2016 | Bex | B60S 1/524 |
| 9,809,199 B2 * | 11/2017 | Burkard | B60S 1/3415 |
| 9,862,358 B2 * | 1/2018 | Kruse | B60S 1/522 |
| 2008/0127441 A1 | 6/2008 | Inoue | |
| 2013/0269140 A1 | 10/2013 | Egner-Walter et al. | |

FOREIGN PATENT DOCUMENTS

| | | |
|---|---|---|
| DE | 102004007351 A1 | 9/2005 |
| DE | 102012224474 A1 | 7/2014 |
| GB | 2 356 130 A | 5/2001 |
| JP | S51-121933 U1 | 3/1975 |
| JP | H05-508597 A | 12/1993 |
| JP | S57-67860 U1 | 7/1995 |
| JP | 2002-302019 A | 10/2002 |
| JP | 2002-308064 A | 10/2002 |
| JP | 2007-276669 A | 10/2007 |
| JP | 2008-137459 A | 6/2008 |
| JP | 2010-30373 A | 2/2010 |
| WO | 2012/089599 A1 | 7/2012 |
| WO | WO 2014/102061 * | 7/2014 |

OTHER PUBLICATIONS

Supplemental European Search Report for Serial No. EP 15 82 9247 dated Feb. 8, 2018.

* cited by examiner

FIG. 8
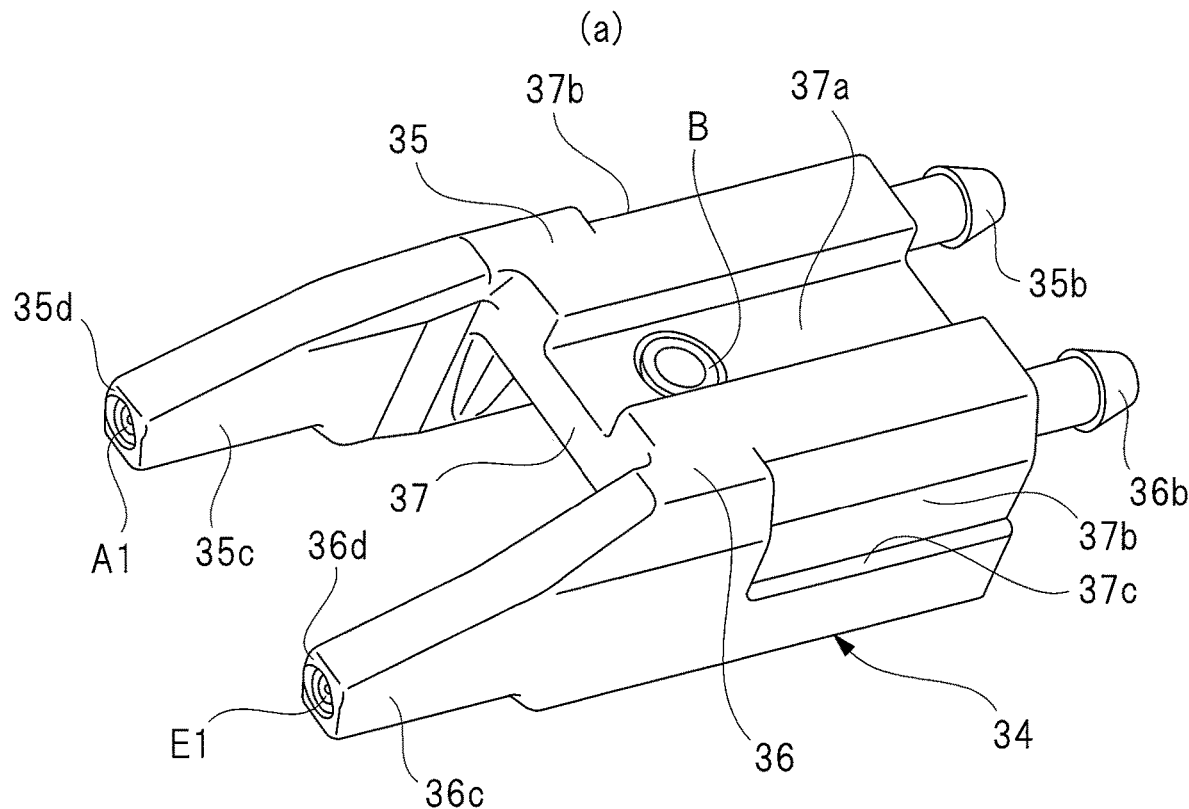
(a)
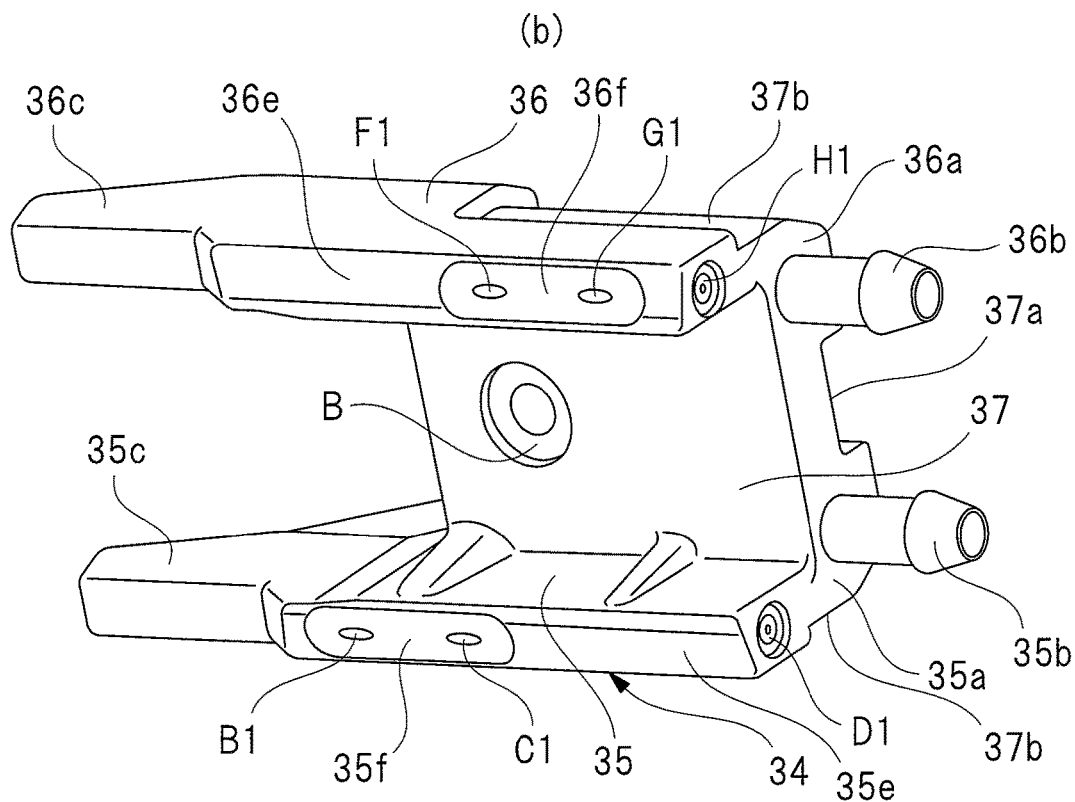
(b)

[Forward-side Wiping-out Operation]

[Backward-side Wiping-out Operation]

[Injection Position of Washer Liquid "W"]

FIG. 17
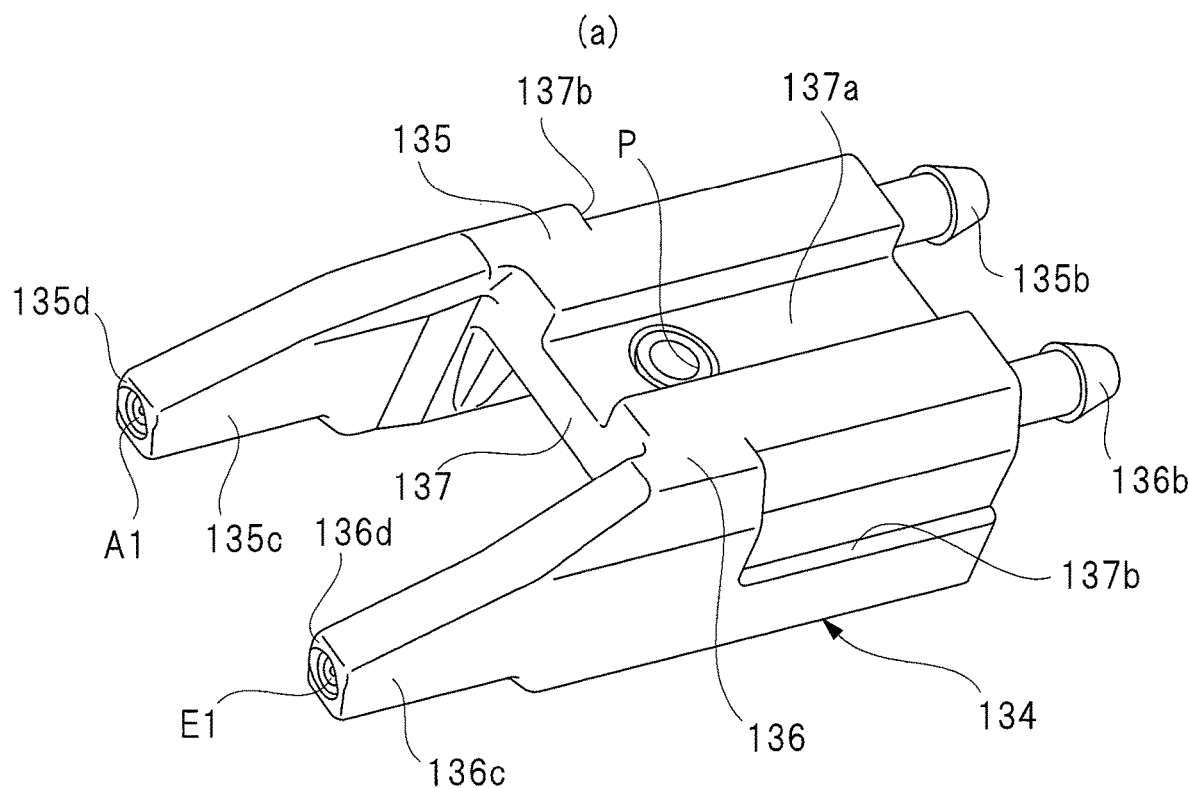
(a)
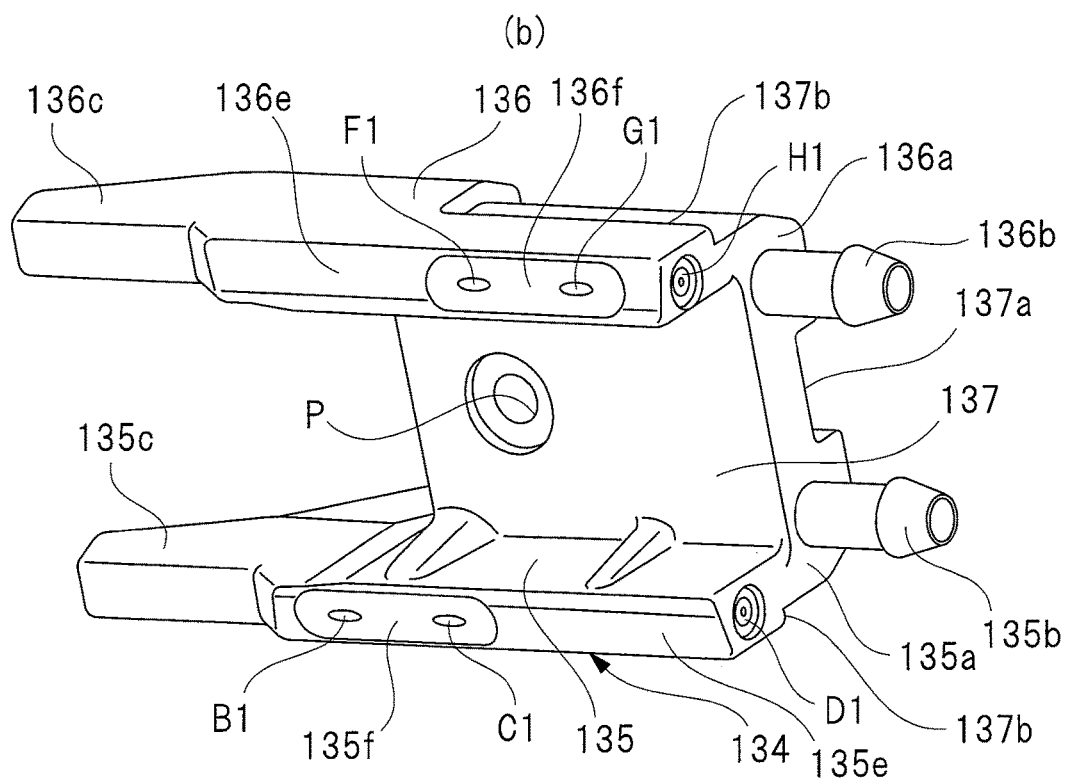
(b)

FIG. 18
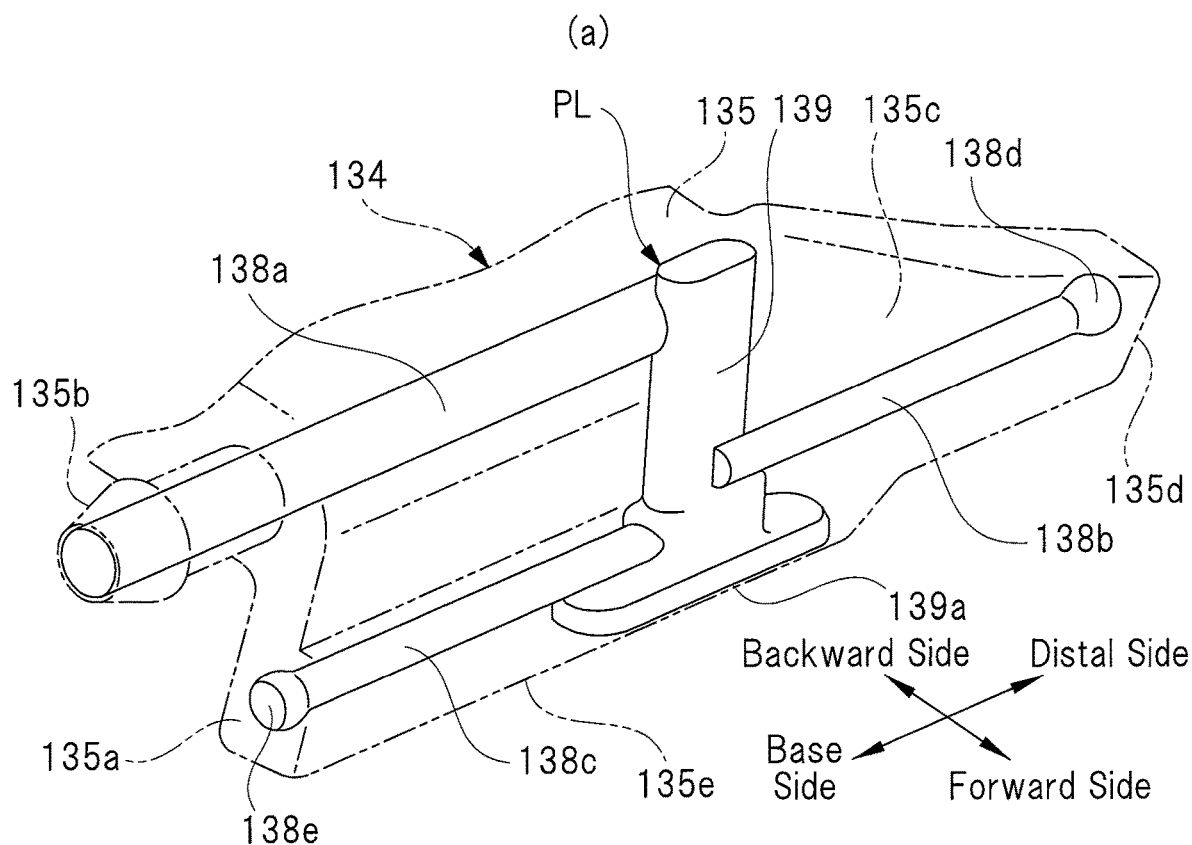
(a)
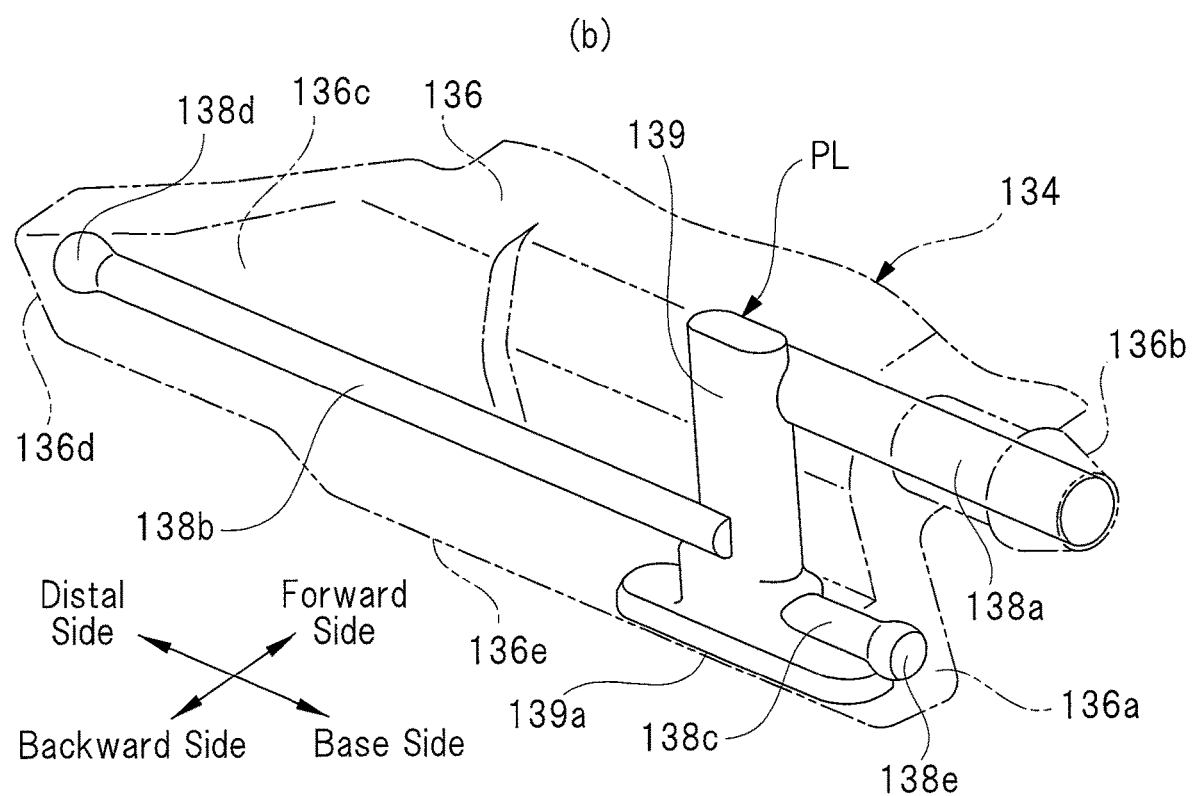
(b)

[Injection Position of Washer Liquid "W"]

FIG. 30
(a)
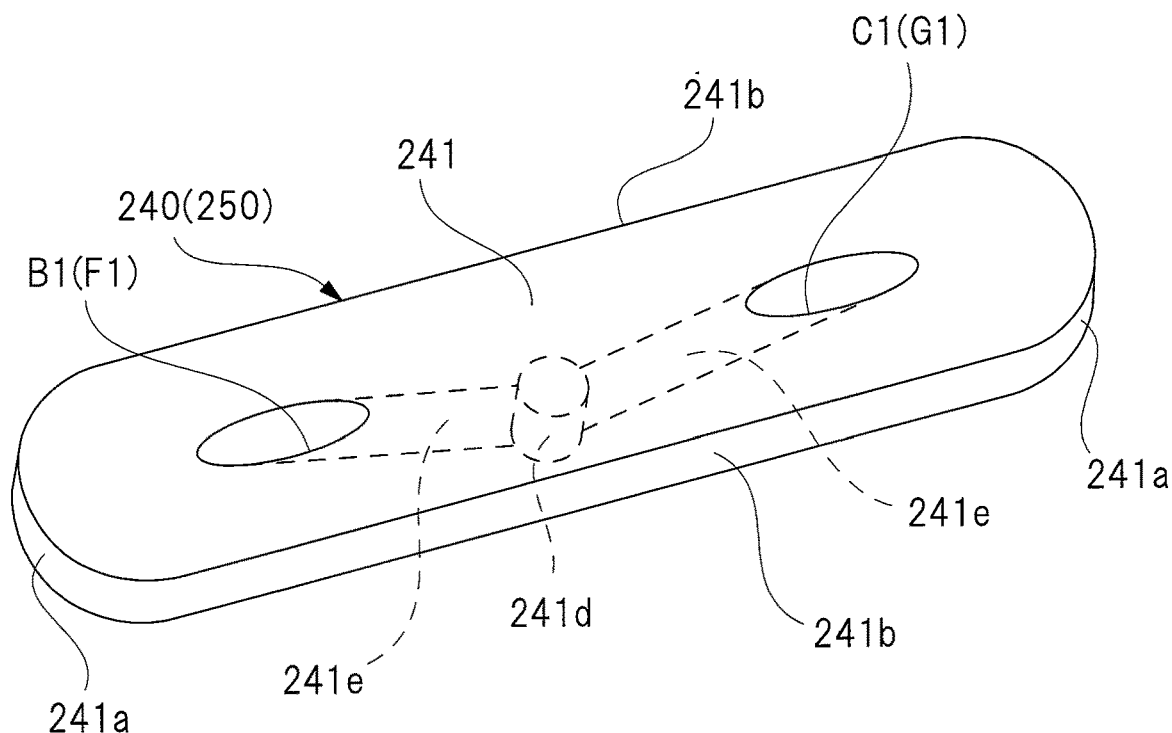
(b)
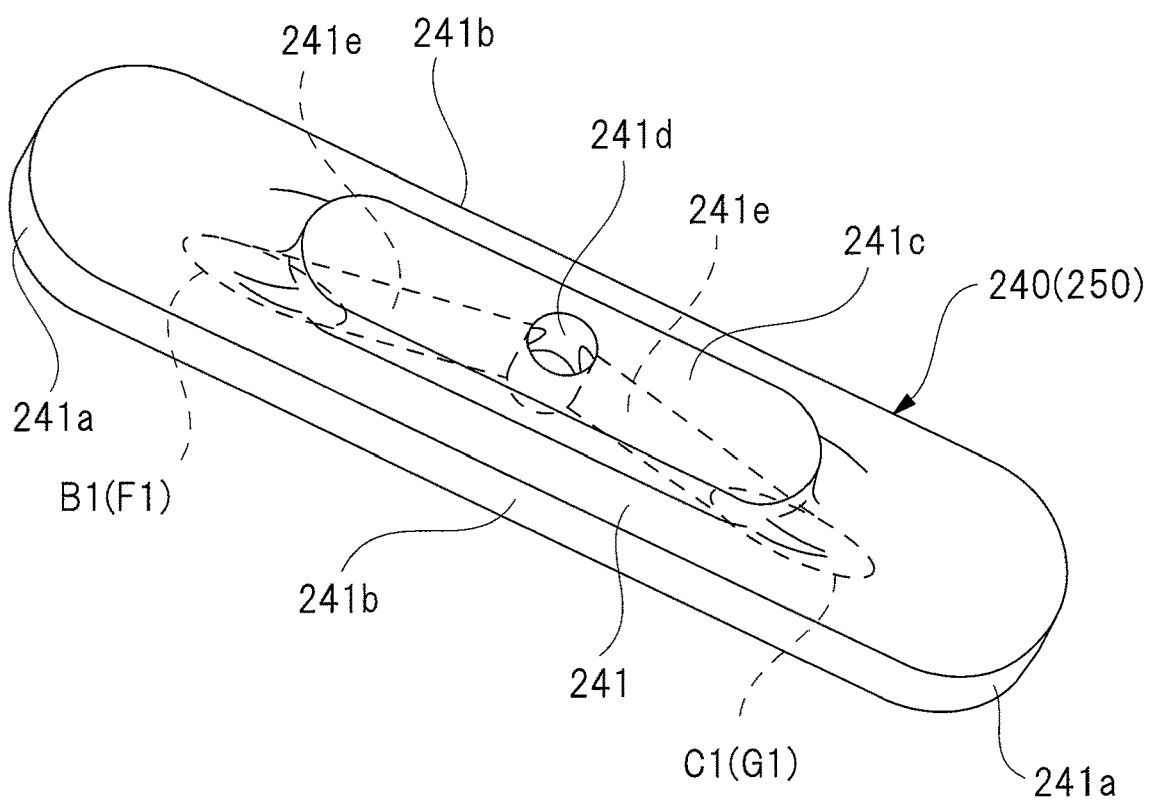

FIG. 31
(a)
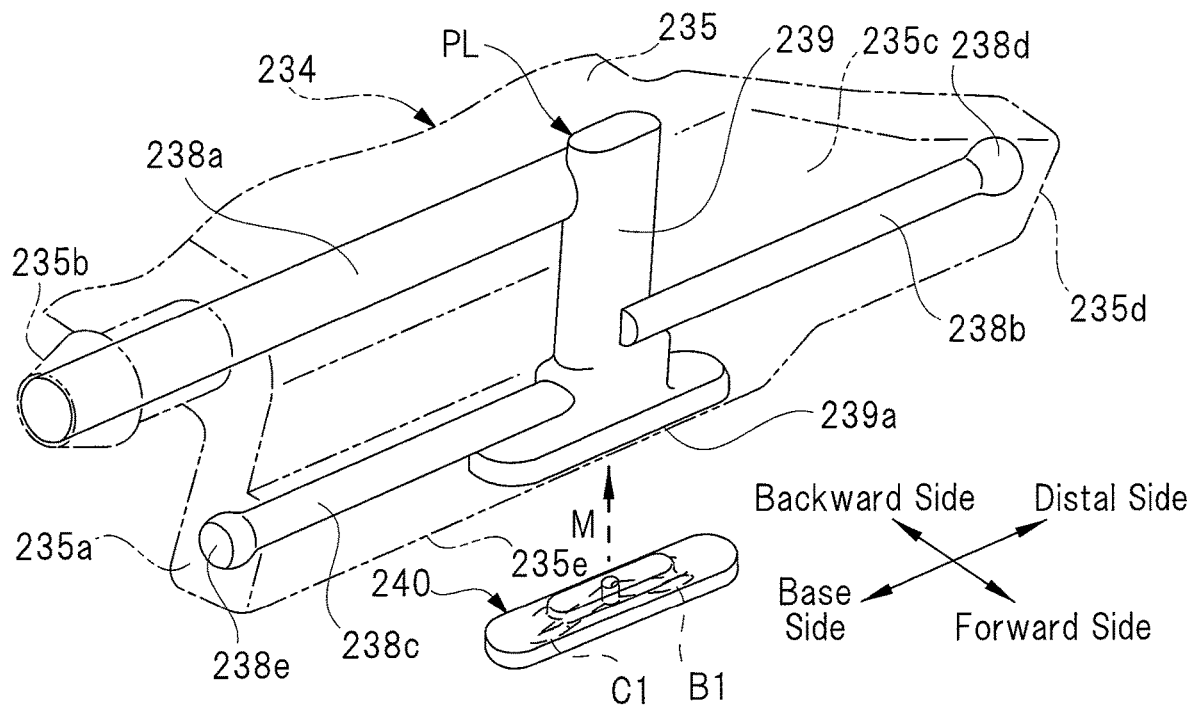
(b)
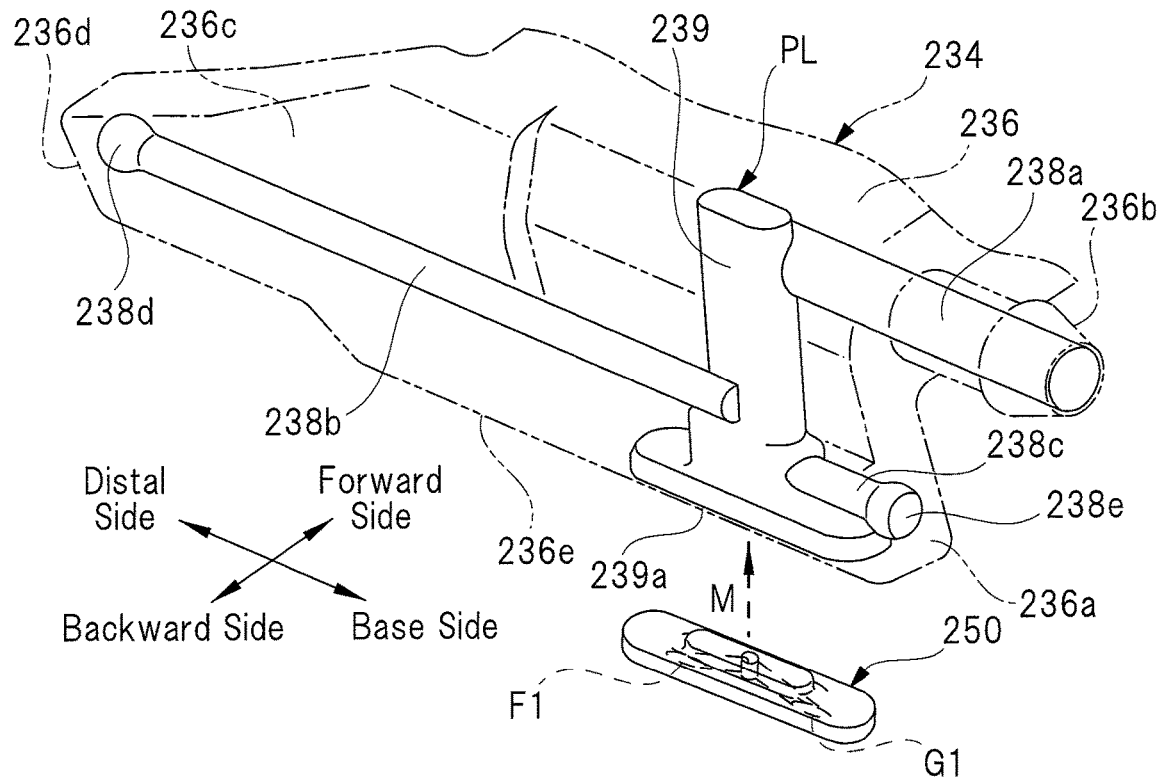

[Injection Position of Washer Liquid "W"]

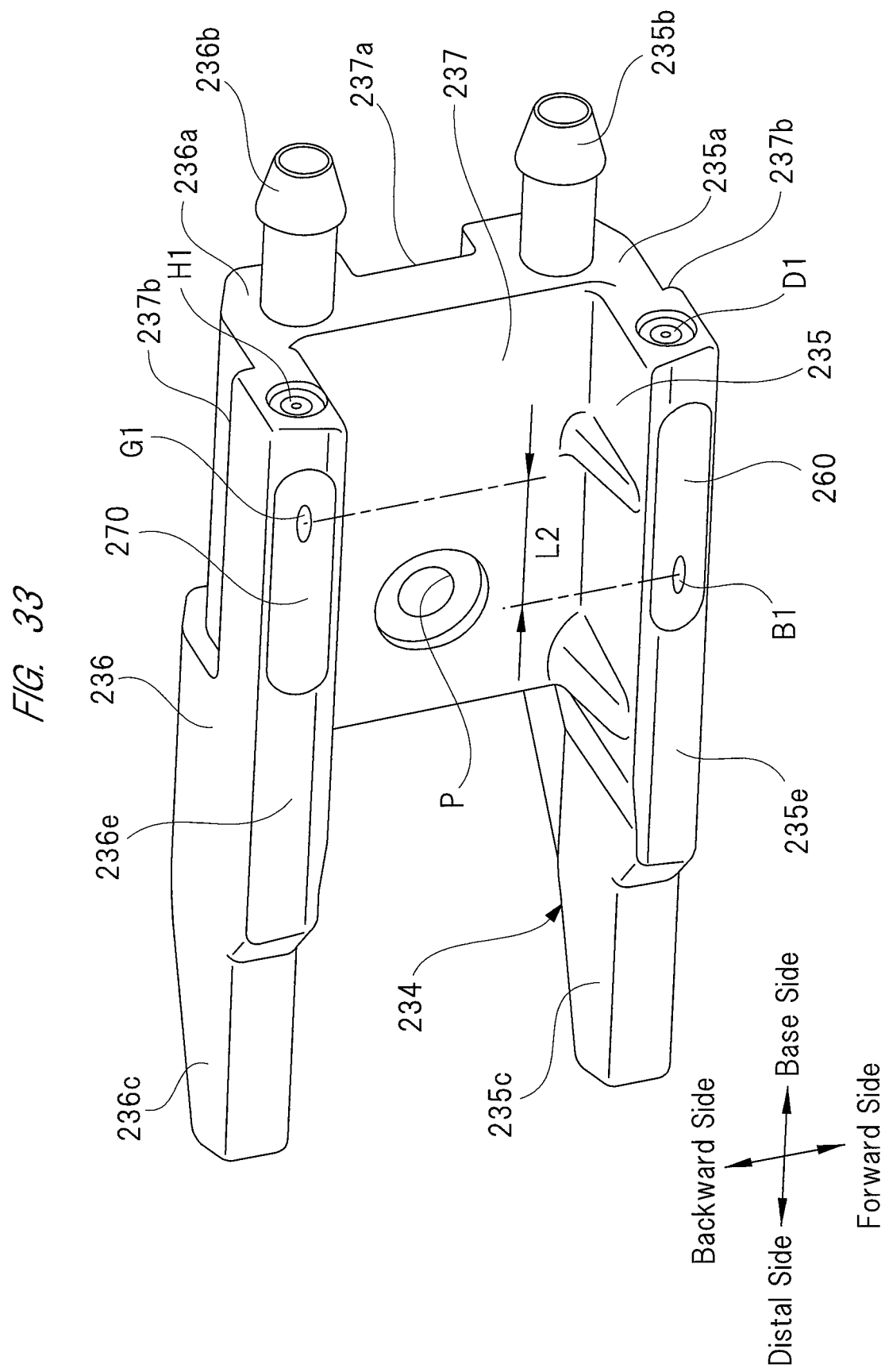

WIPER APPARATUS AND NOZZLE UNIT

CROSS-REFERENCE TO RELATED APPLICATIONS

This application is a National Stage application of International Patent Application No. PCT/JP2015/065201, filed on May 27, 2015, which claims priority to Japanese Patent Application Numbers 2014-162458, filed on Aug. 8, 2014, 2014-162459, filed on Aug. 8, 2014 and 2014-162460, filed on Aug. 8, 2014, each of which is hereby incorporated by reference in its entirety.

TECHNICAL FIELD

The present invention relates to a wiper apparatus which wipes a surface such as windshield of a vehicle, and relates to a nozzle unit having a nozzle which jets washer fluid toward the surface.

BACKGROUND ART

A vehicle such as automotive vehicle is equipped with a wiper apparatus for ensuring a field of view from a driver and the like through a windshield. The wiper apparatus includes a wiper arm which is swung by an electric motor, and a wiper blade attached to the wiper arm. The wiper blade has a connecting portion to which the front end side of the wiper arm is fitted, and a blade rubber disposed in contact with the surface. By switching on a wiper switch provided in the vehicle interior, the wiper arm is driven, thereby reciprocating the blade rubber on the surface so as to wipe off rainwater, etc. from the surface.

When foreign substance such as dust is on the surface, the wiper blade is reciprocated with washer fluid jetted onto the surface. Through this process, foreign substance such as dust on the surface is wetted and wiped out completely without scratching the surface. Usually, washer fluid is jetted from a nozzle disposed on the hood, etc., of the vehicle onto the surface. This case, however, encounters such a problem that washer fluid jetted to a injection-target location in front of the driver blocks the driver's field of view, the long distance between the nozzle and the surface exposes a jet of washer fluid to aerodynamic drag caused by the running vehicle, resulting in a significant shift in the injection-target location of washer fluid, and use of a relatively large amount of washer fluid requires frequent refilling of a tank with washer fluid.

In order to solve the above problems, for example, a vehicle wiper (wiper apparatus) has been developed and disclosed in Japanese Patent Application Laid-Open Publication No.: JP2008-137459. The vehicle wiper described in Japanese Patent Application Laid-Open Publication No.: JP2008-137459 includes three washer nozzles (nozzles) fitted to a wipe arm. One of the three washer nozzles is fitted to the central portion of the wiper arm in the longitudinal direction, while the other two are fitted to the front end side of the wiper arm in the longitudinal direction via a detachable fitting member. This arrangement allows washer fluid to reach and wet the vicinity of a wiper blade.

SUMMARY

According to the wiper apparatus described in Japanese Patent Application Laid-Open Publication No.: JP2008-137459, one nozzle is fitted to a central portion of the wiper arm in the longitudinal direction, while two nozzles are fitted to the wiper arm via the fitting member. This wiper apparatus encounters a problem that positions of the nozzles relative to the wiper blade tend to be shifted when the wiper apparatus is in operation. In other words, the wiper apparatus encounters a problem that the injection-target location of washer fluid tends to become unstable.

Specifically, since the nozzle on the central portion of the wiper arm in the longitudinal direction is distant from a connecting portion connecting the wiper blade to the wiper arm, the position of this nozzle tends to be shifted due to a variation in shape of the wiper arm and rattling of the connecting portion. The nozzles fitted to the wiper arm via the fitting member, on the other hand, are affected by rattling of not only the connecting portion but also the fitting member against the wiper arm. As a result, the positions of these nozzles tend to be shifted.

An object of the present invention is to provide a wiper apparatus which further stabilizes the injection-target location of washer fluid.

Another object of the present invention is to provide a nozzle unit which enables a reduction in manufacturing costs, and which is readily applicable to another specification.

According to one aspect of the present invention, there is provided a wiper apparatus comprising: a wiper blade for wiping a windshield; a connecting portion disposed on the wiper blade; an arm piece having a front end side fitted to the connecting portion; a retainer fixed to a base end side of the arm piece; and a nozzle unit fixed to the arm piece, the nozzle unit jetting washer fluid toward the windshield.

According to another aspect of the present invention, the arm piece and the nozzle unit are partially covered with the retainer.

According to another aspect of the present invention, the nozzle unit includes a forward-side nozzle and a backward-side nozzle, and an injection-target location of washer fluid jetted from the forward-side nozzle and an injection-target location of washer fluid jetted from the backward-side nozzle are shifted to each other in a longitudinal direction of the wiper blade.

According to another aspect of the present invention, a concave portion in which the arm piece is fitted is formed between the forward-side nozzle and the backward-side nozzle of the nozzle unit.

According to another aspect of the present invention, a variable nozzle capable of varying an injection-target location of washer fluid is formed on a front end side of the nozzle unit and on a base end side of the nozzle unit in a longitudinal direction of the wiper blade.

According to another aspect of the present invention, there is provided a wiper apparatus comprising: a wiper blade for wiping a windshield; a connecting portion disposed on the wiper blade; a wiper arm having a front end side fitted to the connecting portion; and a nozzle unit fixed to the wiper arm, the nozzle unit jetting washer fluid toward the windshield, wherein the nozzle unit is provided with a plurality of nozzles, and at least one of the nozzles is located within a range of projection of the connecting portion in a wiping direction of the wiper blade.

According to another aspect of the present invention, the nozzle located within the range of projection of the connecting portion is a front-end-side nozzle which jets washer fluid toward a front end side of the wiper blade in the longitudinal direction.

According to another aspect of the present invention, the front-end-side nozzle is provided to a forward-side block of the nozzle unit.

According to another aspect of the present invention, the nozzle unit includes the forward-side block and the backward-side block, and at least one of the forward-side block and the backward-side block has a base-end-side nozzle which jets washer fluid toward a base end side of the wiper blade in a longitudinal direction.

According to another aspect of the present invention, a distance from the front-end-side nozzle to the windshield is different from a distance from the base-end-side nozzle to the windshield.

According to another aspect of the present invention, each of the forward-side block and the backward-side block includes: an inflow pipeline into which washer fluid flows; a front-end-side pipeline which sends washer fluid to the front-end-side nozzle; and a base-end-side pipeline which sends washer fluid to the base-end-side nozzle, the inflow pipeline, the front-end-side pipeline, and the base-end-side pipeline are connected to each other via a connection pipeline.

According to another aspect of the present invention, the front-end-side nozzle is located closer to the windshield than a most distant part of the connecting portion to the windshield, and the base-end-side nozzle is located closer to the windshield than a most distant part of the wiper blade to the windshield.

According to another aspect of the present invention, there is provided a nozzle unit having a nozzle which jets washer fluid toward a windshield, the nozzle unit comprising: an inflow pipeline into which washer fluid flows; a supply pipeline which supplies washer fluid to the nozzle; a connection pipeline extending in a direction intersecting with an extension direction of the inflow pipeline and the supply pipeline, the connection pipeline connecting the inflow pipeline to the supply pipeline; and a cover member blocking an opening of the connection pipeline, the cover member having another nozzle which jets washer fluid.

According to another aspect of the present invention, the nozzle unit is incorporated in a wiper apparatus comprising: a wiper blade for wiping the windshield; a connecting portion disposed on the wiper blade; and a wiper arm having a front end side fitted to the connecting portion.

According to another aspect of the present invention, two cover members are respectively arranged on a forward side and a backward side in a wiping direction of the wiper blade, and shifted from each other in a longitudinal direction of the wiper blade.

According to another aspect of the present invention, the cover member is provided with a plurality of nozzles.

The wiper apparatus according to the present invention further stabilizes the injection-target location of washer fluid.

The nozzle unit according to the present invention enables a reduction in manufacturing costs, and is readily applicable to another specification.

BRIEF DESCRIPTION OF THE DRAWINGS

FIG. 8A is a perspective view of a nozzle unit;

FIG. 8B is a perspective view of the nozzle unit;

FIG. 17A is a perspective view of a nozzle unit;

FIG. 17B is a perspective view of the nozzle unit;

FIG. 18A is a perspective view explaining the structure of a pipeline in the nozzle unit;

FIG. 18B is a perspective view explaining the structure of the pipelines in the nozzle unit;

FIG. 30A is a perspective view explaining a nozzle cap;

FIG. 30B is a perspective view explaining the nozzle cap;

FIG. 31A is a perspective view explaining a pipeline in the nozzle unit;

FIG. 31B is a perspective view explaining the pipelines in the nozzle unit;

FIG. 33 is a view of a nozzle unit according to a fifth embodiment, the view corresponding to FIG. 29.

DETAILED DESCRIPTION

Hereinafter, the first embodiment of the present invention will be described in detail with reference to drawings.

Figure 1:
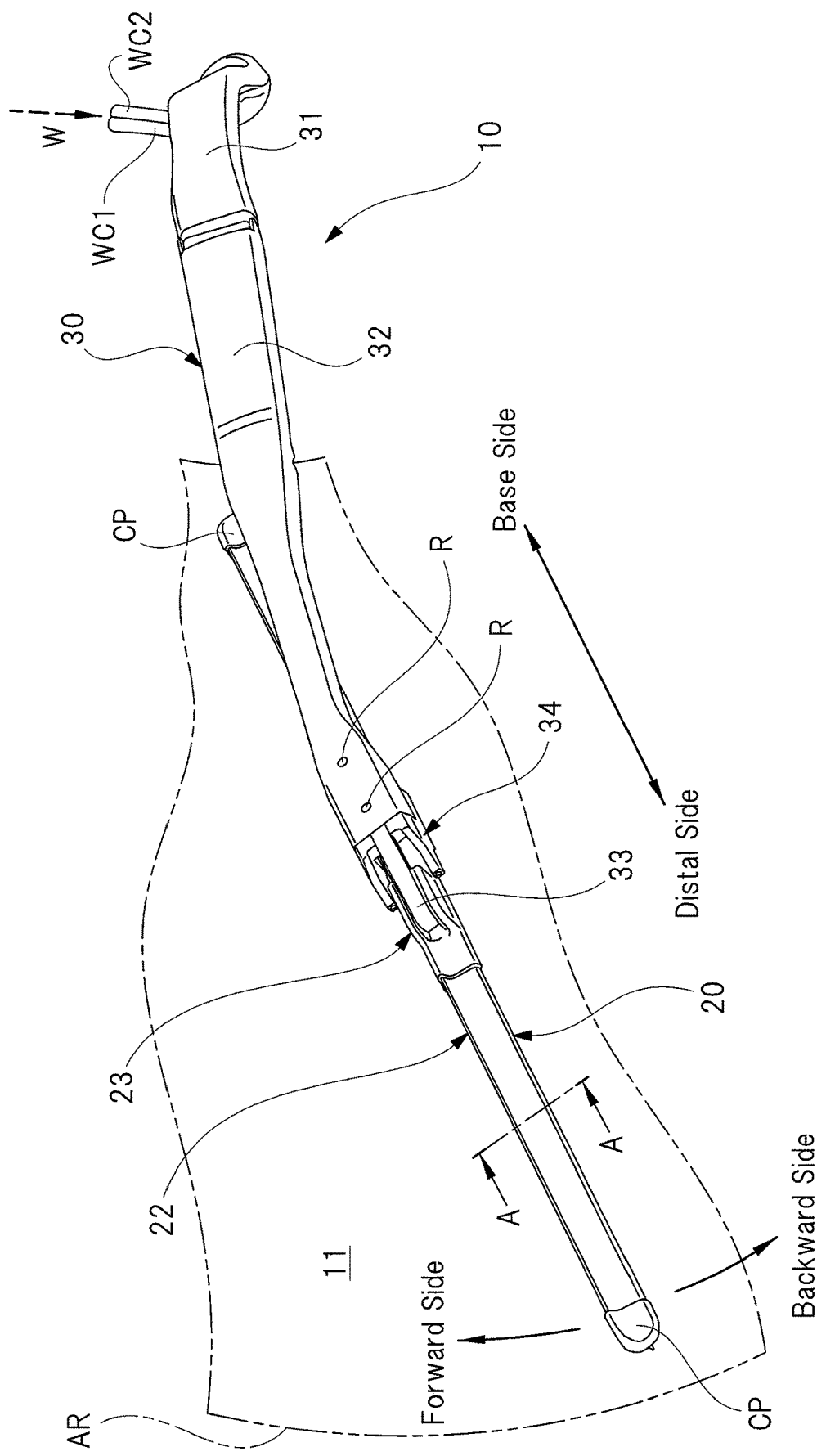
FIG. 1 is an overall perspective view of a wiper apparatus according to a first embodiment.
Figure 2:
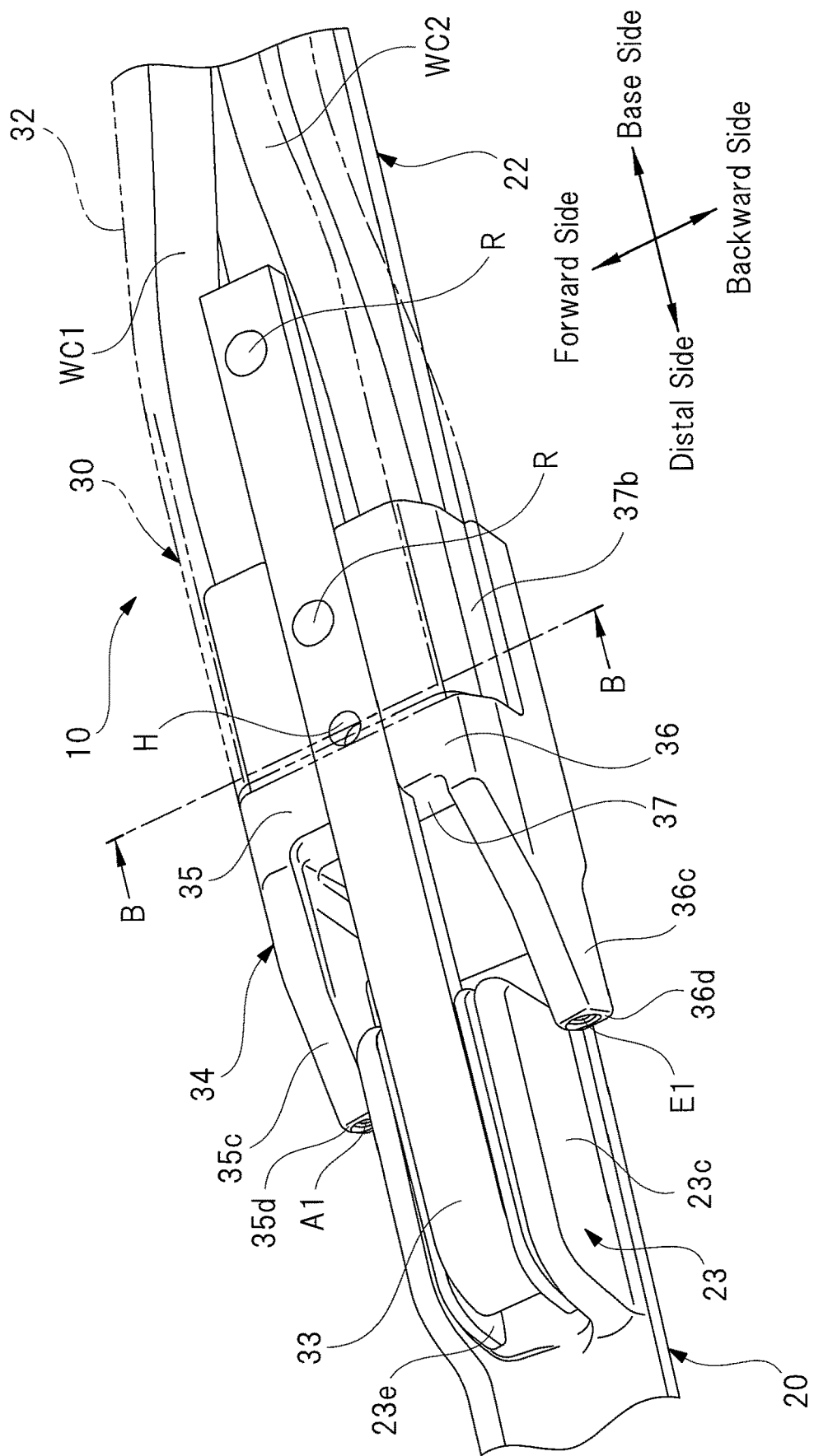
FIG. 2 is an enlarged perspective view of a surrounding portion of a connecting member, seen from its front side.
Figure 3:
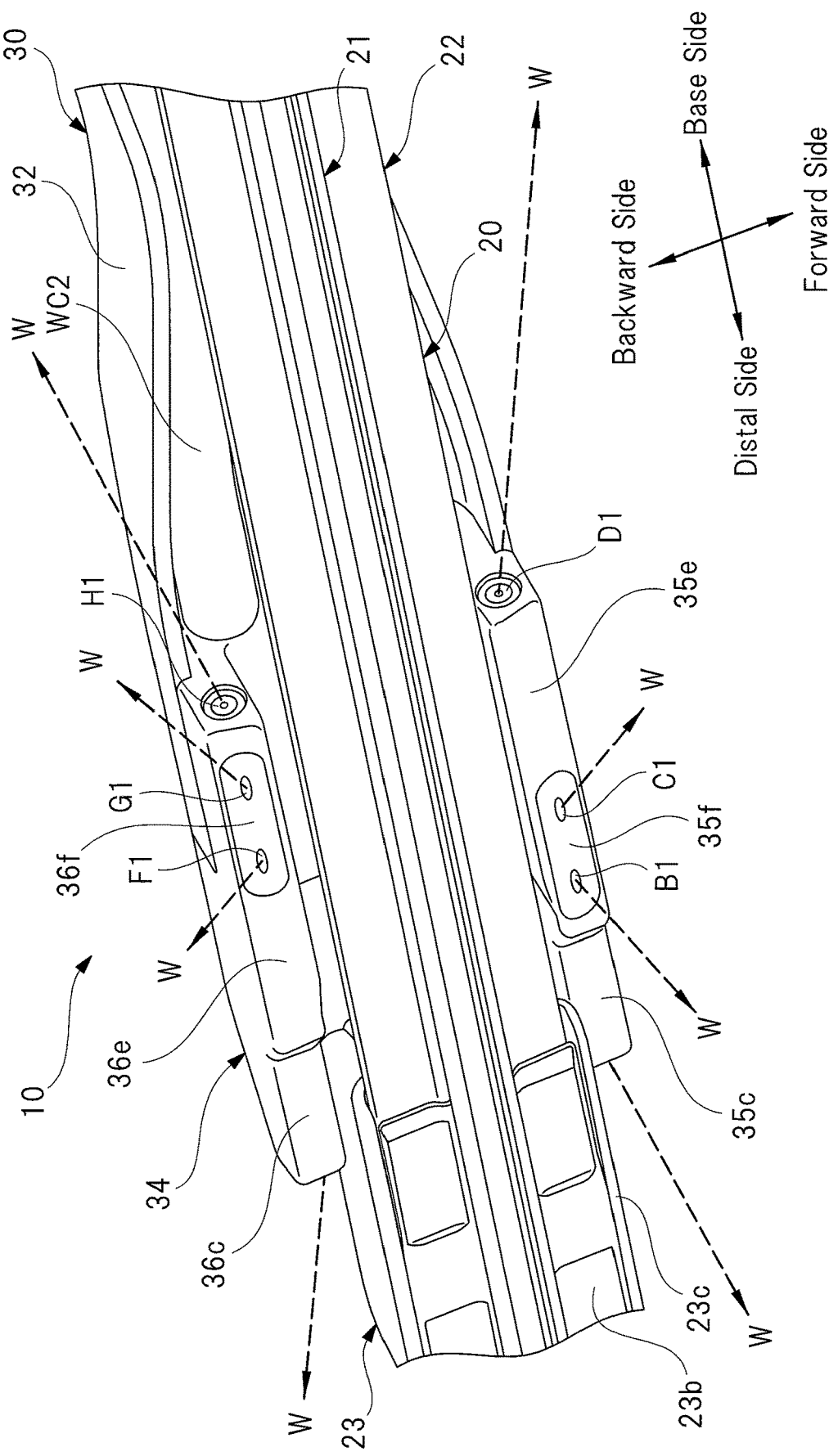
FIG. 3 is an enlarged perspective view of the surrounding of the connecting member, seen from its back side.
Figure 4:
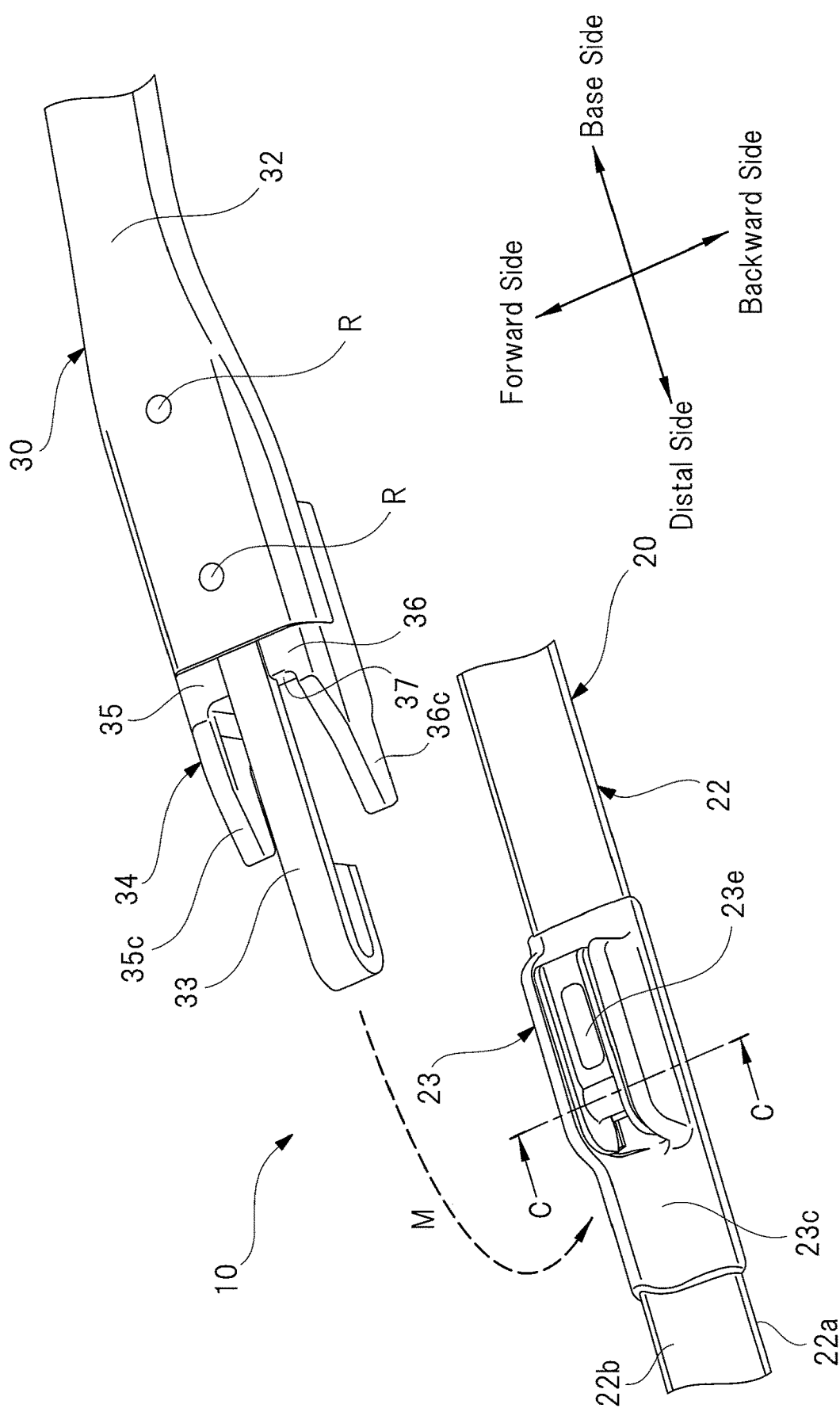
FIG. 4 is an exploded perspective view of a wiper arm and a wiper blade.
Figure 5:
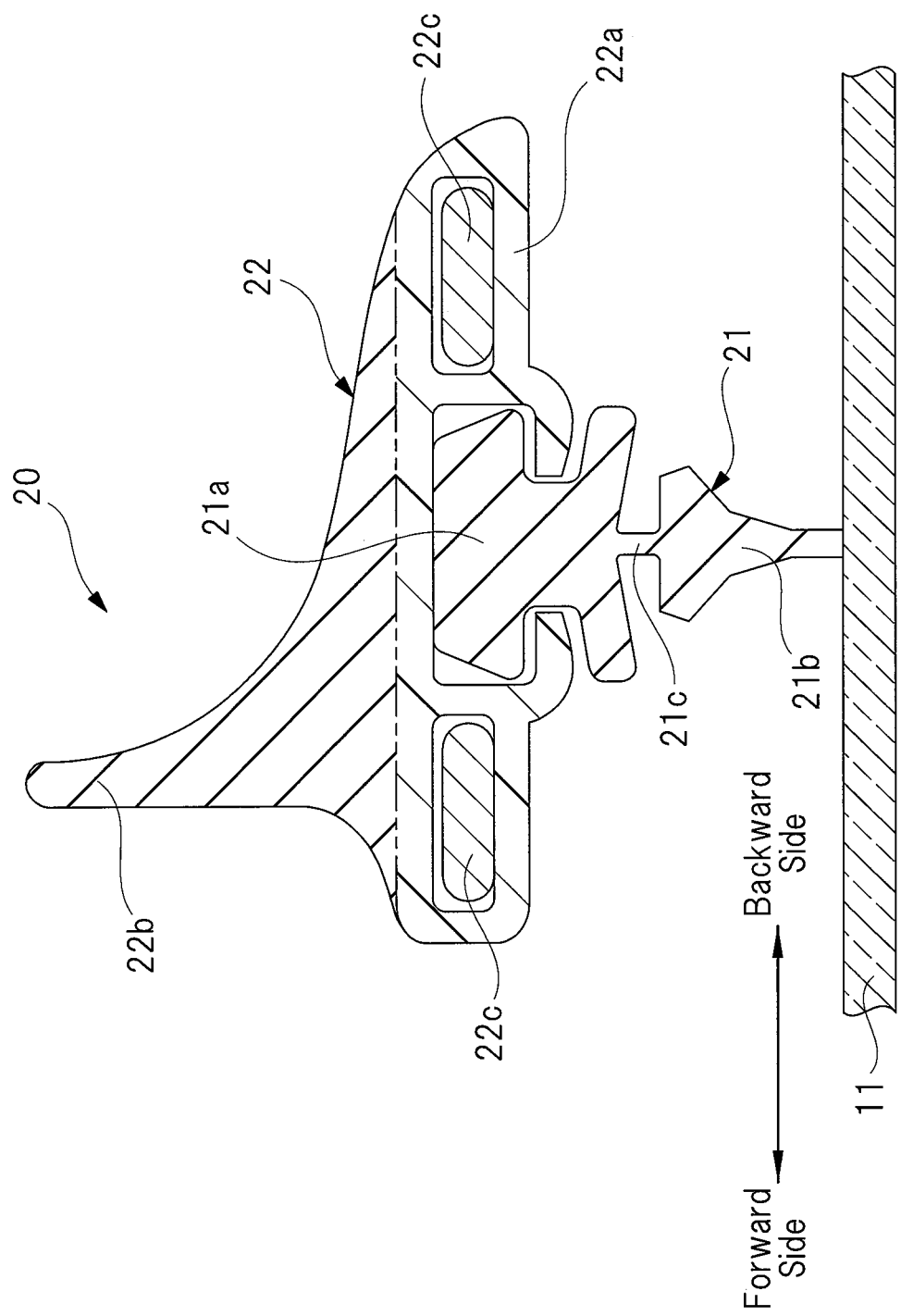
FIG. 5 is a sectional view taken along an A-A line of FIG. 1.
Figure 6:
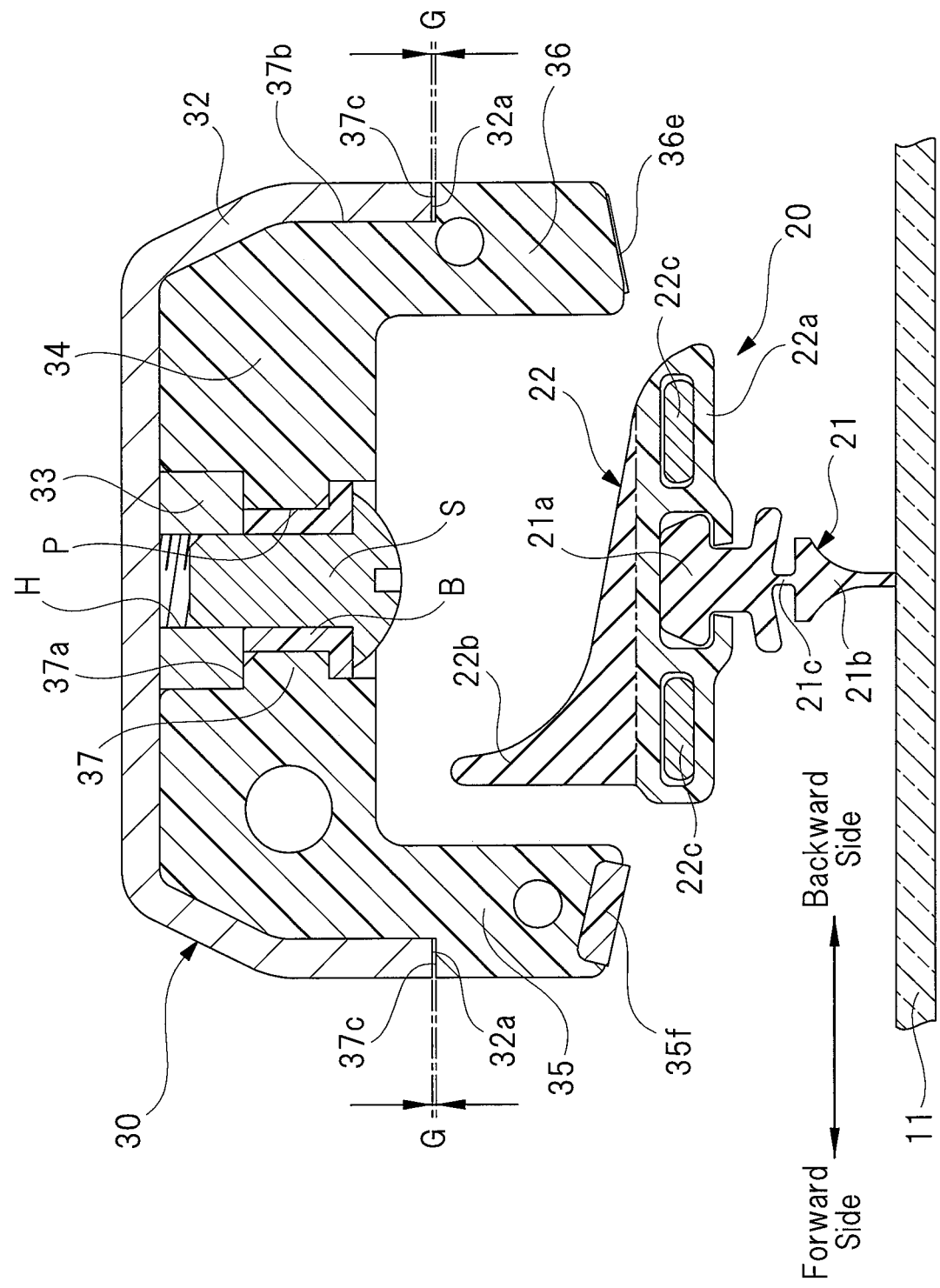
FIG. 6 is a sectional view taken along a B-B line of FIG. 2.
Figure 7:
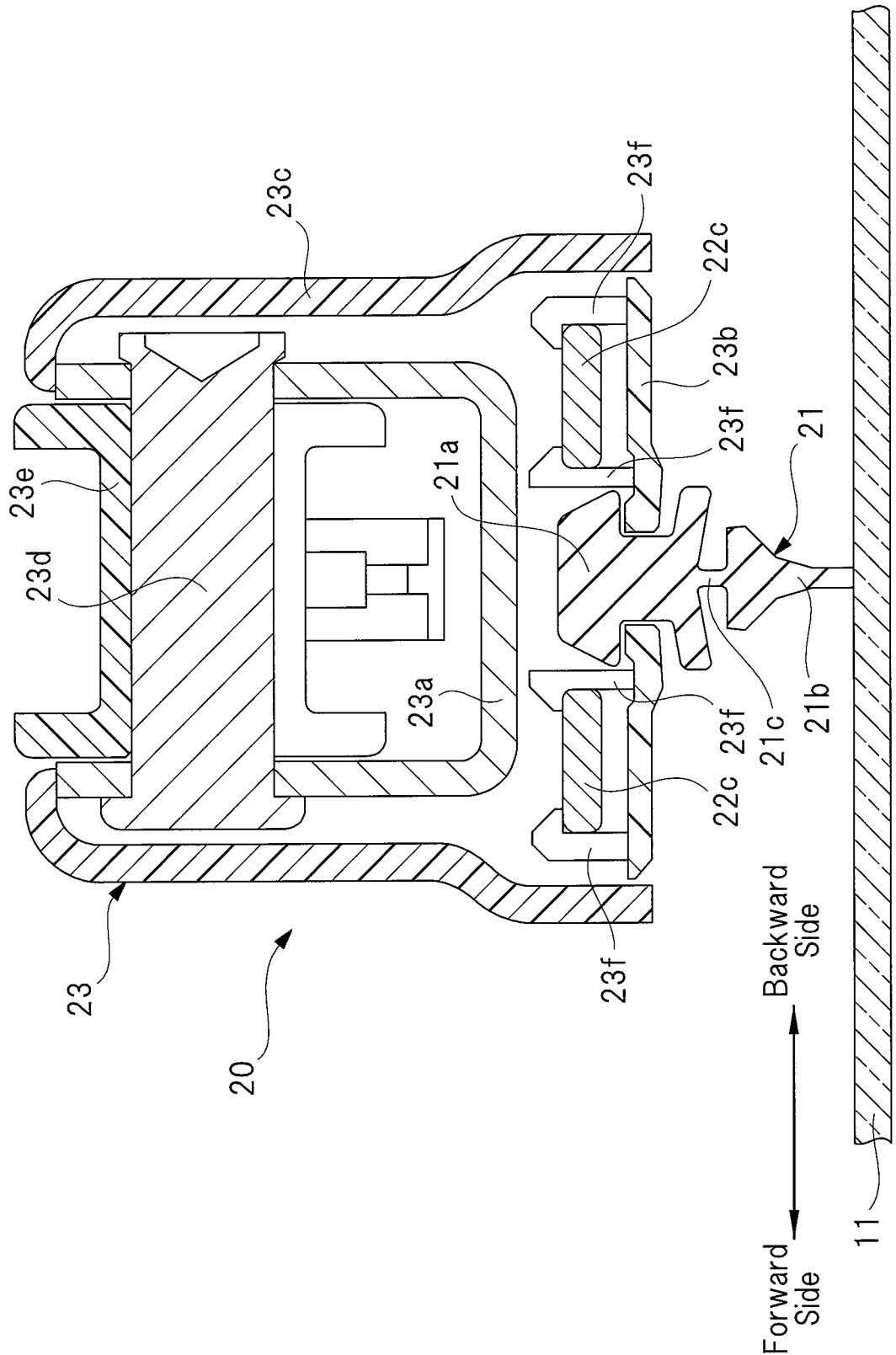
FIG. 7 is a sectional view taken along a C-C line of FIG. 4.
Figure 9:
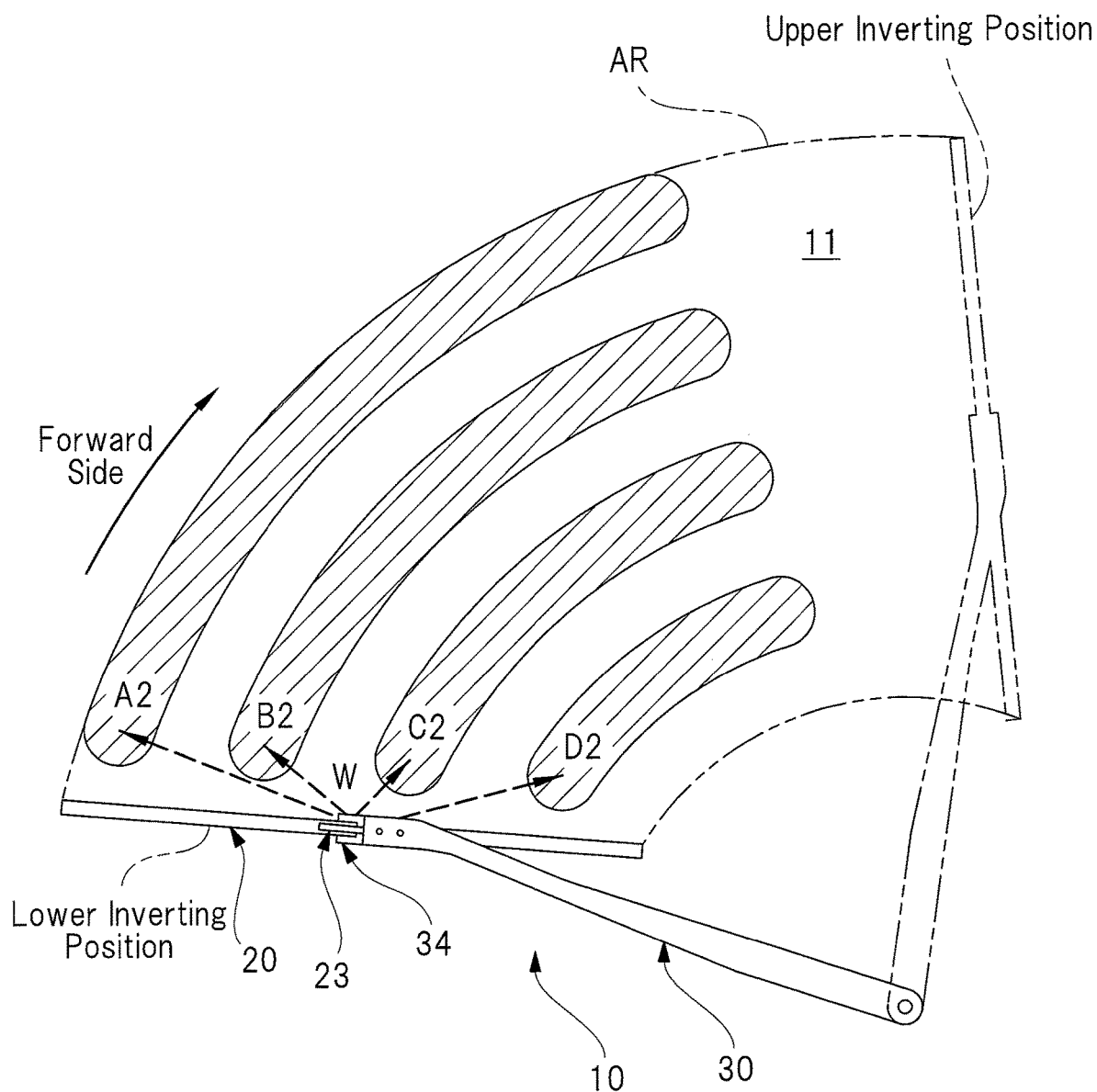
FIG. 9 is an explanatory view of injection-target locations (A2 to D2) of washer fluid resulting from a wiping action made along a forward path.
Figure 10:
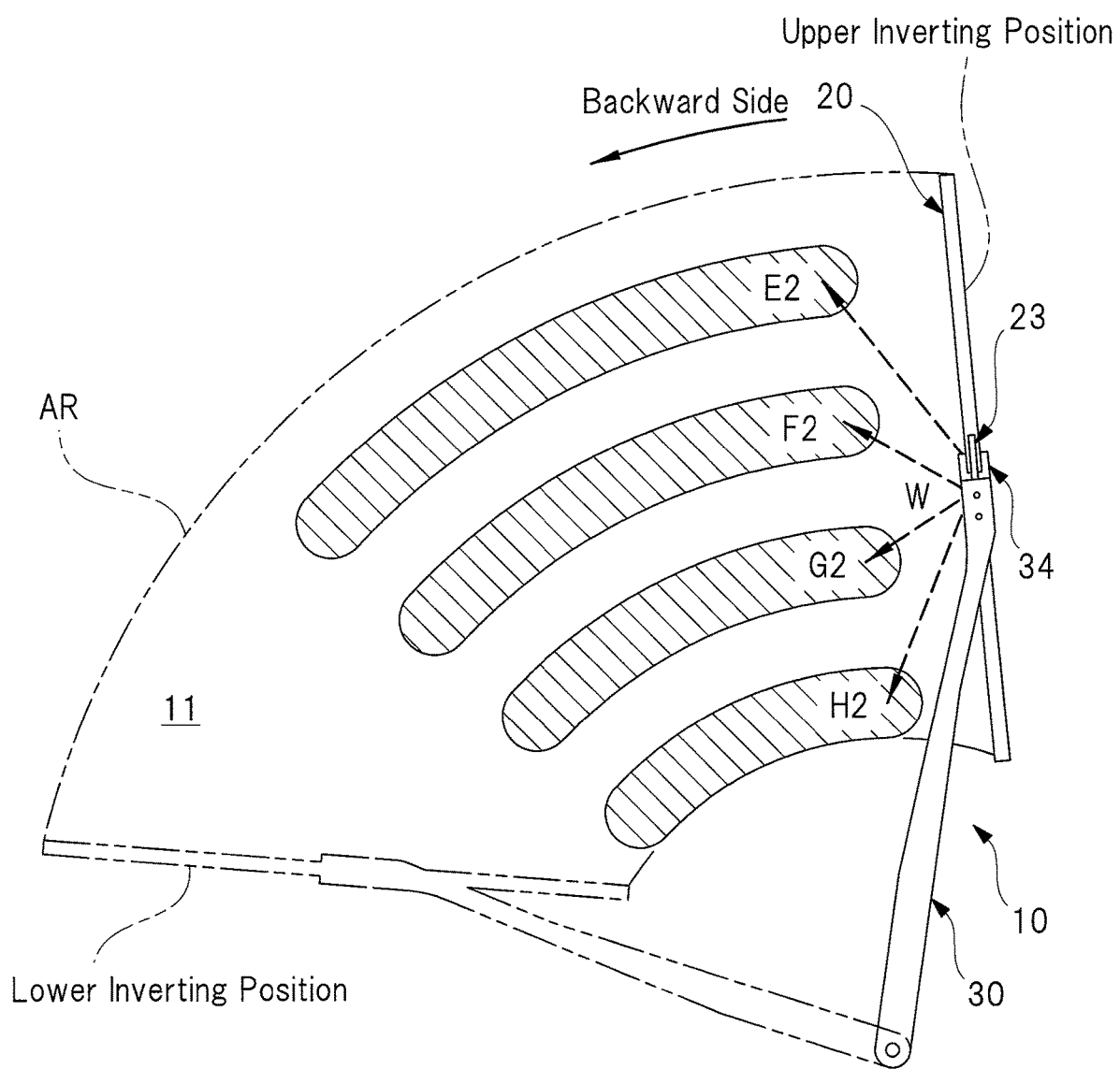
FIG. 10 is an explanatory view of injection-target locations (E2 to H2) of washer fluid to be injected when a wiping action is made along a backward path.
Figure 11:
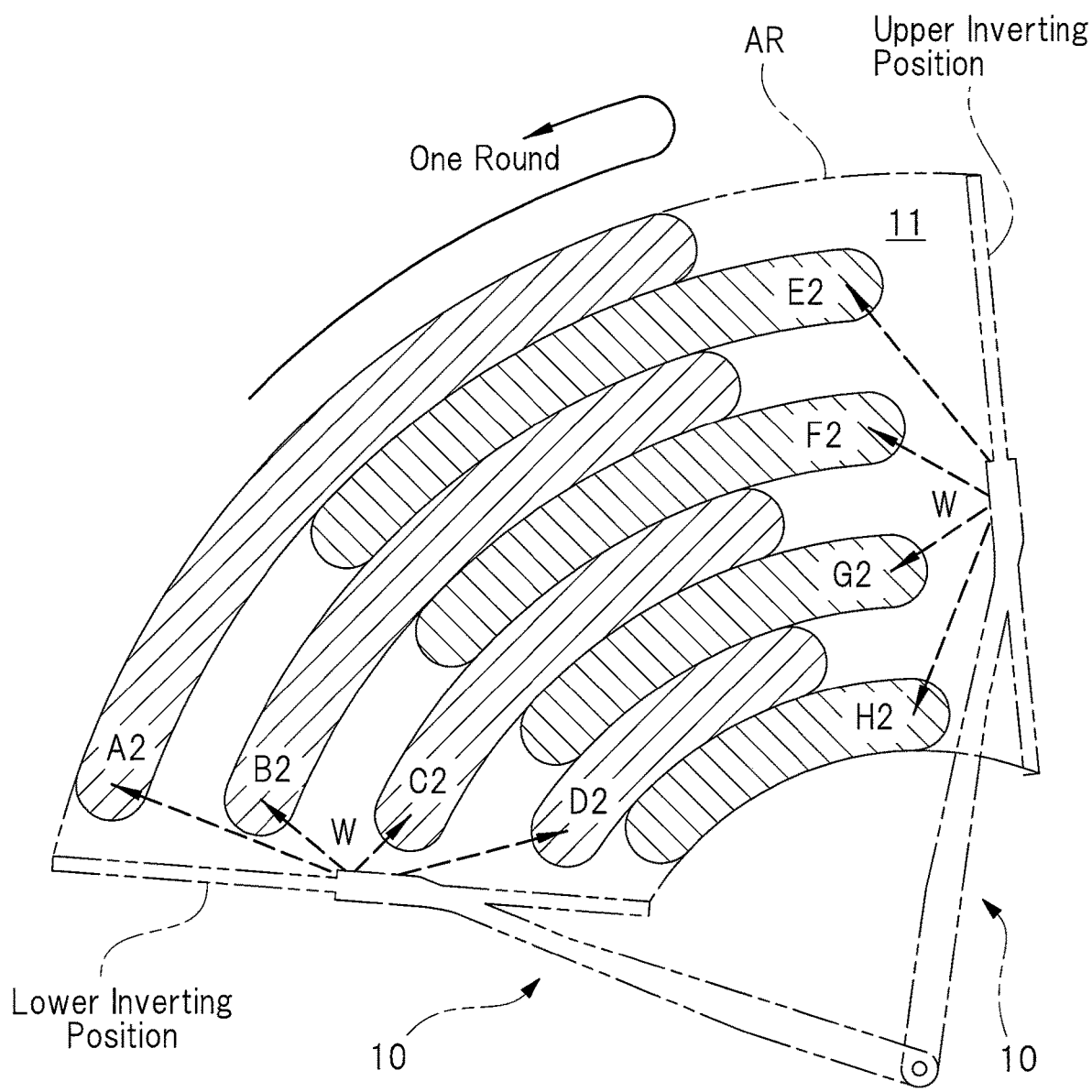
FIG. 11 is an explanatory view of the injection-target locations (A2 to H2) of washer fluid.

FIG. 1 is an overall perspective view of a wiper apparatus according to a first embodiment, FIG. 2 is an enlarged perspective view of a surrounding portion of a connecting member seen from its front side, FIG. 3 is an enlarged perspective view of the surrounding of the connecting member, seen from its back side, FIG. 4 is an exploded perspective view of a wiper arm and a wiper blade, FIG. 5 is a sectional view taken along an A-A line of FIG. 1, FIG. 6 is a sectional view taken along a B-B line of FIG. 2, FIG. 7 is a sectional view taken along a C-C line of FIG. 4, FIGS. 8A and 8B are perspective views of a nozzle unit, FIG. 9 is an explanatory view of injection-target locations (A2 to D2) of washer fluid which is injected when a wiping action is made along a forward path, FIG. 10 is an explanatory view of injection-target locations (E2 to H2) of washer fluid resulting from a wiping action made along a backward path, and FIG. 11 is an explanatory view of the injection-target locations (A2 to H2) of washer fluid.

As shown in FIG. 1, a wiper apparatus 10 includes a wiper blade 20 and a wiper arm 30. The wiper blade 20 is rotatably fitted to a front end side of the wiper arm 30, and moved in sliding contact with a windshield (surface to be wiped) 11 disposed on the front side of a vehicle such as automotive vehicle. A base end side of the wiper arm 30 is fixed to a pivot shaft (not shown) disposed on the front side of the vehicle. When switching on a wiper switch (not shown) in the vehicle interior to rotate a wiper motor (not shown), the pivot shaft is driven in a swinging manner. As a result, the wiper apparatus 10 makes reciprocating wiping actions in both the forward-path direction and the backward-path direction in a predetermined wiping range AR formed on the windshield 11, as indicated by arrows in FIG. 1.

As shown in FIGS. 1 to 7, the wiper blade 20 has a blade rubber 21 disposed in contact with the windshield 11, a holder member 22 holding the blade rubber 21, and a connecting member 23 formed on the middle portion of the holder member 22 in the longitudinal direction. A pair of end caps CP is fitted to both end portions of the holder member 22 in the longitudinal direction. The end caps CP prevent the blade rubber 21 from coming off from the holder member 22.

As shown in FIGS. 5 to 7, the blade rubber 21 has a main body portion 21a held by the holder member 22, a lip portion 21b brought in contact with the windshield 11, and a neck portion 21c connecting the main body portion 21a to the lip portion 21b. The blade rubber 21 is formed into an elongated shape by extrusion molding an elastic material such as rubber, and has a sectional shape which is uniform across the entire part of the blade rubber 21 along the longitudinal direction.

The thickness of the neck portion 21c along the moving direction of the blade rubber 21 (left-hand and right-hand directions in FIGS. 5 to 7) is determined to be smaller than the thickness of the main body portion 21a and that of the lip portion 21b. This allows the neck portion 21c to elastically deform easily. As a result, when the wiper blade 20 is moved toward the forward-side and the backward-side on the windshield 11, the lip portion 21b is allowed to be tilted, permitting its front end side to smoothly follow the main body portion 21a in the moving direction of the wiper blade 20. The wiper blade 20 is thus able to certainly wipe off foreign substance such as rainwater and dust (not shown) from the windshield 11.

As shown in FIGS. 5 and 6, the holder member 22 has a holder main body 22a and a fin portion 22b. The holder main body 22a and the fin portion 22b are molded into an integrated structure by double-molding materials different in hardness from each other, and similar to the blade rubber 21, formed into an elongated shape.

The holder main body 22a is made of flexible resin material, such as plastic which gives the holder main body 22a sufficient strength which allows it to hold the main body portion 21a of the blade rubber 21, and which allows the holder main body 22a to follow the curved surface (not shown) of the windshield 11. The fin portion 22b is made of elastic material such as rubber which has hardness lower than that of the holder main body 22a. Aerodynamic drag acting on the fin portion 22b creates downward force acting on the wiper blade 20. This downward force keeps the blade rubber 21 capable of exerting high wiping capability.

In the holder main body 22a, a pair of vertebras 22c is arranged at a predetermined interval. The vertebras 22c are each made of a steel plate having spring property, and are set mirror symmetric such that one vertebra 22c on the forward-side and the other vertebra 22c on the backward-side sandwich the main body portion 21a of the blade rubber 21. Each vertebra 22c in its natural state with no external force applied thereto is curved at a curvature which is larger than that of the windshield 11, causing the holder member 22 and the blade rubber 21 to be elastically deformed in conformity to the curvature of the windshield 11. As a result, the entire part of the lip portion 21b in the longitudinal direction is stuck firmly to the windshield 11.

As shown in FIGS. 1 and 7, the connecting member 23 is formed on the middle portion of the holder member 22 in the longitudinal direction. The connecting member 23 has a connecting body 23a, a base plate 23b, and a cover member 23c. The connecting body 23a is formed by press working a steel plate into a structure having a substantially U-shaped section, and caulking-fixed to the vertebras 22c with fixing legs (not shown) formed integrally with the connecting body 23a.

A columnar pin 23d made of steel is caulking-fixed to the connecting body 23a. A hook fixing member 23e made of resin material such as plastic is rotatably attached to this columnar pin 23d. To this hook fixing member 23e, an arm piece 33 fitted to the front end side of the wiper arm 30 (see FIGS. 2 and 4) is connected at one touch. The hook fixing member 23e forms part of a connecting portion of the present invention.

The base plate 23b is made of resin material such as plastic, and formed into a tabular shape. The base plate 23b is attached to the vertebras 22c with fixing legs 23f integrally provided to the base plate 23b. The connecting body 23a is located on the same side as the fin portion 22b (front side) of the holder member 22, while the base plate 23b is located on the same side as the holder main body 22a (back side) of the holder member 22.

The cover member 23c is made of resin material such as plastic, and formed substantially into a box shape. The cover member 23c is attached to the exterior of the connecting body 23a with a plurality of engaging claws (not shown) integrally provided to the cover member 23c. The cover member 23c covers up the side faces, etc., of the connecting body 23a, thereby giving the wiper blade 20 a better appearance.

As shown in FIGS. 1, 2, 4, and 6, the wiper arm 30 has an arm head 31, an arm shank 32, and the arm piece 33. The arm head 31 is formed into a predetermined shape by casting, etc. The base end side of the arm head 31 (on the right in FIG. 1) is fixed to the pivot shaft (not shown). To the front end side of the arm head 31 (on the left in FIG. 1), on the other hand, the base end side of the arm shank 32 is rotatably fitted. Between the arm shank 32 and the arm head 31, a tensile spring (not shown) is provided, and the tensile spring applies its spring force to the arm shank 32, thereby pressing it against the windshield 11.

The arm shank (retainer) 32 is formed into a long bar-like shape having a substantially U-shaped section by press working a steel plate. As well as the arm shank 32, a forward-side washer tube WC1 and a backward-side washer tube WC2, which are housed and arranged within the arm shank 32. One end side of each of the washer tubes WC1 and WC2 is led into an engine room of the vehicle via the arm head 31, and connected to a washer device (not shown). The front end side of the arm shank 32 is opposite to the base end side of the arm shank 32 connected to the arm head 31, and fitted with an arm piece 33 to which a nozzle unit 34 is fixed. The other ends of the washer tubes WC1 and WC2 are connected to the nozzle unit 34. In this manner, the washer tubes WC1 and WC2 are laid along the interior of the arm shank 32 and concealed by the arm shank 32, thereby giving the wiper apparatus 10 better appearance.

The arm piece 33 is formed into a predetermined shape by press working steel. As shown in FIG. 4, the front end side of the arm piece 33 is formed substantially into a U-shape, and connected to the hook fixing member 23e at one touch, as indicated by an arrow "M" in FIG. 4. The base end side of the arm piece 33 is fixed to the interior of the front end side of the arm shank 32 with a pair of rivets "R". In this manner, the arm shank 32 made of a steel plate and the arm piece 33 made of steel are firmly riveted to each other to keep them fixed without rattling.

As shown in FIG. 6, the nozzle unit 34 is fixed to the arm piece 33 with a fixing screw "S". As shown in FIGS. 2 and 6, the arm piece 33 is provided with a screw hole "H" which extends so as to penetrate it in the thickness direction. The fixing screw "S" is screwed into this screw hole "H" from the lower side of FIG. 6, that is, from the side closer to the wiper blade 20. A part of the arm piece 33 and the nozzle unit 34 which includes the screw hole "H" and the front end side of the fixing screw "S" is covered with the arm shank 32. This gives the surrounding of the nozzle unit 34 of the wiper apparatus 10 a neat and better appearance, as shown in FIG. 4. The nozzle unit 34 is fixed to the arm piece 33 with the fixing screw "S" after the wiper arm 30 is molded. The arm piece 33 and the fixing screw "S", therefore, cannot be painted simultaneously. As a result, when the front end side of the fixing screw "S" is exposed from the screw hole "H", the exposed front end creates an appearance with improper touch. To alleviate such improper touch created by the exposed fixing screw "S" and improve the overall appearance, the front end side of the fixing screw "S" is covered with the arm shank 32.

As described above, the nozzle unit 34 is fixed to the arm piece 33 fitted to the hook fixing member 23e, and therefore disposed closer to the hook fixing member 23e serving as the connecting portion. Near the hook fixing member 23e, the nozzle unit 34 is fixed firmly to the arm piece 33 with the fixing screw "S". Thus, compared to a conventional case where a nozzle (nozzle unit) is attached to the center portion of a wiper arm (arm shank) in the longitudinal direction or attached to the wiper arm via a fitting member, the distance from the nozzle unit 34 to the hook fixing member 23e is shortened as the number of components is reduced. The nozzle unit 34 is therefore not affected by a variation in shape of the wiper arm or fitting member, so that the positional shift of the nozzle unit 34 relative to the wiper blade 20 is reduced to the minimum.

As shown in FIG. 8, the nozzle unit 34 is formed by injection molding of resin material such as plastic into a predetermined shape. The nozzle unit 34 has a forward-side block 35 and a backward-side block 36.

The base end side of the forward-side block 35 (on the right in FIG. 8) is provided with a forward-side first wall 35a directed to the base end side of the wiper blade 20 in the longitudinal direction. The forward-side first wall 35a is integrally formed with a forward-side plug-in portion 35b which is plugged into the other end portion of the forward-side washer tube WC1 (see FIG. 2). On the other hand, the front end side of the forward-side block 35 (on the left in FIG. 8) is integrally provided with a forward-side arm 35c which is gradually tapered toward the front end side, and the forward-side arm 35c is provided with a forward-side second wall 35d directed to the front end side of the wiper blade 20 in the longitudinal direction.

In addition, a forward-side counter surface 35e is provided between the forward-side first wall 35a and the forward-side second wall 35d of the forward-side block 35, and the forward-side counter surface 35e is directed to the windshield 11. In the forward-side counter surface 35e, a portion closer to the forward-side second wall 35d is provided with a forward-side nozzle cap 35f. In this case, a jig (not shown) is used to form a washer fluid channel (not shown) inside the forward-side block 35. By using such a jig, an opening (not shown) is formed on the forward-side counter surface 35e. The forward-side nozzle cap 35f is used to block this opening.

As shown in FIG. 8A, the forward-side second wall 35d is provided with a forward-side first injection nozzle A1. The forward-side first injection nozzle A1 is directed to the front end side of the wiper blade 20 in the longitudinal direction. In this manner, the forward-side first injection nozzle A1 jets washer fluid "W" onto an injection-target location A2 on the windshield 11 shown in FIG. 9 when the wiper blade 20 makes a wiping action along the forward path. In other words, the forward-side first injection nozzle A1 is disposed on the front end side of the blade rubber 21 in the longitudinal direction, and so that it can jet washer fluid to an area on the forward path to wet the area.

On the forward-side nozzle cap 35f, a forward-side second injection nozzle B1 and a forward-side third injection nozzle C1 are formed, as shown in FIG. 8B. The forward-side second injection nozzle B1 and the forward-side third injection nozzle C1 are directed to the center portion of the wiper blade 20 in the longitudinal direction. In this manner, the forward-side second injection nozzle B1 and the forward-side third injection nozzle C1 jet washer fluid "W" onto injection-target locations B2 and C2 on the windshield 11 shown in FIG. 9, respectively, when the wiper blade 20 makes a wiping action along the forward path. In other words, the forward-side second injection nozzle B1 and the forward-side third injection nozzle C1 are disposed on the center portion of the blade rubber 21 in the longitudinal direction, and so that it can jet washer fluid to an area on the forward path to wet the area.

The forward-side first wall 35a is provided with a forward-side fourth injection nozzle D1 as shown in FIG. 8B. The forward-side fourth injection nozzle D1 is directed to the base end side of the wiper blade 20 in the longitudinal direction. In this manner, the forward-side fourth injection nozzle D1 jets washer fluid "W" onto an injection-target location D2 on the windshield 11 shown in FIG. 9 when the wiper blade 20 makes a wiping action along the forward path. In other words, the forward-side fourth injection nozzle D1 is disposed on the base end side of the blade rubber 21 in the longitudinal direction, and so that it can jet washer fluid to an area on the forward path to wet the area.

In this case, an "eyeball type nozzle" capable of varying the injection-target locations of washer fluid "W" is adopted as the forward-side first injection nozzle A1 and the forward-side fourth injection nozzle D1. That is, the forward-side first injection nozzle A1 and the forward-side fourth injection nozzle D1 each serves as a variable nozzle in the present invention. The injection-target locations of the forward-side first injection nozzle A1 and the forward-side fourth injection nozzle D1 can be adjusted by using a needle, etc. so as to pivotally support the nozzle. This allows the injection-target locations of the forward-side first injection nozzle A1 and the forward-side fourth injection nozzle D1 to be optimized according to the length of the wiper blade 20 (short or long version of the wiper blade 20) attached to the wiper arm 30.

The forward-side first injection nozzle A1 to the forward-side fourth injection nozzle D1 (four nozzles) formed on the forward-side block 35 each serves as a forward-side nozzle of the present invention.

On the base end side of the backward-side block 36 (on the right in FIG. 8), a backward-side first wall 36a is formed, which is directed to the base end side of the wiper blade 20 in the longitudinal direction. The backward-side first wall 36a has a backward-side plug-in portion 36b formed integrally thereon, which is plugged into the other end portion of the backward-side washer tube WC2 (see FIG. 2). On the front end side of the backward-side block 36 (on the left in FIG. 8), a backward-side arm 36c is formed integrally thereon, which gradually tapers toward its front end side. The backward-side arm 36c has a backward-side second wall 36d directed to the front end side of the wiper blade 20 in the longitudinal direction.

Between the backward-side first wall 36a and the backward-side second wall 36d of the backward-side block 36, a backward-side counter surface 36e is formed, which is counter to the windshield 11. On a portion of backward-side counter surface 36e which is closer to the backward-side first wall 36a, a backward-side nozzle cap 36f is disposed. A jig (not shown) is used to form a washer fluid channel (not shown) inside the backward-side block 36. Use of such a jig forms an opening (not shown) on the backward-side counter surface 36e. The backward-side nozzle cap 36f blocks this opening.

On the backward-side second wall 36d, a backward-side first injection nozzle E1 is formed, as shown in FIG. 8A. The backward-side first injection nozzle E1 is directed to the front end side of the wiper blade 20 in the longitudinal direction. In this manner, the backward-side first injection nozzle E1 jets washer fluid "W" onto an injection-target location E2 on the windshield 11 shown in FIG. 10 when the wiper blade 20 makes a wiping action along the backward path. In other words, the backward-side first injection nozzle E1 is disposed on the front end side of the blade rubber 21 in the longitudinal direction, and so that it can jet washer fluid to an area on the backward path to wet the area.

As shown in FIG. 8B, the backward-side nozzle cap 36f is provided with a backward-side second injection nozzle F1 and a backward-side third injection nozzle G1. The backward-side second injection nozzle F1 and the backward-side third injection nozzle G1 are directed to the center portion of the wiper blade 20 in the longitudinal direction. In this manner, the backward-side second injection nozzle F1 and the backward-side third injection nozzle G1 jet washer fluid "W" onto injection-target locations F2 and G2 on the windshield 11 shown in FIG. 10, respectively, when the wiper blade 20 makes a wiping action along the backward path. In other words, the backward-side second injection nozzle F1 and the backward-side third injection nozzle G1 are disposed on the center portion of the blade rubber 21 in the longitudinal direction, and so that it can jet washer fluid to an area on the backward path to wet the area.

On the backward-side first wall 36a, a backward-side fourth injection nozzle H1 is formed, as shown in FIG. 8B. The backward-side fourth injection nozzle H1 is directed to the base end side of the wiper blade 20 in the longitudinal direction. In this manner, the backward-side fourth injection nozzle H1 jets washer fluid "W" onto an injection-target location H2 on the windshield 11 shown in FIG. 10 when the wiper blade 20 makes a wiping action along the backward path. In other words, the backward-side fourth injection nozzle H1 is disposed on the base end side of the blade rubber 21 in the longitudinal direction, and so that it can jet washer fluid to an area on the backward path to wet the area.

In this case, an "eyeball type nozzle" capable of varying the injection-target locations of washer fluid "W" is adopted as the backward-side first injection nozzle E1 and the backward-side fourth injection nozzle H1. The backward-side first injection nozzle E1 and the backward-side fourth injection nozzle H1 thus each serves as a variable nozzle of the present invention. The injection-target locations of the backward-side first injection nozzle E1 and the backward-side fourth injection nozzle H1 can be adjusted by using a needle, etc. so as to pivotally support the nozzle. This allows the injection-target locations of the backward-side first injection nozzle E1 and the backward-side fourth injection nozzle H1 to be optimized according to the length of the wiper blade 20 (short or long version of the wiper blade 20) attached to the wiper arm 30.

Each of the backward-side first injection nozzle E1 to the backward-side fourth injection nozzle H1 (four nozzles) formed on the backward-side block 36 serves as a backward-side nozzle of the present invention.

In this manner, injection-target locations of the forward-side first injection nozzle A1, the forward-side fourth injection nozzle D1, the backward-side first injection nozzle E1, and the backward-side fourth injection nozzle H1 are made adjustable, and the forward-side nozzle cap 35f is disposed on the same side of the forward-side counter surface 35e as the forward-side second wall 35d, while the backward-side nozzle cap 36f is disposed on the same side of backward-side counter surface 36e as the backward-side first wall 36a. As a result, the injection-target locations A2 to H2 (eight injection-target locations) are arranged in oblique line areas in FIG. 11 such that the forward-side injection-target locations and the backward-side injection-target locations alternate.

The forward-side first injection nozzle A1 to the forward-side fourth injection nozzle D1 (four nozzles) are so positioned that they can wet relatively wide areas which are inside the wiping range AR and which are on the forward side, with washer fluid "W" (see FIG. 9). The backward-side first injection nozzle E1 to the backward-side fourth injection nozzle H1 (four nozzles) are so positioned that they can wet relatively wide areas that are inside the wiping range AR and that are on the backward side, with washer fluid "W" (see FIG. 10). If a divergent nozzle capable of jetting mist of washer fluid "W" is used, wider areas inside the wiping range AR can be wetted with smaller amount of washer fluid "W".

When switching on a washer switch (not shown), the washer device is brought into operation for supplying washer fluid "W" to the forward-side block 35 and the backward-side block 36 via the washer tubes WC1 and WC2, as indicated by a broken line arrow in FIG. 1. An operation direction of the washer device is switched so that washer fluid "W" is supplied to the forward-side block 35 only when the wiper blade 20 makes a wiping action along the forward path, and to the backward-side block 36 only when the wiper blade 20 makes a wiping action along the backward path.

A connecting portion 37 is formed between the forward-side block 35 and the backward-side block 36 of the nozzle unit 34, that is, between the forward-side first injection nozzle A1 to the forward-side fourth injection nozzle D1 and the backward-side first injection nozzle E1 to the backward-side fourth injection nozzle H1. The connecting portion 37 has a function of connecting the forward-side block 35 to the backward-side block 36 and keeping them parallel with each other.

The connecting portion 37 has a concave portion 37a in which the arm piece 33 is fitted. The concave portion 37a opens in a direction opposite to the forward-side nozzle cap 35f and the backward-side nozzle cap 36f, and extends in a longitudinal direction of the wiper blade 20. On the same side of the concave portion 37a as the forward-side arm 35c and the backward-side arm 36c than to the center portion of the wiper blade 20 in the longitudinal direction, a screw insertion hole "P" is formed, which extends so as to penetrate the connecting portion 37 in the direction of its thickness, as shown in FIG. 6. Into the screw insertion hole "P", the fixing screw "S" is inserted via a cylindrical bush "B", the fixing screw "S" being screwed in the screw hole "H" of the arm piece 33. The bush "B" has a function of suppressing the rattling of the nozzle unit 34 against the arm piece 33.

On the same side of nozzle unit 34 in the longitudinal direction as the forward-side plug-in portion 35b and the backward-side plug-in portion 36b, a fitting concave portion 37b is formed, on which the front end side of the arm shank 32 is fitted. The fitting concave portion 37b is formed in such a way as to straddle the forward-side block 35 and the backward-side block 36. The fitting concave portion 37b formed in this manner reduces a level difference between the nozzle unit 34 and the arm shank 32, thereby giving them a better appearance (see FIGS. 4 and 6). This configuration also allows the bush "B" and the screw hole "H" (see FIG. 6) to be faced each other easily without a visual check when the wiper apparatus 10 is assembled, thus improving workability in assembling the wiper apparatus 10. As shown in FIG. 6, when the nozzle unit 34 is fitted to the arm piece 33, a tiny gap "G" G is formed between an end 32a of the arm shank 32 and an end 37c of the fitting concave portion 37b. This tiny gap "G" cancels out manufacturing errors (manufacturing irregularities) of the arm shank 32 and the nozzle unit 34. This further suppresses the rattling of the nozzle unit 34 against the arm piece 33.

Next, an operation of the wiper apparatus 10 configured in the above manner will be described in detail with reference to the drawings.

[Wiping Action Along Forward Path]

A wiping action along the forward path is an action such that the wiper blade 20 is moved upward from a lower return position up to an upper return position in the wiping range AR on the windshield 11 as shown in FIG. 9.

With the wiper blade 20 moved in the forward path direction as indicated by a continuous line arrow (forward side) in FIG. 9, when switching on the washer switch, washer fluid "W" is jetted from the forward-side first to fourth injection nozzles A1 to D1 (see FIG. 8). As a result, washer fluid "W" wets the injection-target locations A2 to D2 shown in FIG. 9, and washer fluid "W" is somewhat carried by vehicle's aerodynamic drag and the like to areas between the injection-target locations A2 and B2, between the injection-target locations B2 and C2, and between the injection-target locations C2 and D2. This prevents a problem caused by the wiper blade 20 in contact with the windshield 11 in its dry state, that is, a problem of scratches on the windshield 11 or the partial wear of the blade rubber 21. Thus, the wind shield 11 is wetted with washer fluid "W", which allows foreign substance such as dust on the windshield 11 to be wiped out completely.

[Wiping Action Along Backward Path]

A wiping action along the backward path is an action such that the wiper blade 20 is moved downward from the upper return position up to the lower return position in the wiping range AR on the windshield 11, as shown in FIG. 10.

When switching on the washer switch with the wiper blade 20 moved in the backward path direction, as indicated by a continuous line arrow (backward side) in FIG. 10, washer fluid "W" is jetted out of the backward-side first injection nozzle E1 to the backward-side fourth injection nozzle H1 (see FIG. 8). As a result, washer fluid "W" wets the injection-target locations E2 to H2 shown in FIG. 10. The injection-target locations E2 to H2 cover areas between the injection-target locations A2 and B2, between the injection-target locations B2 and C2, and between the injection-target locations C2 and D2, which are the areas not wetted sufficiently during the wiping action along the forward path. Hence, as indicated by the injection-target locations A2 to H2 of FIG. 11, the windshield 11 is uniformly wetted and wiped through one reciprocating stroke of the wiping action by the blade rubber 21 (wiper blade 20), which is therefore able to completely wipe off dust and the like from the windshield 11.

Areas other than the injection-target locations E2 to H2 of FIG. 10 are wetted during the wiping action along the forward path and are further wetted with a bit of washer fluid "W" carried to the areas by vehicle's aerodynamic draft, etc. As a result, a problem caused by the wiper blade 20 in contact with the windshield 11 in its dry state is prevented also during the wiping action along the backward path.

As described above, according to the wiper apparatus 10 of this embodiment, the nozzle unit 34 which jets washer fluid "W" toward the windshield 11 is fixed to the arm piece 33 whose front end side is fitted to the hook fixing member 23e. The nozzle unit 34 can be thus fixed without using the fitting member adopted in the conventional case, and located closer to the hook fixing member 23e. This reduces a positional shift of the nozzle unit 34 relative to the wiper blade 20 to the minimum, thus stabilizing the injection-target locations of washer fluid "W" on the windshield 11.

According to the wiper apparatus 10 of this embodiment, a part of the arm piece 33 and the nozzle unit 34 are covered with the arm shank 32. This prevents the exposure of the screw hole "H", etc., to the outside, thereby giving the surrounding of the nozzle unit 34 of the wiper apparatus 10 a neat and better appearance.

According to the wiper apparatus 10 of this embodiment, the nozzle unit 34 has the forward-side first injection nozzle A1 to the forward-side fourth injection nozzle D1 and the backward-side first injection nozzle E1 to the backward-side fourth injection nozzle H1. The injection-target locations on the forward side and on the backward side of washer fluid "W" jetted out of these nozzles A1 to H1 are shifted to each other in the longitudinal direction of the wiper blade 20, as indicated by the injection-target locations A2 to H2 of FIG. 11. This allows wide areas inside the wiping range AR and on both forward side and the backward side to be wetted uniformly with smaller amount of washer fluid "W". This keeps power consumption of the washer device low, thereby reducing the size of the washer device.

According to the wiper apparatus 10 of this embodiment, the concave portion 37a having the arm pieces 33 fitted therein is formed between the forward-side first injection nozzle A1 to the forward-side fourth injection nozzle D1 and the backward-side first injection nozzle E1 to the backward-side fourth injection nozzle H1 of the nozzle unit 34. This allows the nozzle unit 34 to be fixed firmly without rattling to the arm piece 33. When the nozzle unit 34 and the arm piece 33 are in a state of being fixed together, the arm piece 33 is prevented from projecting out of the nozzle unit 34. This gives the nozzle unit 34 and arm piece 33 a better appearance.

According to the wiper apparatus 10 of this embodiment, the nozzle unit 34 has a set of the forward-side first injection nozzle A1 and the backward-side first injection nozzle E1 and a set of the forward-side fourth injection nozzle D1 and the backward-side fourth injection nozzle H1 on the front end side and the base end side of the nozzle unit 34 along the longitudinal direction of the wiper blade 20, respectively, the forward-side first injection nozzle A1 and the backward-side first injection nozzle E1 and the forward-side fourth injection nozzle D1 and the backward-side fourth injection nozzle H1 being capable of changing the injection-target locations of washer fluid "W". This allows the injection-target locations of the nozzles A1, D1, E1, and H1 to be optimized according to the length of the wiper blade 20 (short or long version of the wiper blade 20) attached to the wiper arm 30, that is, according to the specifications of the wiper blade 20.

The present invention is not limited to the above embodiment and may obviously be modified into various forms of applications on the condition that the modification does not deviate from the substance of the invention. For example, the wiper apparatus 10 which wipes the windshield 11 disposed on the front side of the vehicle is described in the above embodiment. The present invention applies not only to the wiper apparatus 10 but also to a wiper apparatus which wipes a rear window disposed on the rear side of the vehicle. The invention applies not only to a wiper apparatus incorporated in a vehicle such as automotive vehicle, but also to a wiper apparatus incorporated in rail vehicle, airplane, ship, etc.

The wiper apparatus including groups of forward-side nozzles and the backward-side nozzles, each group composed of four nozzles, is described in the above embodiment. The present invention, however, is not limited to such a wiper apparatus. Each group may be composed of three or fewer nozzles or five or more nozzles according to the specifications of the wiper apparatus. Depending on the characteristics of airflows caused by the aerodynamic draft, the number of forward-side nozzles may be determined to be different from the number of backward-side nozzles.

Next, the second embodiment of the present invention will be described in detail with reference to drawings.

Figure 12:
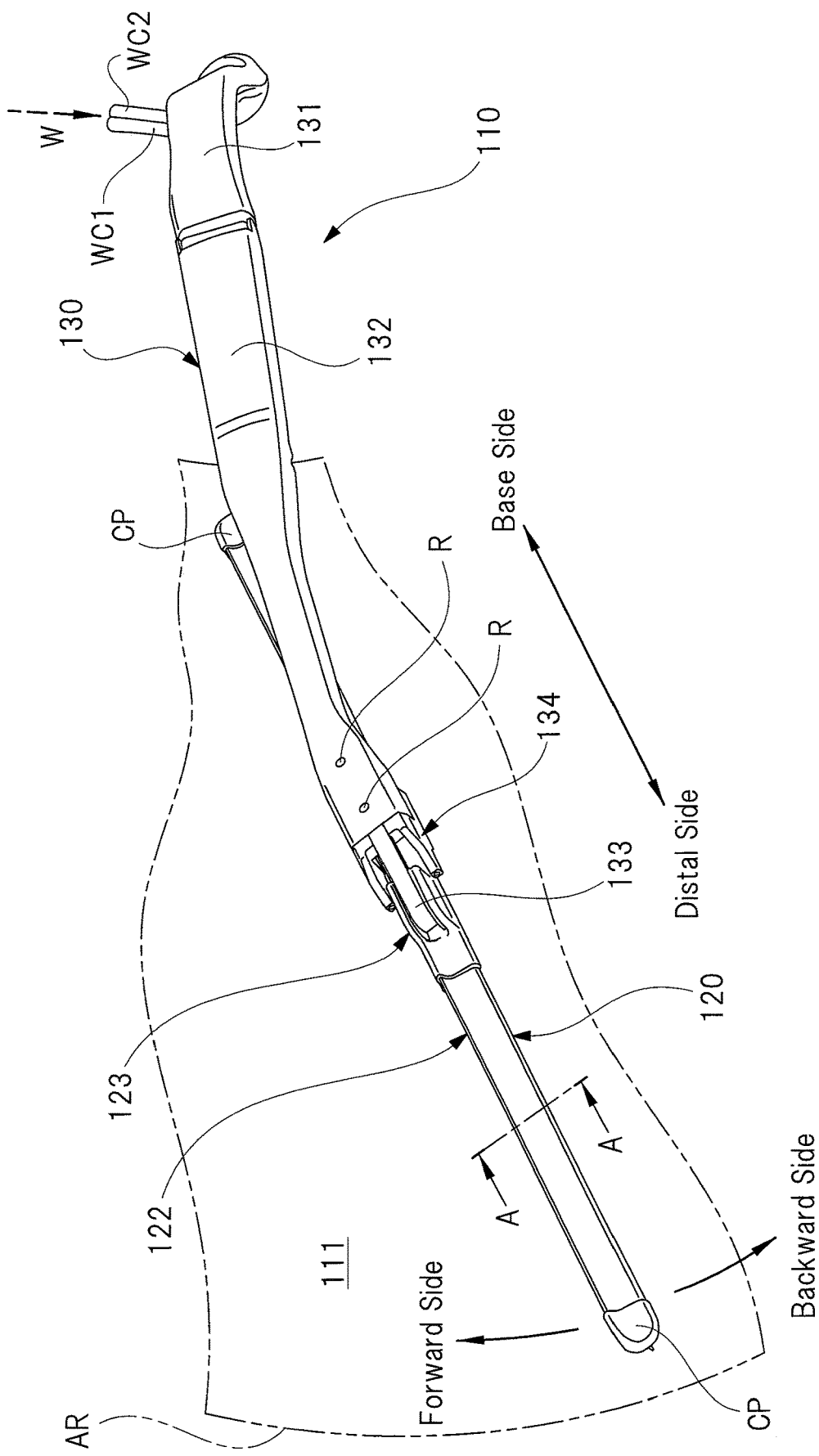
FIG. 12 is an overall perspective view of a wiper apparatus according to a second embodiment.
Figure 13:
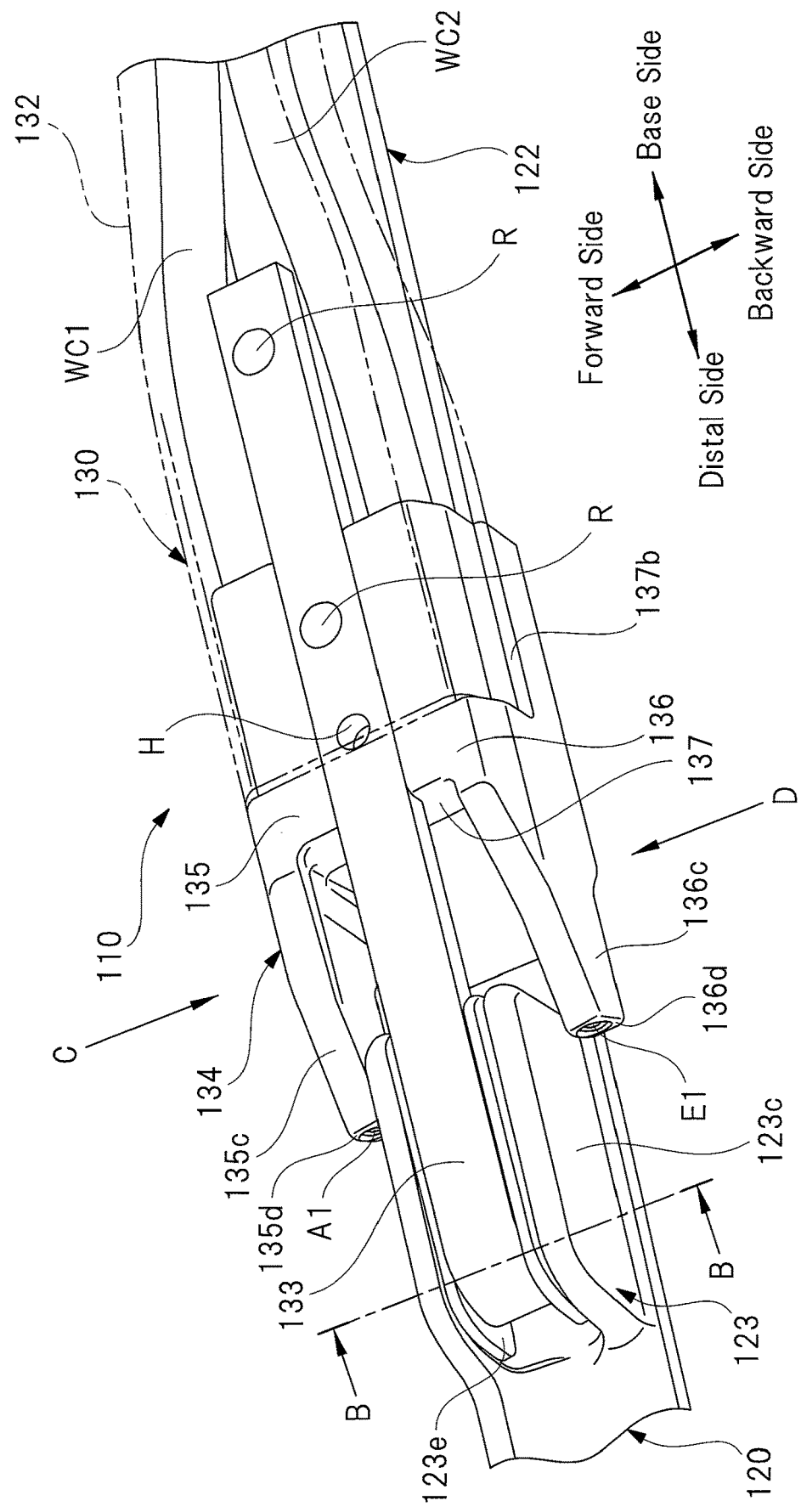
FIG. 13 is an enlarged perspective view of a surrounding portion of a connecting portion, seen from its front side.
Figure 14:
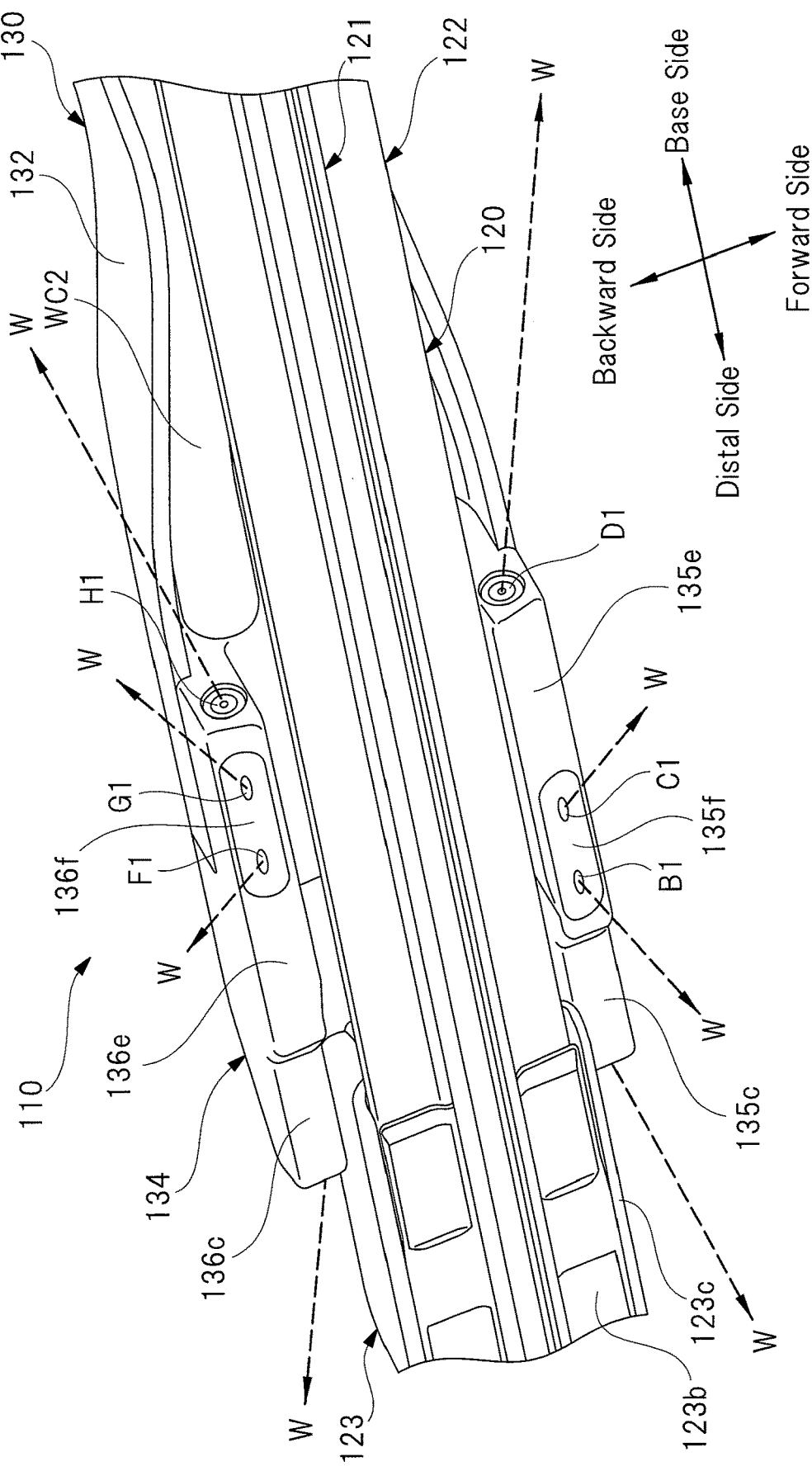
FIG. 14 is an enlarged perspective view of the surrounding of the connecting portion, seen from its back side.
Figure 15:
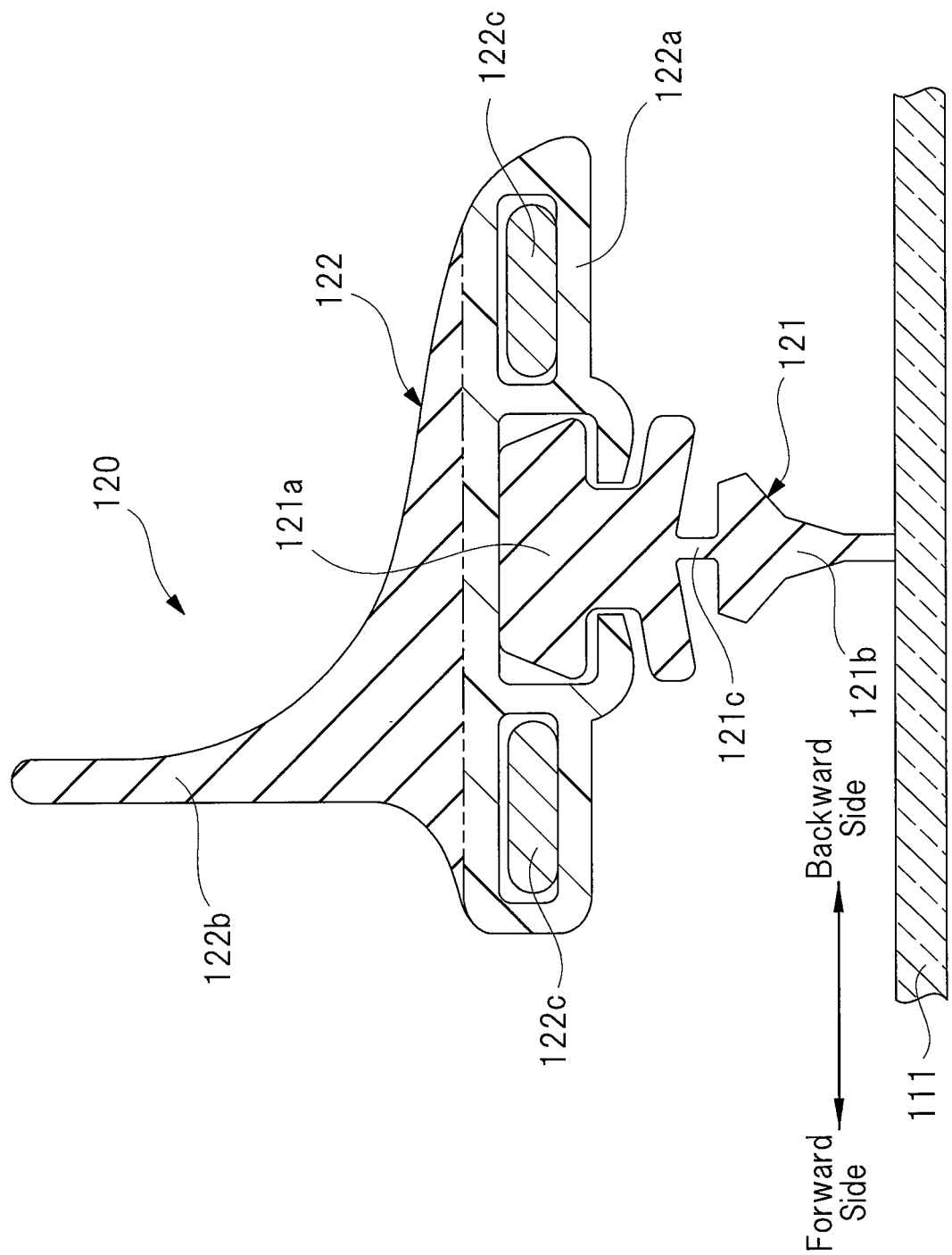
FIG. 15 is a sectional view taken along an A-A line of FIG. 12.
Figure 16:
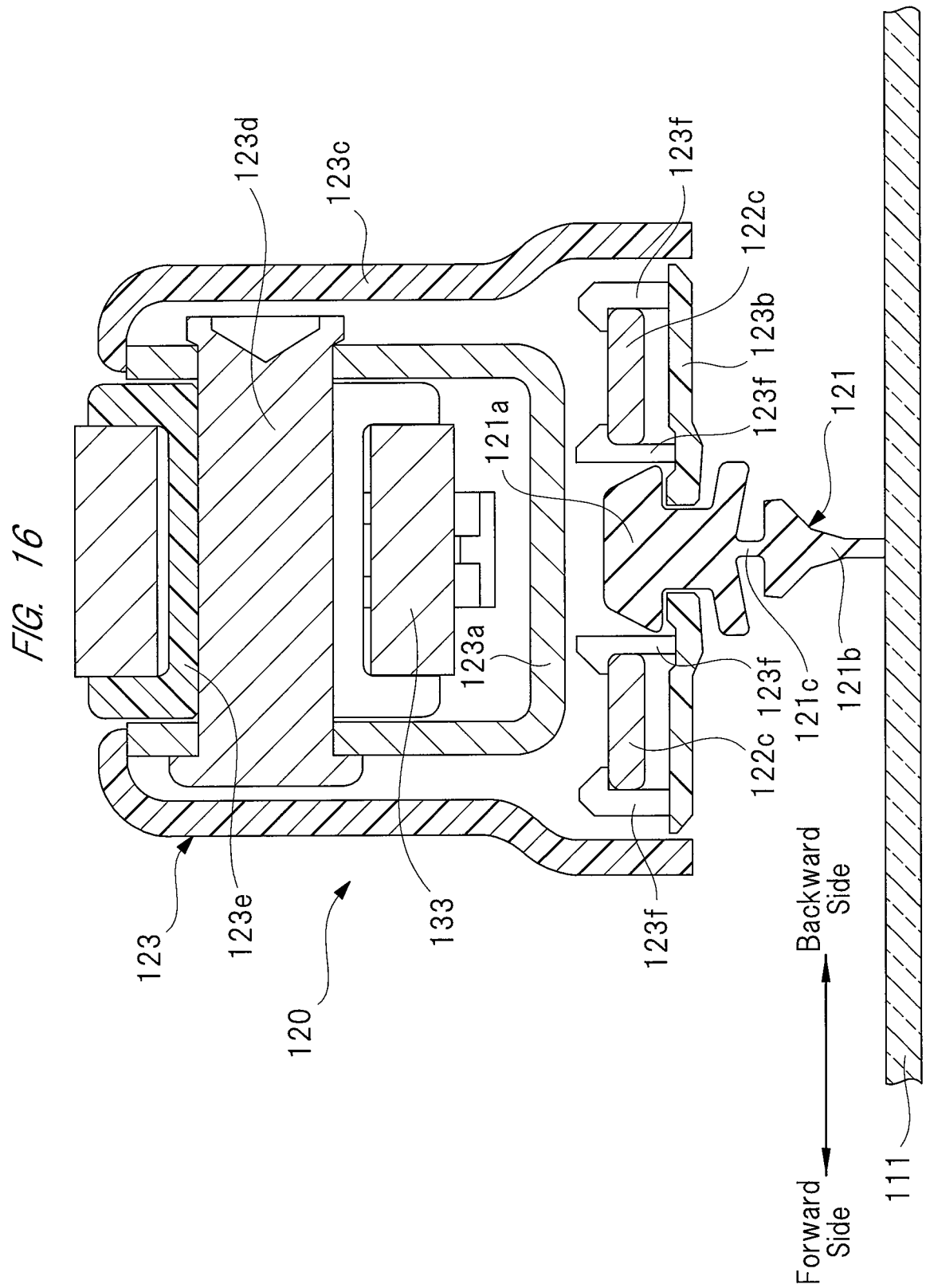
FIG. 16 is a sectional view taken along a B-B line of FIG. 13.
Figure 19:
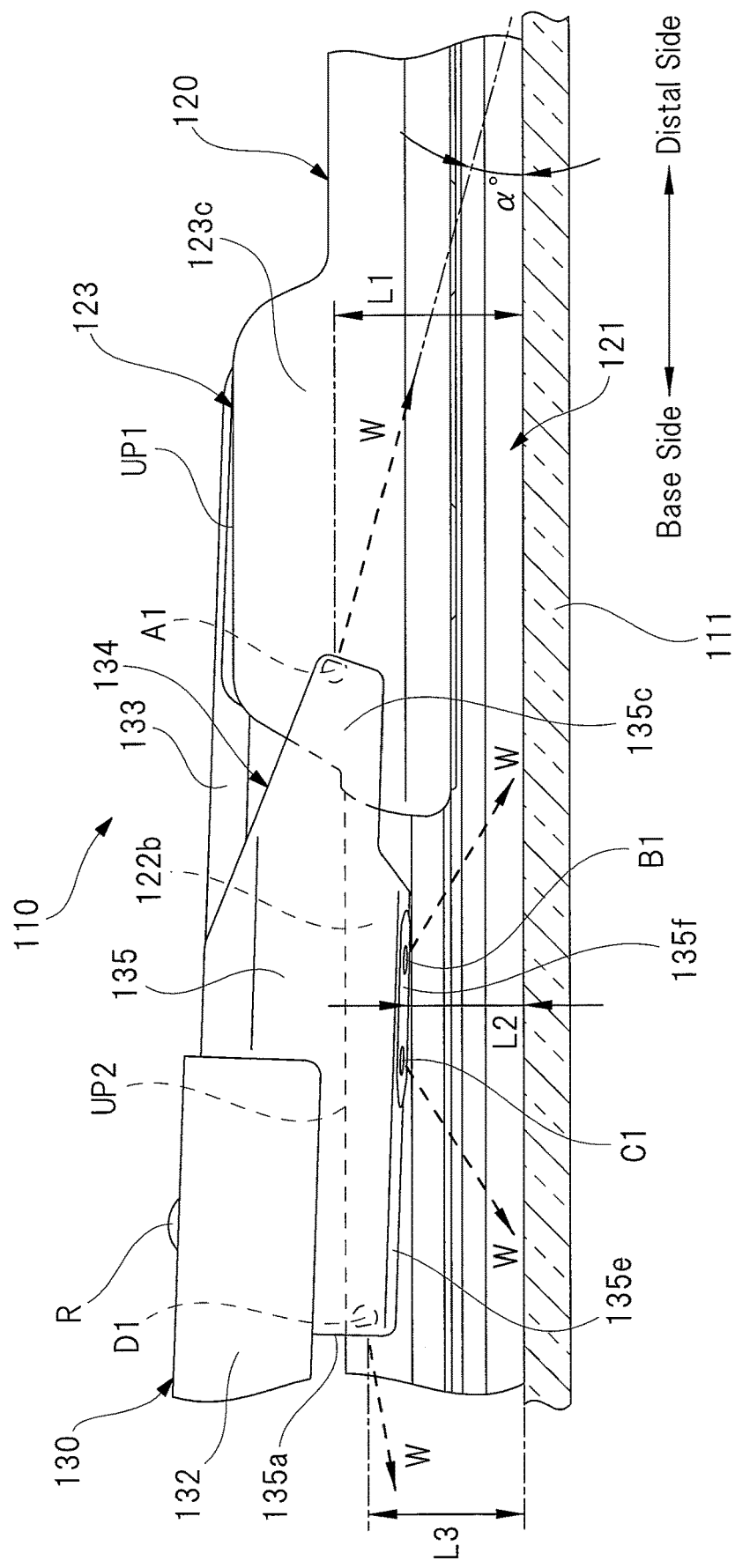
FIG. 19 is a view on an arrow "C" of FIG. 13.

FIG. 12 is an overall perspective view of a wiper apparatus according to a second embodiment; FIG. 13 is an enlarged perspective view of a surrounding portion of a connecting portion, seen from its front side; FIG. 14 is an enlarged perspective view of the surrounding portion of the connecting portion, seen from its back side; FIG. 15 is a sectional view taken along an A-A line of FIG. 12; FIG. 16 is a sectional view taken along a B-B line of FIG. 13; FIG. 17A is a perspective view of a nozzle unit; FIG. 17B is a perspective view of the nozzle unit; FIG. 18A is a perspective view explaining the structure of a pipeline in the nozzle unit; FIG. 18B is a perspective view explaining the structure of the pipelines in the nozzle unit; and FIG. 19 is a view on an arrow "C" of FIG. 13.

As shown in FIG. 12, a wiper apparatus 110 includes a wiper blade 120 and a wiper arm 130. The wiper blade 120 is rotatably fitted to a front end side of the wiper arm 130, and moved in sliding contact with a windshield (surface to be wiped) 111 disposed on the front side of a vehicle such as automotive vehicle. A base end side of the wiper arm 130 is fixed to a pivot shaft (not shown) disposed on the front side of the vehicle. When switching on a wiper switch (not shown) in the vehicle interior to rotate a wiper motor (not shown), the pivot shaft is driven in a swinging manner. As a result, the wiper apparatus 110 makes reciprocating wiping actions in both forward-path direction and the backward-path direction in a predetermined wiping range AR formed on the windshield 111, as indicated by arrows in FIG. 12.

As shown in FIGS. 1 to 7, the wiper blade 120 has a blade rubber 121 in contact with the windshield 111, a holder member 122 holding the blade rubber 121, and a connecting member 123 formed on the middle portion of the holder member 122 in the longitudinal direction. Both ends of the holder member 122 in the longitudinal direction are respectively fitted with a pair of end caps CP. The end caps CP prevent the blade rubber 121 from coming off from the holder member 122.

As shown in FIGS. 12 and 16, the blade rubber 121 has a main body portion 121a held by the holder member 122, a lip portion 121b brought in contact with the windshield 111, and a neck portion 121c connecting the main body portion 121a to the lip portion 121b. The blade rubber 121 is formed into an elongated shape by extrusion molding an elastic material such as rubber, and has a sectional shape which is uniform across the entire part of the blade rubber 121 along the longitudinal direction.

The thickness of the neck portion 121c along the moving direction of the blade rubber 121 (left-hand and right-hand directions in figures) is determined to be smaller than that of the main body portion 121a and that of the lip portion 121b. This allows the neck portion 121c to elastically deform easily. As a result, when the wiper blade 120 is moved toward the forward-side and the backward-side on the windshield 111, the lip portion 121b is allowed to be tilted, permitting its front end side to smoothly follow the main body portion 121a in the moving direction of the wiper blade 120. The wiper blade 120 is thus able to certainly wipe off foreign substance such as rainwater and dust (not shown) from the windshield 111.

As shown in FIGS. 5 and 6, the holder member 122 has a holder main body 122a and a fin portion 122b. The holder main body 122a and the fin portion 122b are molded into an integrated structure by double-molding materials different in hardness from each other, similar to the blade rubber 121, and formed into an elongated shape.

The holder main body 122a is made of flexible resin material such as plastic which gives the holder main body 122a sufficient strength which allows it to hold the main body portion 121a of the blade rubber 121 and allows the holder main body 122a to follow the curved surface (not shown) of the windshield 111. On the other hand, the fin portion 122b is made of elastic material such as rubber which has hardness lower than that of the holder main body 122a. Aerodynamic drag acting on the fin portion 122b creates a downward force acting on the wiper blade 120. This downward force keeps the blade rubber 121 capable of exerting high wiping capability.

In the holder main body 122a, a pair of vertebras 122c is arranged at a predetermined interval. The vertebras 122c are each made of a steel plate having spring property, and they are set mirror symmetric such that one vertebra 122c on the forward-side and the other vertebra 122c on the backward-side sandwich the main body portion 121a of the blade rubber 121. Each vertebra 122c in its natural state with no external force applied thereto is curved at a curvature which is larger than that of the windshield 111, causing the holder member 122 and the blade rubber 121 to be elastically deformed in conformity to the curvature of the windshield 111. As a result, the entire part of the lip portion 121b in the longitudinal direction is stuck firmly to the windshield 111.

As shown in FIGS. 12 and 16, the connecting member 123 is formed on the middle portion of the holder member 122 in the longitudinal direction. The connecting member 123 has a connecting body 123a, a base plate 123b, and a cover member 123c. The connecting body 123a is formed by press working a steel plate into a structure having a substantially U-shaped section, and caulking-fixed to the vertebras 122c with fixing legs (not shown) formed integrally with the connecting body 123a.

A columnar pin 123d made of steel is caulking-fixed to the connecting body 123a. To this columnar pin 123d, a hook fixing member 123e made of resin material such as plastic is rotatably attached. To this hook fixing member 123e, an arm piece 133 fitted to the front end side of the wiper arm 130 (see FIG. 13) is connected at one touch. Each of the columnar pin 123d and the hook fixing member 123e forms part of a connecting portion 123.

The base plate 123b which is made of resin material such as plastic and formed into a tabular shape, is attached to the vertebras 122c with fixing legs 123f formed integrally with the base plate 123b. The connecting body 123a is located closer to the fin portion 122b (front side) of the holder member 122, while the base plate 123b is located closer to the holder main body 122a (back side) of the holder member 122.

The cover member 123c which is made of resin material such as plastic and substantially formed into a box shape, is attached to the exterior of the connecting body 123a with a plurality of engaging claws (not shown) formed integrally with the cover member 123c. The cover member 123c covers up the side faces, etc., of the connecting body 123a, thereby giving the wiper blade 120 a better appearance.

As shown in FIGS. 12 and 13, the wiper arm 130 has an arm head 131, an arm shank 132, and the arm piece 133. The arm head 131 is formed into a predetermined shape by casting, etc. The base end side of the arm head 131 (on the right in FIG. 12) is fixed to the pivot shaft (not shown). To the front end side of the arm head 131 (on the left in FIG. 12), on the other hand, the base end side of the arm shank 132 is rotatably fitted. Between the arm shank 132 and the arm head 131, a tensile spring (not shown) is provided, and the tensile spring applies its spring force to the arm shank 132, thereby pressing it against the windshield 111.

The arm shank (retainer) 132 is formed into a long bar-like shape with a substantially U-shaped section, by press working a steel plate. Aa well as the tensile spring described above, a forward-side washer tube WC1 and a backward-side washer tube WC2 are housed and arranged within the arm shank 132. One end side of each of the washer tubes WC1 and WC2 is led into an engine room of the vehicle via the arm head 131, and connected to a washer device (not shown). On the other hand, the other end side of each of the washer tubes WC1 and WC2 are connected to the nozzle unit 134 fixed to the arm piece 133. In this manner, the washer tubes WC1 and WC2 are laid along the interior of the arm shank 132 and thus concealed. This gives the wiper apparatus 110 a better appearance.

The arm piece 133 is formed into a predetermined shape by press working of steel. The front end side of the arm piece 133 is substantially formed into a U-shape, and connected to the hook fixing member 123e at one touch. The base end side of the arm piece 133 is fixed to the interior of the front end side of the arm shank 132 with a pair of rivets "R". As described above, the arm shank 132 made of a steel plate, and the arm piece 133 made of steel are firmly riveted together to keep them fixed without rattling.

To the arm piece 133, the nozzle unit 134 is fixed with a fixing screw (not shown). As shown in FIG. 13, the fixing screw is screwed into a screw hole "H" from the lower side of this figure, that is, from the same side as the wiper blade 120. As well as this screw hole "H", the arm piece 133 and the nozzle unit 134 are partially covered with the arm shank 132, thereby giving the surrounding of the nozzle unit 134 of the wiper apparatus 110 a neat and better appearance.

As described above, the nozzle unit 134 is fixed to the arm piece 133 fitted to the hook fixing member 123e, and therefore disposed closer to the hook fixing member 123e. Near the hook fixing member 123e, the nozzle unit 134 is fixed firmly to the arm piece 133 with the fixing screw, so that the positional shift of the nozzle unit 134 relative to the wiper blade 120 is reduced to the minimum.

As shown in FIG. 17, the nozzle unit 134 is formed by injection molding of resin material such as plastic into a predetermined shape. The nozzle unit 134 has a forward-side block 135 and a backward-side block 136.

The base end side of the forward-side block 135 (on the right in figures) is provided with a forward-side first wall 135a directed to the base end side of the wiper blade 120 in the longitudinal direction. The forward-side first wall 135a is integrally provided with a forward-side plug-in portion 135b which is plugged into the other end portion of the forward-side washer tube WC1 (see FIG. 13). On the other hand, the front end side of the forward-side block 135 (on the left in figures) is integrally provided with a forward-side arm 135c which is gradually tapered toward a front end side thereof. The forward-side arm 135c is integrally provided with a forward-side second wall 135d directed to the front end side of the wiper blade 120 in the longitudinal direction.

A forward-side counter surface 135e is formed between the forward-side first wall 135a and the forward-side second wall 135d of the forward-side block 135, and directed to the windshield 111. A forward-side nozzle cap 135f is disposed on a portion of the forward-side counter surface 135e, which is closer to the forward-side second wall 135d.

On the forward-side second wall 135d, a forward-side first injection nozzle A1 is formed, as shown in FIG. 17A. The forward-side first injection nozzle A1 constitutes and functions as "front end nozzle" in the present invention, and it is directed to the front end side of the wiper blade 120 in the longitudinal direction. In this manner, the forward-side first injection nozzle A1 jets washer fluid "W" onto an injection-target location A2 on the windshield 11 shown in FIG. 21 when the wiper blade 120 makes a wiping action along the forward path. In other words, the forward-side first injection nozzle A1 is disposed on the front end side of the blade rubber 121 in the longitudinal direction, and so that it can jet washer fluid to an area on the forward path to wet the area.

On the forward-side nozzle cap 135f, a forward-side second injection nozzle B1 and a forward-side third injection nozzle C1 are formed, as shown in FIG. 17B. The forward-side second injection nozzle B1 and the forward-side third injection nozzle C1 are directed to the center portion of the wiper blade 120 in the longitudinal direction. In this manner, the forward-side second injection nozzle B1 and the forward-side third injection nozzle C1 jet washer fluid "W" onto injection-target locations B2 and C2 on the windshield 11 shown in FIG. 21, respectively, when the wiper blade 120 makes a wiping action along the forward path. In other words, the forward-side second injection nozzle B1 and the forward-side third injection nozzle C1 are disposed on the center portion of the blade rubber 121 in the longitudinal direction, and so that it can jet washer fluid to an area on the forward path to wet the area.

On the forward-side first wall 135a, a forward-side fourth injection nozzle D1 is formed, as shown in FIG. 17B. The forward-side fourth injection nozzle D1 constitutes and functions as "base end nozzle" in the present invention, and it is directed to the base end side of the wiper blade 120 in the longitudinal direction. In this manner, the forward-side fourth injection nozzle D1 jets washer fluid "W" onto an injection-target location D2 on the windshield 11 shown in FIG. 21 when the wiper blade 120 makes a wiping action along the forward path. In other words, the forward-side fourth injection nozzle D1 is disposed on the base end portion of the blade rubber 121 in the longitudinal direction, and so that it can jet washer fluid to an area on the forward path to wet the area.

In this case, an "eyeball type nozzle" capable of varying the injection-target locations of washer fluid "W" is adopted as the forward-side first injection nozzle (first-end-side nozzle) A1 and the forward-side fourth injection nozzle (base-end-side nozzle) D1. In particular, the injection-target locations of the forward-side first injection nozzle A1 and the forward-side fourth injection nozzle D1 can be adjusted by using a needle, etc. so as to pivotally support the nozzle. In this manner, this allows the injection-target locations of the forward-side first injection nozzle A1 and the forward-side fourth injection nozzle D1 to be optimized according to the length of the wiper blade 120 (short or long version of the wiper blade 120) attached to the wiper arm 130.

On the base end side of the backward-side block 136 (on the right in figures), a backward-side first wall 136a is formed, which is directed to the base end side of the wiper blade 120 in the longitudinal direction. The backward-side first wall 136a has a backward-side plug-in portion 136b formed integrally thereon, which is plugged into the other end portion of the backward-side washer tube WC2 (see FIG. 13). On the front end side of the backward-side block 136 (on the left in figures), a backward-side arm 136c is formed integrally thereon, which gradually tapers toward its front end side. The backward-side arm 136c has a backward-side second wall 136d directed to the front end side of the wiper blade 120 in the longitudinal direction.

Between the backward-side first wall 136a and the backward-side second wall 136d of the backward-side block 136, a backward-side counter surface 136e is formed, which is counter to the windshield 11. On the same side of the backward-side counter surface 136e as the backward-side first wall 136a, a backward-side nozzle cap 136f is disposed. A jig (not shown) is used to form a washer fluid channel (not shown) inside the backward-side block 136. Use of such a jig forms an opening (not shown) on the backward-side counter surface 136e. The backward-side nozzle cap 136f blocks this opening.

On the backward-side second wall 136d, a backward-side first injection nozzle E1 is formed, as shown in FIG. 17A. The backward-side first injection nozzle E1 constitutes and functions as "first end nozzle", and it is directed to the front end side of the wiper blade 120 in the longitudinal direction. In this manner, the backward-side first injection nozzle E1 jets washer fluid "W" onto an injection-target location E2 on the windshield 11 shown in FIG. 21 when the wiper blade 120 makes a wiping action along the backward path. In other words, the backward-side first injection nozzle E1 is disposed on the front end side of the blade rubber 121 in the longitudinal direction, and so that it can jet washer fluid to an area on the backward path to wet the area.

On the backward-side nozzle cap 136f, a backward-side second injection nozzle F1 and a backward-side third injection nozzle G1 are formed, as shown in FIG. 17B. The backward-side second injection nozzle F1 and the backward-side third injection nozzle G1 are directed to the center portion of the wiper blade 120 in the longitudinal direction. In this manner, the backward-side second injection nozzle F1 and the backward-side third injection nozzle G1 jet washer fluid "W" onto injection-target locations F2 and G2 on the windshield 11 shown in FIG. 121, respectively, when the wiper blade 120 makes a wiping action along the backward path. In other words, the backward-side second injection nozzle F1 and the backward-side third injection nozzle G1 are disposed on the center portion of the blade rubber 121 in the longitudinal direction, and so that it can jet washer fluid to an area on the backward path to wet the area.

On the backward-side first wall 136a, a backward-side fourth injection nozzle H1 is formed, as shown in FIG. 17B. The backward-side fourth injection nozzle H1 constitutes and functions as "base end nozzle", and it is directed to the base end side of the wiper blade 120 in the longitudinal direction. In this manner, the backward-side fourth injection nozzle H1 jets washer fluid "W" onto an injection-target location H2 on the windshield 11 shown in FIG. 21 when the wiper blade 120 makes a wiping action along the backward path. In other words, the backward-side fourth injection nozzle H1 is disposed on the front end side of the blade rubber 121 in the longitudinal direction, and so that it can jet washer fluid to an area on the backward path to wet the area.

In this case, an "eyeball type nozzle" capable of varying the injection-target locations of washer fluid "W" is adopted as the backward-side first injection nozzle (first end nozzle) E1 and the backward-side fourth injection nozzle (base end nozzle) H1. The backward-side first injection nozzle E1 and the backward-side fourth injection nozzle H1 thus each serves as a variable nozzle of the present invention. The injection-target locations of the backward-side first injection nozzle E1 and the backward-side fourth injection nozzle H1 can be adjusted by using a needle, etc. so as to pivotally support the nozzle. This allows the injection-target locations of the backward-side first injection nozzle E1 and the backward-side fourth injection nozzle H1 to be optimized according to the length of the wiper blade 120 (short or long version of the wiper blade 120) attached to the wiper arm 130.

In this manner, injection-target locations of the forward-side first injection nozzle A1, the forward-side fourth injection nozzle D1, the backward-side first injection nozzle E1, and the backward-side fourth injection nozzle H1 are made adjustable, and the forward-side nozzle cap 135f is disposed on the same side of the forward-side counter surface 135e as the forward-side second wall 135d, while the backward-side nozzle cap 136f is disposed on the same side of backward-side counter surface 136e as the backward-side first wall 136a. As a result, the injection-target locations A2 to H2 (eight injection-target locations) are arranged in oblique line areas in FIG. 11 such that the forward-side injection-target locations and the backward-side injection-target locations alternate.

In addition, the forward-side first injection nozzle A1 to the forward-side fourth injection nozzle D1 (four nozzles) are so positioned that they can wet relatively wide areas which are inside the wiping range AR and which are on the forward side, with washer fluid "W" (see FIG. 9). The backward-side first injection nozzle E1 to the backward-side fourth injection nozzle H1 (four nozzles) are so positioned that they can wet relatively wide areas that are inside the wiping range AR and that are on the backward side, with washer fluid "W" (see FIG. 10). In addition, a divergent nozzle capable of jetting mist of washer fluid "W" may be used, and in this case, wider area inside the wiping range AR can be wetted with smaller amount of washer fluid "W".

When switching on a washer switch (not shown), the washer device is brought into operation for supplying washer fluid "W" to the forward-side block 135 and the backward-side block 136 via the washer tubes WC1 and WC2, as indicated by a broken line arrow in FIG. 12. An operation direction of the washer device is switched so that washer fluid "W" is supplied to the forward-side block 135 only when the wiper blade 120 makes a wiping action along the forward path, and to the backward-side block 136 only when the wiper blade 120 makes a wiping action along the backward path.

A connecting portion 137 is formed between the forward-side block 135 and the backward-side block 136 of the nozzle unit 134, that is, between the forward-side first to fourth injection nozzles A1 to D1 and the backward-side first to fourth injection nozzles E1 to H1. The connecting portion 137 has a function of connecting the forward-side block 35 to the backward-side block 136, and keeping them parallel with each other.

The connecting portion 137 has a concave portion 137a in which the arm piece 133 is fitted. The concave portion 137a opens in a direction opposite to the forward-side nozzle cap 135f and the backward-side nozzle cap 136f, and extends in a longitudinal direction of the wiper blade 120. In the concave portion 137a, a portion closer to the forward-side arm 135c and the backward-side arm 136c is formed with a screw insertion hole "P" which extends so as to penetrate the connecting portion 137 in a thickness direction thereof, and the fixing screw to be screwed in the screw hole "H" of the arm piece 133 is inserted in the screw insertion hole "P" (see FIG. 13).

On a portion of the nozzle unit 134 which is closer in its longitudinal direction to the forward-side plug-in portion 135b and backward-side plug-in portion 136b, a positioning recession 137b is formed, and the front end portion of the arm shank 132 is fitted in the positioning recession 137b, and the positioning recession 137b determines a position of the nozzle unit 134 relative to the arm shank 132. The positioning recession 137b is formed in such a way as to straddle the forward-side block 135 and backward-side block 136.

As described above, the positioning concave portion 137b formed to position the nozzle unit 134 relative to the arm shank 132 reduces a level difference between the nozzle unit 134 and the arm shank 132, thus giving them a better appearance. This configuration also allows the screw insertion hole "P" and the screw hole "H" (see FIG. 13) to be faced each other easily without a visual check when the wiper apparatus 110 is assembled, thus improving workability in assembling the wiper apparatus 110.

Inside the forward-side block 135 and the backward-side block 136, pipelines PL are placed, respectively, as shown FIGS. 18A and 18B. Respective pipelines PL of the forward-side block 135 and the backward-side block 136 are formed substantially into the same shape. The structure of the pipeline PL of the forward-side block 135 will therefore be described in detail as an example.

Washer fluid "W" flows through the pipeline PL having an inflow pipeline 138a, a front-end-side pipeline 138b, and a base-end-side pipeline 138c. Each of the inflow pipeline 138a, the front-end-side pipeline 138b, and the base-end-side pipeline 138c extends straight along the longitudinal direction of the wiper blade 120. The base-end-side pipeline 138c, the front-end-side pipeline 138b, and the inflow pipeline 138a are arranged parallel with each other in this order, with the base-end-side pipeline 138c being closet to the windshield 11 (on the lower side in FIG. 18).

The base end side of the inflow pipeline 138a opens to the forward-side plug-in portion 135b, the front end side of the front-end-side pipeline 138b opens to the forward-side second wall 135d, and the base end side of the base-end-side pipeline 138c opens to the forward-side first wall 135a. The front end side of the front-end-side pipeline 138b and the base end side of the base-end-side pipeline 138c are respectively provided with globular nozzle supports 138d and 138e. The forward-side first injection nozzle A1 and the forward-side fourth injection nozzle D1 are respectively rotatably attached inside the nozzle support 138d and the nozzle support 138e. In other words, the front-end-side pipeline 138b sends washer fluid "W" to the forward-side first injection nozzle A1, while the base-end-side pipeline 138c sends the same to the forward-side fourth injection nozzle D1.

The front end side of the inflow pipeline 138a, the base end side of the front-end-side pipeline 138b, and the front end side of the base-end-side pipeline 138c are connected to each other via a connection pipeline 139, which sends a branch of washer fluid "W" having flowed into the inflow pipeline 138a to the front-end-side pipeline 138b and to the base-end-side pipeline 138c. The connection pipeline 139 has a section of a long-hole shape, and extends in a direction substantially perpendicular to the extension direction of the inflow pipeline 138a, the front-end-side pipeline 138b, and the base-end-side pipeline 138c. The long-hole sectional shape of the connection pipeline 139 has sides along the longitudinal direction of the wiper blade 120 that are longer than sides along the direction perpendicular to the longitudinal direction of the wiper blade 120. In other words, the inflow pipeline 138a, the front-end-side pipeline 138b, and the base-end-side pipeline 138c extend along the longitudinal direction of the long-hole sectional shape of the connection pipeline 139. This prevents an increase in the width of the nozzle unit 134 in the direction perpendicular to the longitudinal direction of the wiper blade 120, thus preventing the wiper blade 120 from blocking the driver's field of view upon making a reciprocating wiping action.

The inflow pipeline 138a and the front-end-side pipeline 138b are connected to the connection pipeline 139 from its sides. The area of an overlapped portion between the inflow pipeline 138a and the connection pipeline 139 in a view of the inflow pipeline 138a in the direction perpendicular to the direction of its extension is larger than the channel area of the inflow pipeline 138a. The area of an overlapped portion between the front-end-side pipeline 138b and the connection pipeline 139 in a view of the front-end-side pipeline 138b in the direction perpendicular to the direction of its extension is larger than the channel area of the front-end-side pipeline 138b. When the inflow pipeline 138a and the front-end-side pipeline 138b are seen in the direction of their extension, the inflow pipeline 138a and front-end-side pipeline 138b are connected to the connection pipeline 139 such that each of them partially overlaps the connection pipeline 139. In other words, the inflow pipeline 138a and the front-end-side pipeline 138b are connected to the connection pipeline 139 such that the inflow pipeline 138a and the front-end-side pipeline 138b are offset to each other in a direction perpendicular to the extension direction of the inflow pipeline 138a and the front-end-side pipeline 138b. The inflow pipeline 138a and the front-end-side pipeline 138b are thus connected to the connection pipeline 139 via their respective large opening areas. As a result, the flow of washer fluid "W" from the inflow pipeline 138a to the connection pipeline 139 and the flow of washer fluid "W" from the connection pipeline 139 to the front-end-side pipeline 138b are not restricted and are therefore kept smooth.

As shown in FIG. 18A, the nozzle unit 134 is shaped such that the backward side (side closer to the connecting portion 137) of the forward-side block 135 has a larger thickness, while the forward-side arm 135c has a smaller thickness. The inflow pipeline 138a, which has a larger diameter, is connected to the connection pipeline 139 on its backward side in the direction perpendicular to the extension direction of the connection pipeline 139, while the front-end-side pipeline 138b, which has a smaller diameter, is connected to the connection pipeline 139 on its forward side in the direction perpendicular to the extension direction of the connection pipeline 139. This arrangement prevents a drop in the rigidity of the nozzle unit 134. In addition, the inflow pipeline 138a has a channel area larger than that of the front-end-side pipeline 138b and of the base-end-side pipeline 138c. As a result, the flow of washer fluid "W" is not restricted in the inflow pipeline 138a, which is on the upstream side of the pipeline PL. This allows washer fluid "W" to be delivered certainly to the front-end-side pipeline 138b and to the base-end-side pipeline 138c.

The base-end-side pipeline 138c is connected to the connection pipeline 139, is aligned with the connection pipeline 139, and not lateral to the connection pipeline 139. This allows washer fluid "W" to flow smoothly from the connection pipeline 139 to the base-end-side pipeline 138c.

A slide jig (not shown) is used when the connection pipeline 139 is formed. As a result, an opening 139a is formed on the forward-side counter surface 135e. The opening 139a of the connection pipeline 139 is blocked with the forward-side nozzle cap 135f. In this embodiment, the forward-side nozzle cap 135f having the forward-side second injection nozzle B1 and the forward-side third injection nozzle C1 is used as a cap that blocks the opening 139a. The opening 139a is thus given a function of jetting washer fluid "W". Depending on the specification of the wiper apparatus 110, a simple cap (not shown) not having the forward-side second injection nozzle B1 and the forward-side third injection nozzle C1 may be used.

In addition, as shown in FIGS. 18A and 18B, the position of the connection pipeline 139 of the pipeline PL in the forward-side block 135 and the position of the connection pipeline 139 of the pipeline PL in the backward-side block 136 are shifted to each other in the longitudinal direction of the wiper blade 120. As a result, the forward-side nozzle cap 135f is disposed on the same side of the forward-side counter surface 135e as the forward-side second wall 135d, and the backward-side nozzle cap 136f is disposed on the same side of the backward-side counter surface 136e as the backward-side first wall 136a. Because of this arrangement, the front-end-side pipeline 138b of the forward-side block 135 is made shorter than that of the backward-side block 136, while the inflow pipeline 138a and the base-end-side pipeline 138c of the forward-side block 135 are respectively made longer than those of the backward-side block 136.

What will be described next is the positional relation of the forward-side first injection nozzle A1 to the forward-side fourth injection nozzle D1 of the forward-side block 135 to the wiper blade 120 and the positional relation of the backward-side first injection nozzle E1 to the backward-side fourth injection nozzle H1 of the backward-side block 136 to the wiper blade 120.

As shown in FIG. 19, when the wiper apparatus 110 is set facedown on the windshield 111 (wiping state), the front end side of the forward-side arm 135c of the forward-side block 135 extends up to a position at which the front end side overlaps the cover member 123c in the wiping direction of the wiper blade 120. As a result, the forward-side first injection nozzle A1 formed on the forward-side block 135 is located at a position whose distance to the windshield 111 is L1 and which is closer to the windshield 111 than the upper end UP1 of the cover member 123c, the upper end UP1 being the most distant part of the cover member 123c to the windshield 111. In other words, the forward-side first injection nozzle A1 is located within a range of projection of the connecting portion 123 in a view of the wiper blade 120 in its wiping direction. The forward-side first injection nozzle A1 is also located more distant to the windshield 111 than the upper end UP2 of the fin 122b of the wiper blade 120, the upper end UP2 being the most distant part of fin 122b to the windshield 111.

The forward-side counter surface 135e of the forward-side block 135 is located at a position at which the forward-side counter surface 135e overlaps the fin 122b of the wiper blade 120 in its wiping direction. As a result, the forward-side second injection nozzle B1 and the forward-side third injection nozzle C1 formed on the forward-side nozzle cap 135f are located at a position whose distance to the windshield 111 is L2 (L2<L1) and which is closer to the windshield 111 than the upper end UP2 of the fin 122b of the wiper blade 120, the upper end UP2 being the most distant part of the fin 122b to the windshield 111. In other words, the forward-side second injection nozzle B1 and the forward-side third injection nozzle C1 are located within a range of projection of the fin 122b in a view of the wiper blade 120 in its wiping direction.

The forward-side fourth injection nozzle D1 formed on the forward-side first wall 135a of the forward-side block 135 is located at a position whose distance to the windshield 111 is L3 (L2<L3<L1) and which is closer to the windshield 111 than the upper end UP2 of the fin 122b of the wiper blade 120, the upper end UP2 being the most distant part of the fin 122b to the windshield 111. In other words, the forward-side fourth injection nozzle D1 is located within a range of projection of the fin 122b in a view of the wiper blade 120 in its wiping direction.

As described above, the forward-side first injection nozzle A1 is located at the position that is between the upper end UP2 of the fin 122b and the upper end UP1 of the cover member 123c and that is within a range of projection of the cover member 123c in a view of the wiper blade 120 in its wiping direction. As a result, the forward-side first injection nozzle A1 is sufficiently separated away from the windshield 111 to create a large injection angle α° of washer fluid "W" against the windshield 111.

The forward-side first injection nozzle A1 is located on the same side as the cover member 123c, while the forward-side second injection nozzle B1 to the forward-side fourth injection nozzle D1 are located on the same side as the fin 122b. As a result, washer fluid "W" jetted out of these nozzles is hardly subjected to the effect of aerodynamic draft, etc., caused by the running vehicle.

Figure 20:
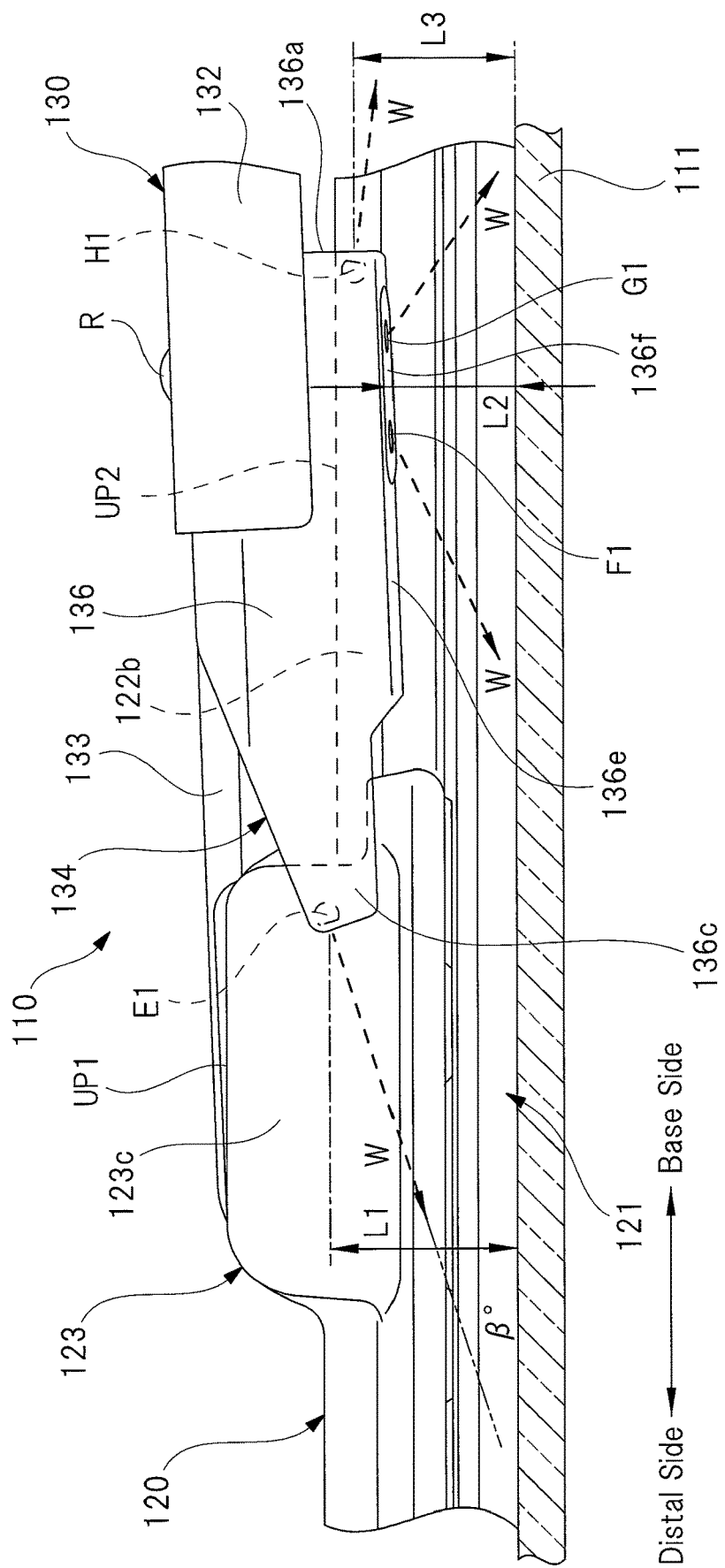
FIG. 20 is a view on an arrow "D" of FIG. 13.

As shown in FIG. 20, when the wiper apparatus 110 is set facedown on the windshield 111 (wiping state), the front end side of the backward-side arm 136c of the backward-side block 136 extends up to a position at which the front end side overlaps the cover member 123c in the wiping direction of the wiper blade 120. As a result, the backward-side first injection nozzle E1 formed on the backward-side block 136 is located at a position whose distance to the windshield 111 is L1 and which is closer to the windshield 111 than the upper end UP1 of the cover member 123c, the upper end UP1 being the most distant part of the cover member 123c to the windshield 111. In other words, the backward-side first injection nozzle E1 is located within the range of projection of the connecting portion 123 in a view of the wiper blade 120 in its wiping direction. The backward-side first injection nozzle E1 is also located more distant to the windshield 111 than the upper end UP2 of the fin 122b of the wiper blade 120, the upper end UP2 being the most distant part of fin 122b to the windshield 111.

The backward-side counter surface 136e of the backward-side block 136 is located at a position at which the backward-side counter surface 136e overlaps the fin 122b of the wiper blade 120 in its wiping direction. As a result, the backward-side second injection nozzle F1 and the backward-side third injection nozzle G1 formed on the backward-side nozzle cap 136f are located at a position whose distance to the windshield 111 is L2 (L2<L1) and which is closer to the windshield 111 than the upper end UP2 of the fin 122b of the wiper blade 120, the upper end UP2 being the most distant part of the fin 122b to the windshield 111. In other words, the backward-side second injection nozzle F1 and the backward-side third injection nozzle G1 are located within the range of projection of the fin 122b in a view of the wiper blade 120 in its wiping direction.

The backward-side fourth injection nozzle H1 formed on the backward-side first wall 136a of the backward-side block 136 is located at a position whose distance to the windshield 111 is L3 (L2<L3<L1) and which is closer to the windshield 111 than the upper end UP2 of the fin 122b of the wiper blade 120, the upper end UP2 being the most distant part of the fin 122b to the windshield 111. In other words, the backward-side fourth injection nozzle H1 is located within the range of projection of the fin 122b in a view of the wiper blade 120 in its wiping direction.

As described above, the backward-side first injection nozzle E1 is located at a position which is between the upper end UP2 of the fin 122b and the upper end UP1 of the cover member 123c and that is within the range of projection of the cover member 123c in a view of the wiper blade 120 in its wiping direction. As a result, the backward-side first injection nozzle E1 is sufficiently separated away from the windshield 111 to create a large injection angle $\beta°$ of washer fluid "W" against the windshield 111.

The injection angle $\beta°$ of washer fluid "W" of the backward-side first injection nozzle E1 against the windshield 111 is determined to be slightly larger than the injection angle $\alpha°$ of washer fluid "W" of the forward-side first injection nozzle A1 against the windshield 111 ($\beta°>\alpha°$). This is because that the injection-target location A2 of the forward-side first injection nozzle A1 is closer to the outer periphery of the wiping range AR than the injection-target location E2 of the backward-side first injection nozzle E1 as shown FIG. 21.

Next, an operation of the wiper apparatus 110 configured in the above manner will be described in detail with reference to the drawings.

[Wiping Action Along Forward Path]

Figure 21:
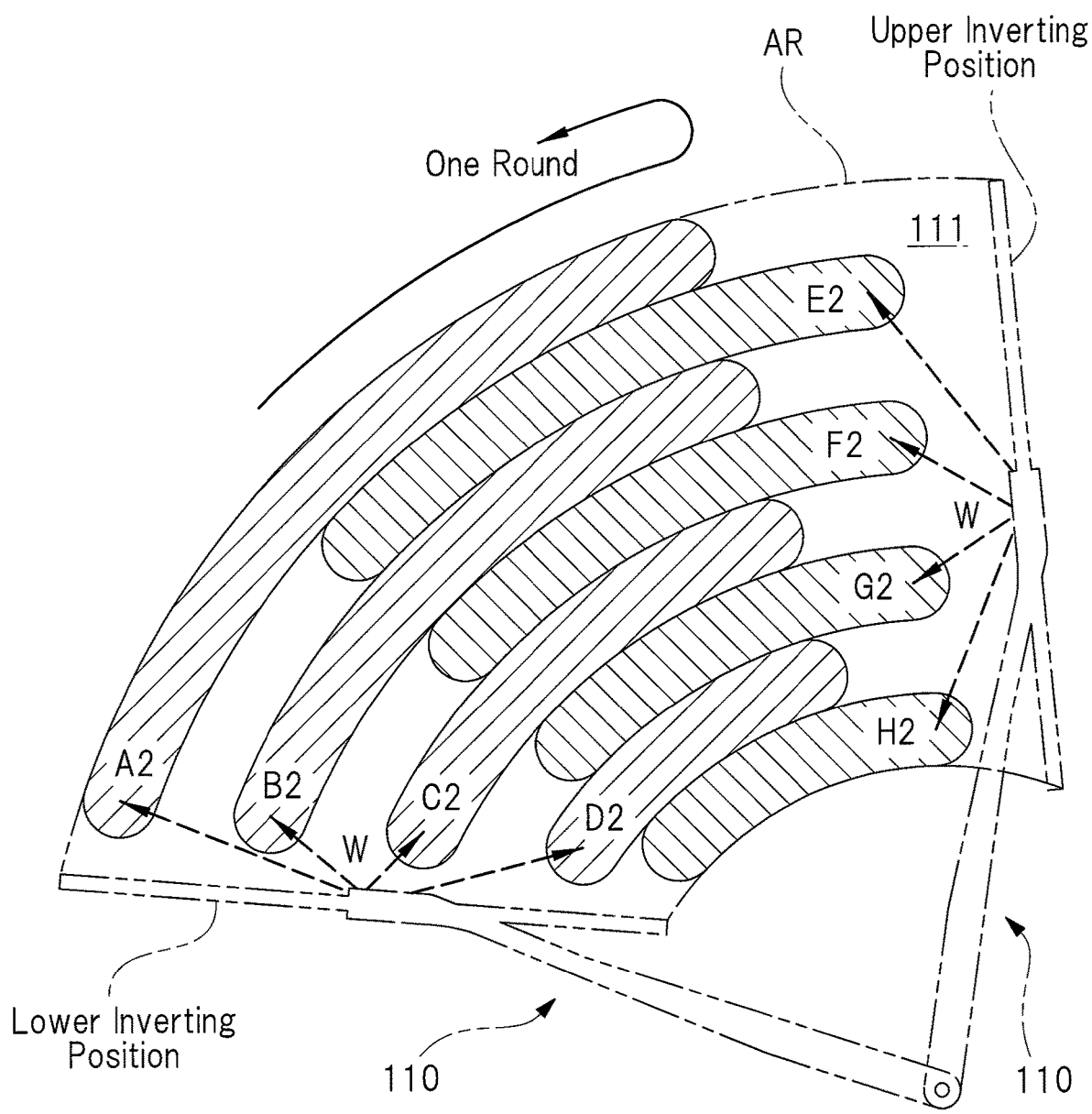
FIG. 21 is an explanatory view of the injection-target locations (A2 to H2) of washer fluid.

A wiping action along the forward path is an action such that the wiper blade 120 is moved upward from a lower return position up to an upper return position in the wiping range AR on the windshield 111 as shown in FIG. 21.

With the wiper blade 120 moved in the forward path direction as shown in FIG. 121, when switching on the washer switch, washer fluid "W" is jetted from the forward-side first to fourth injection nozzles A1 to D1 (see FIGS. 14 and 19). As a result, washer fluid "W" wets the injection-target locations A2 to D2, and washer fluid "W" is somewhat carried by vehicle's aerodynamic drag and the like to areas between the injection-target locations A2 and B2, between the injection-target locations B2 and C2, and between the injection-target locations C2 and D2. This prevents a problem caused by the wiper blade 120 in contact with the windshield 111 in its dry state, that is, a problem of scratches on the windshield 111 or the partial wear of the blade rubber 121. Thus, the wind shield 111 is wetted with washer fluid "W", which allows foreign substance such as dust on the windshield 111 to be wiped out completely.

[Wiping Action Along Backward Path]

A wiping action along the backward path is an action such that the wiper blade 120 is moved downward from the upper return position up to the lower return position in the wiping range AR on the windshield 111, as shown in FIG. 21.

When switching on the washer switch with the wiper blade 120 moved in the backward path direction, as shown in FIG. 21, washer fluid "W" is jetted out of the backward-side first injection nozzle E1 to the backward-side fourth injection nozzle H1 (see FIGS. 14 and 20). As a result, washer fluid "W" wets the injection-target locations E2 to H2, wherein the injection-target locations E2 to H2 cover areas between the injection-target locations A2 and B2, between the injection-target locations B2 and C2, and between the injection-target locations C2 and D2, which are the areas not wetted sufficiently during the wiping action along the forward path. Hence, as shown in FIG. 21, the windshield 111 is uniformly wetted and wiped through one reciprocating stroke of the wiping action by the blade rubber 121 (wiper blade 120), which is therefore able to completely wipe off dust and the like from the windshield 111.

In addition, areas other than the injection-target locations E2 to H2 of FIG. 10 are wetted during the wiping action along the backward path and are further wetted with a bit of washer fluid "W" carried to the areas by vehicle's aerodynamic draft, etc. As a result, a problem caused by the wiper blade 120 in contact with the windshield 111 in its dry state is prevented also during the wiping action along the backward path.

As described above in detail, according to the wiper apparatus 110 of this embodiment, the forward-side first injection nozzle A1 and the backward-side first injection nozzle E1 of the plurality of nozzles formed on the nozzle unit 134 are located within the range of projection of the connecting portion 123 in a view of the wiper blade 120 in its wiping direction. Because the thickness of the connecting portion 123 is greater than the that of the wiper blade 120, the forward-side first injection nozzle A1 and the backward-side first injection nozzle E1 can be separated from the windshield 111.

This increases the injection angles α° and β° of washer fluid "W" against the windshield 111, thus allowing stable injection of washer fluid "W" across a wide range along the longitudinal direction of the wiper blade 120. The forward-side first injection nozzle A1 and the backward-side first injection nozzle E1 are located the same side as the connecting portion 123. This puts the forward-side first injection nozzle A1 in particular at a position where it is hardly subjected to the effect of aerodynamic draft, etc., caused by the running vehicle.

According to the wiper apparatus 110 of this embodiment, the nozzles located within the range of projection of the connecting portion 123 are the forward-side first injection nozzle A1 and the backward-side first injection nozzle E1 which jet washer fluid "W" toward the front end side of the wiper blade 120 in the longitudinal direction. This allows washer fluid "W" to certainly reach the front end side of the wiper blade 120 in the longitudinal direction.

According to the wiper apparatus 110 of this embodiment, the forward-side block 135 and the backward-side block 136 respectively have the forward-side fourth injection nozzle D1 and the backward-side fourth injection nozzle H1, which jet washer fluid "W" toward the base end side of the wiper blade 120 in the longitudinal direction. This allows washer fluid "W" to certainly reach the base end side of the wiper blade 120 in the longitudinal direction.

According to the wiper apparatus 110 of this embodiment, the distance L1 from the forward-side first injection nozzle A1 and the backward-side first injection nozzle E1 to the windshield 111 is determined to be different from the distance L3 from the forward-side fourth injection nozzle D1 and the backward-side fourth injection nozzle H1 to the windshield 111 (L1>L3). This allows optimization of the injection-target locations A2, E2, D2, and H2 on the windshield 111.

According to the wiper apparatus 110 of this embodiment, each of the forward-side block 135 and the backward-side block 136 has the inflow pipeline 138a into which washer fluid "W" flows, the front-end-side pipeline 138b which sends washer fluid "W" to the forward-side first injection nozzle A1 and the backward-side first injection nozzle E1, and the base-end-side pipeline 138c which sends washer fluid "W" to the forward-side fourth injection nozzle D1 and the backward-side fourth injection nozzle H1. These pipelines 138a, 138b, and 138c are connected to each other via the connection pipeline 139. This simplifies the internal structure of the nozzle unit 134, thus reducing the manufacturing cost of the wiper apparatus 110.

According to the wiper apparatus 110 of this embodiment, the forward-side first injection nozzle A1 and the backward-side first injection nozzle E1 are located closer to the windshield 111 than the upper end UP1 of the connecting portion 123, the upper end UP1 being the most distant part of the connecting portion 123 to the windshield 111, while the forward-side fourth injection nozzle D1 and the backward-side fourth injection nozzle H1 are located closer to the windshield 111 than the upper end UP2 of the wiper blade 120, the upper end UP2 being the most distant part of the wiper blade 120 to the windshield 111. This puts the forward-side first injection nozzle A1 and the forward-side fourth injection nozzle D1 in particular at a position where they are hardly subjected to the effect of aerodynamic draft, etc., caused by the running vehicle.

Next, the third embodiment of the present invention will be described in detail with reference to the drawings, members and portions the same in function as those of the second embodiment are denoted by the same reference numbers, and the detail descriptions thereof are omitted in this embodiment.

Figure 22:
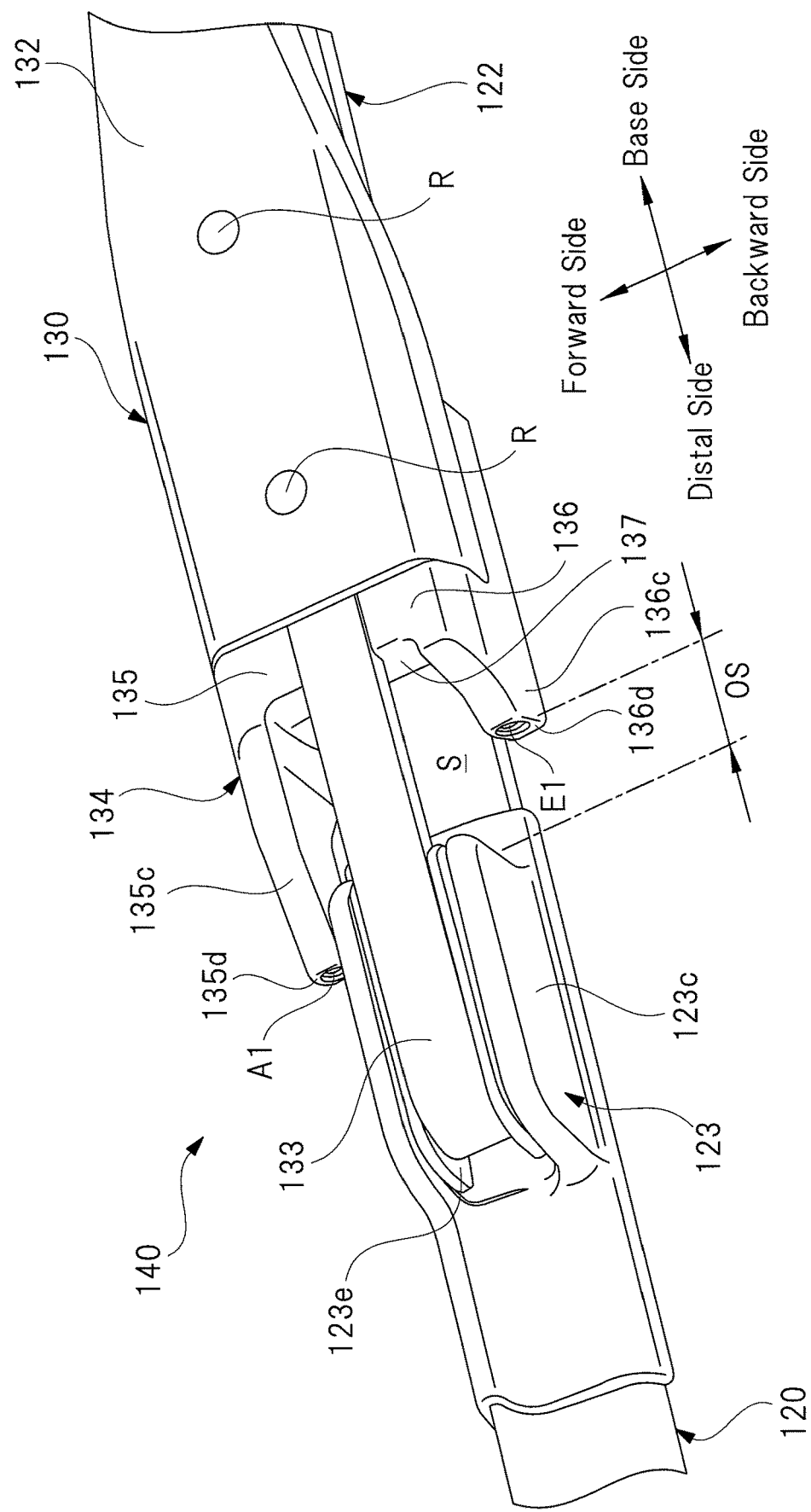
FIG. 22 is a view of a wiper apparatus according to a third embodiment, the view corresponding to FIG. 13.

FIG. 22 is a view of a wiper apparatus according to the third embodiment, the view corresponding to FIG. 13.

As shown in FIG. 22, a wiper apparatus 140 according to the third embodiment is different in the structure of the nozzle unit 134. Specifically, the backward-side arm 136c of the backward-side block 136 forming part of the nozzle unit 134 of the third embodiment is shorter in length than the backward-side arm 136c of the second embodiment (see FIG. 13). As a result, the front end side of the backward-side arm 136c does not overlap the cover member 123c in the wiping direction of the wiper blade 122, and, instead, a gap OS is formed between the cover member 123c, which extends along the longitudinal direction of the wiper blade 120, and the backward-side second wall 136d.

The wiper apparatus 140 configured in the above manner offers an effect substantially the same as the effect offered by the second embodiment. In addition, according to the third embodiment in which the gap OS is formed between the cover member 123c and the backward-side second wall 136d, snow, etc., piled in a space "S" created by the side of backward-side arm 136c which is closer to the arm piece 133 can be ejected quickly out of the space "S" through the gap OS when the wiper apparatus 140 is in operation.

The present invention is not limited to the above embodiments and may obviously be modified into various forms of applications on the condition that the modification does not deviate from the substance of the invention. For example, the wiper apparatuses 110 and 140 which wipe the windshield 111 disposed on the front side of the vehicle are described in the above embodiment. The present invention applies not only to the wiper apparatuses 110 and 140 but also to a wiper apparatus which wipes a rear window disposed on the rear side of the vehicle. The invention applies not only to a wiper apparatuses incorporated in a vehicle such as automotive vehicle, but also to a wiper apparatus incorporated in railroad car, airplane, ship, etc.

The wiper apparatus including the forward-side block 135 and the backward-side block 136, each block having four nozzles, is described in the above embodiments. The present invention, however, is not limited to such a wiper apparatus. Each block may have three or fewer nozzles or five or more nozzles according to the specification of the wiper apparatus. Depending on the characteristics of airflows caused by the aerodynamic draft, the number of nozzles forming part of the forward-side block 135 may be determined to be different from the number of nozzles forming part of the backward-side block 136.

Next, the fourth embodiment of the present invention will be described in detail with reference to drawings.

Figure 23:
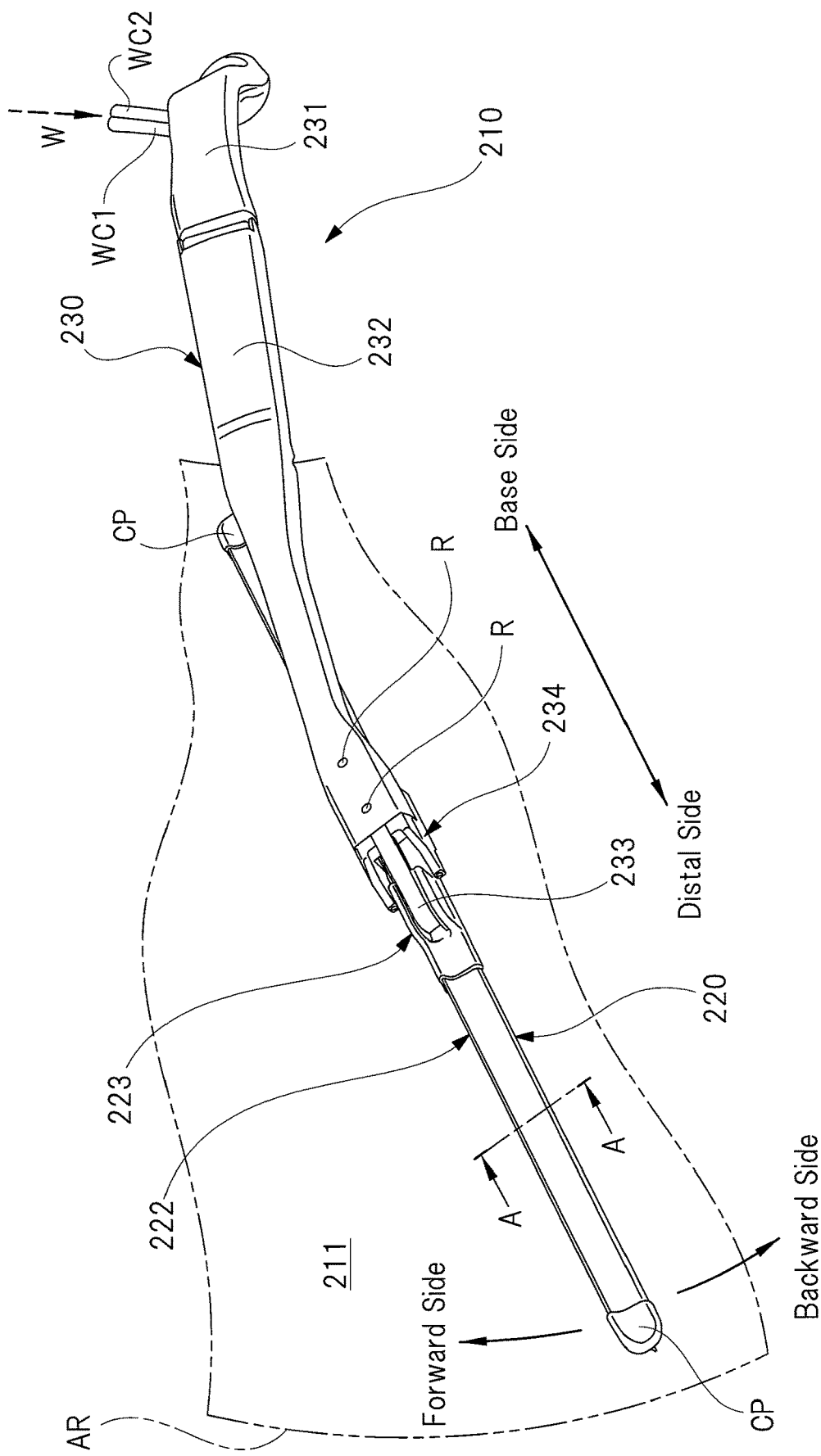
FIG. 23 is an overall perspective view of a wiper apparatus including a nozzle unit according to a fourth embodiment.
Figure 24:
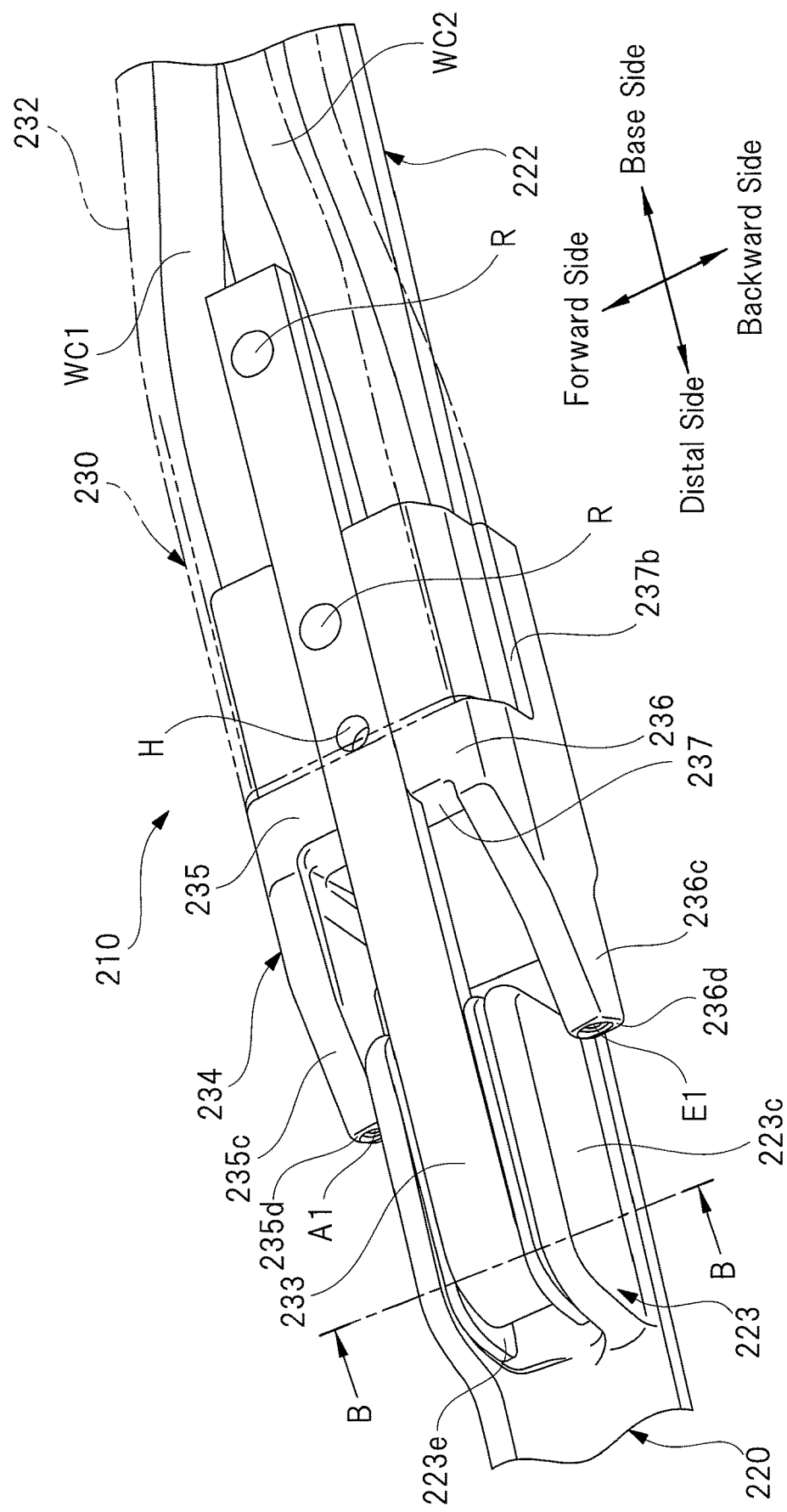
FIG. 24 is an enlarged perspective view of a surrounding portion of a connecting portion, seen from its front side.
Figure 25:
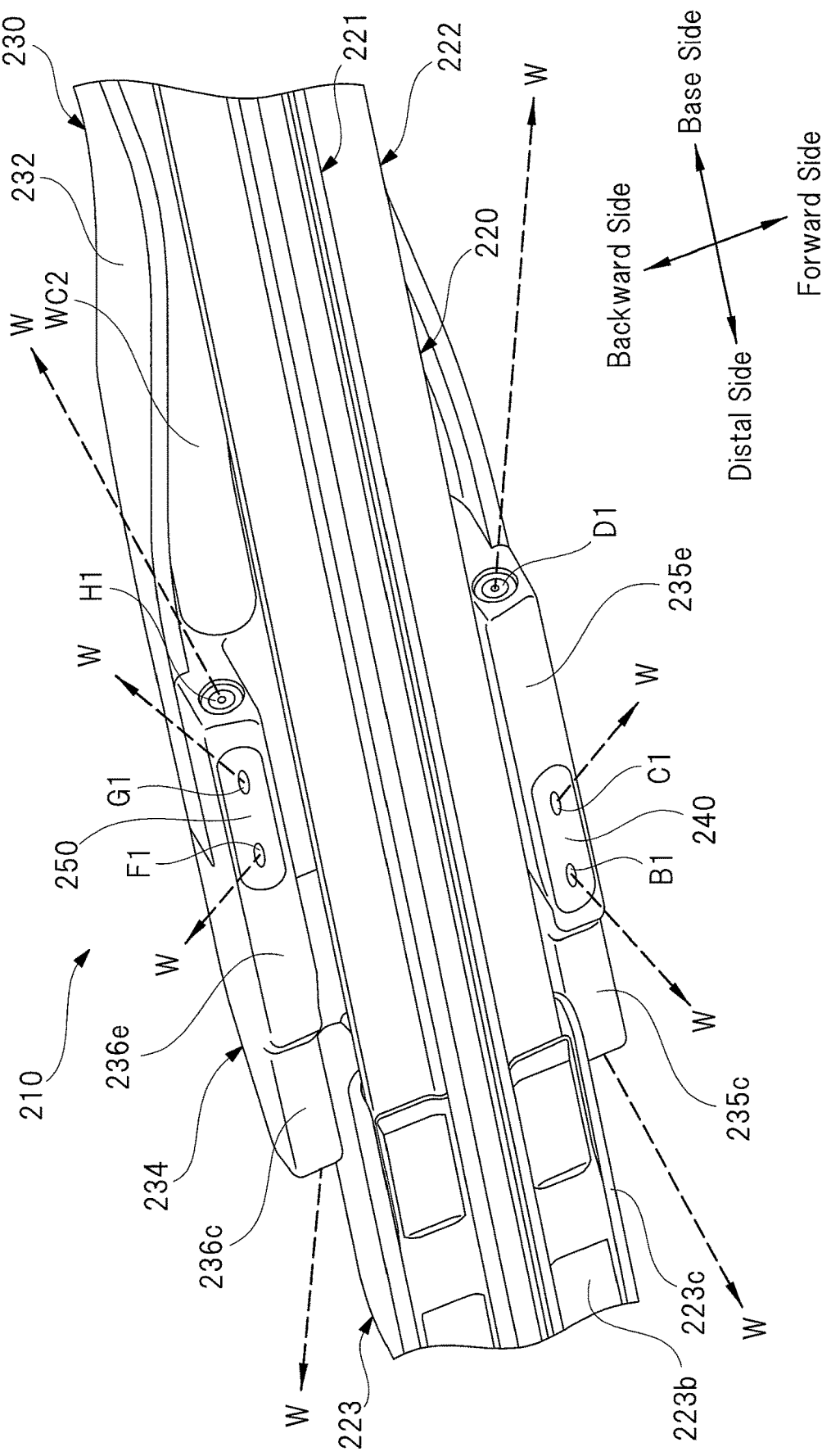
FIG. 25 is an enlarged perspective view of the surrounding of the connecting portion, seen from its back side.
Figure 26:
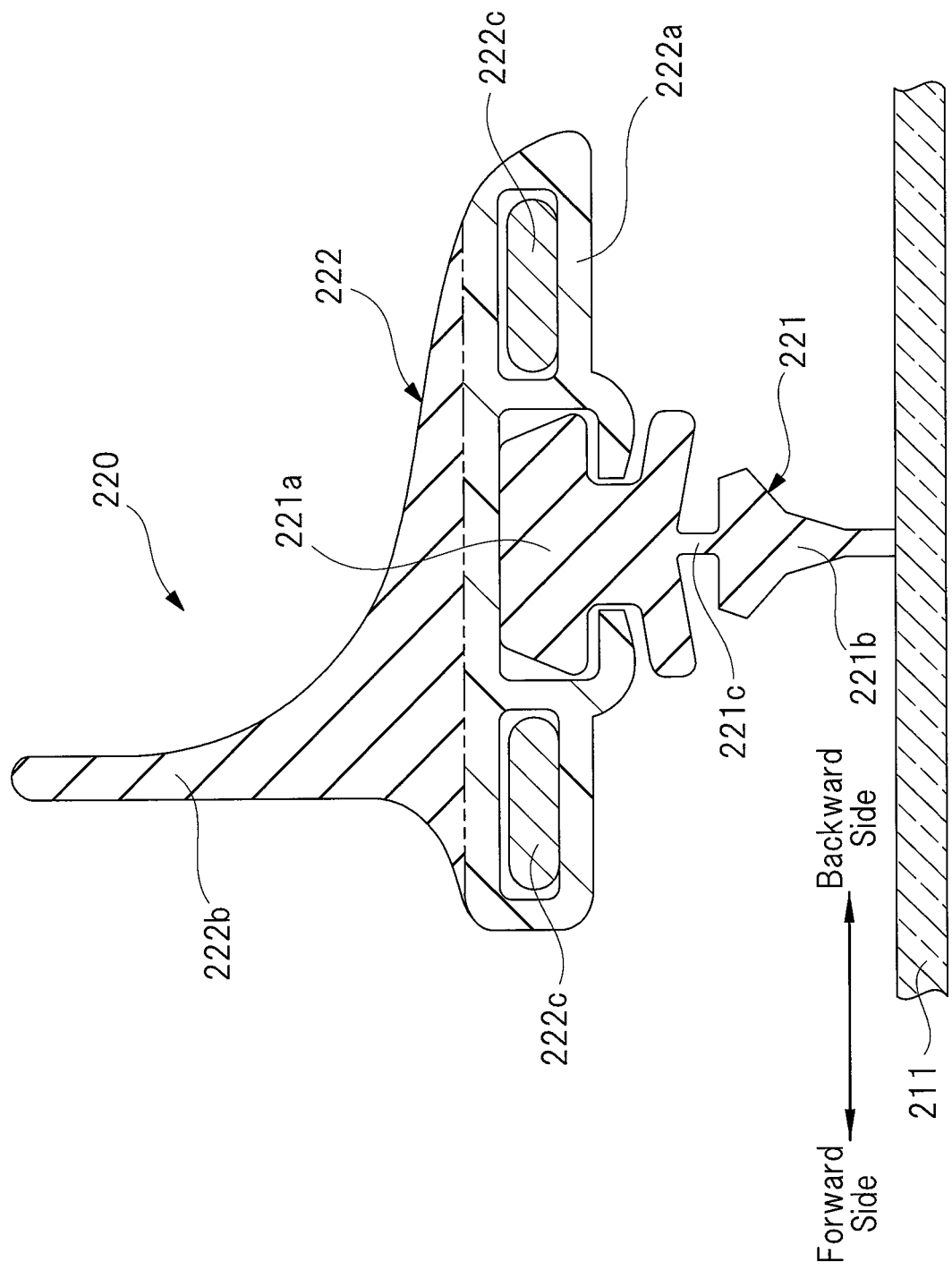
FIG. 26 is a sectional view taken along an A-A line of FIG. 23.
Figure 27:
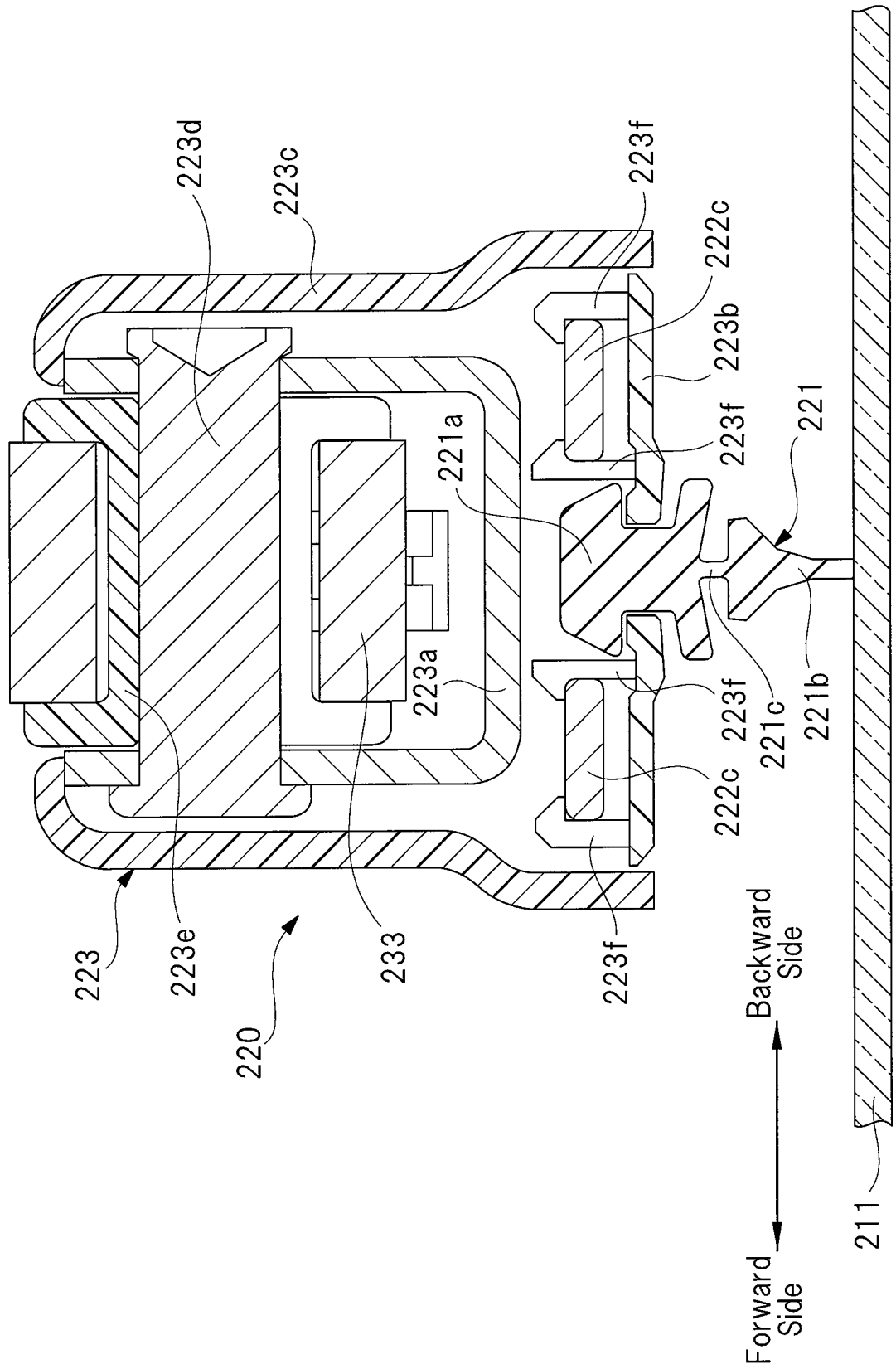
FIG. 27 is a sectional view taken along a B-B line of FIG. 24.
Figure 28:
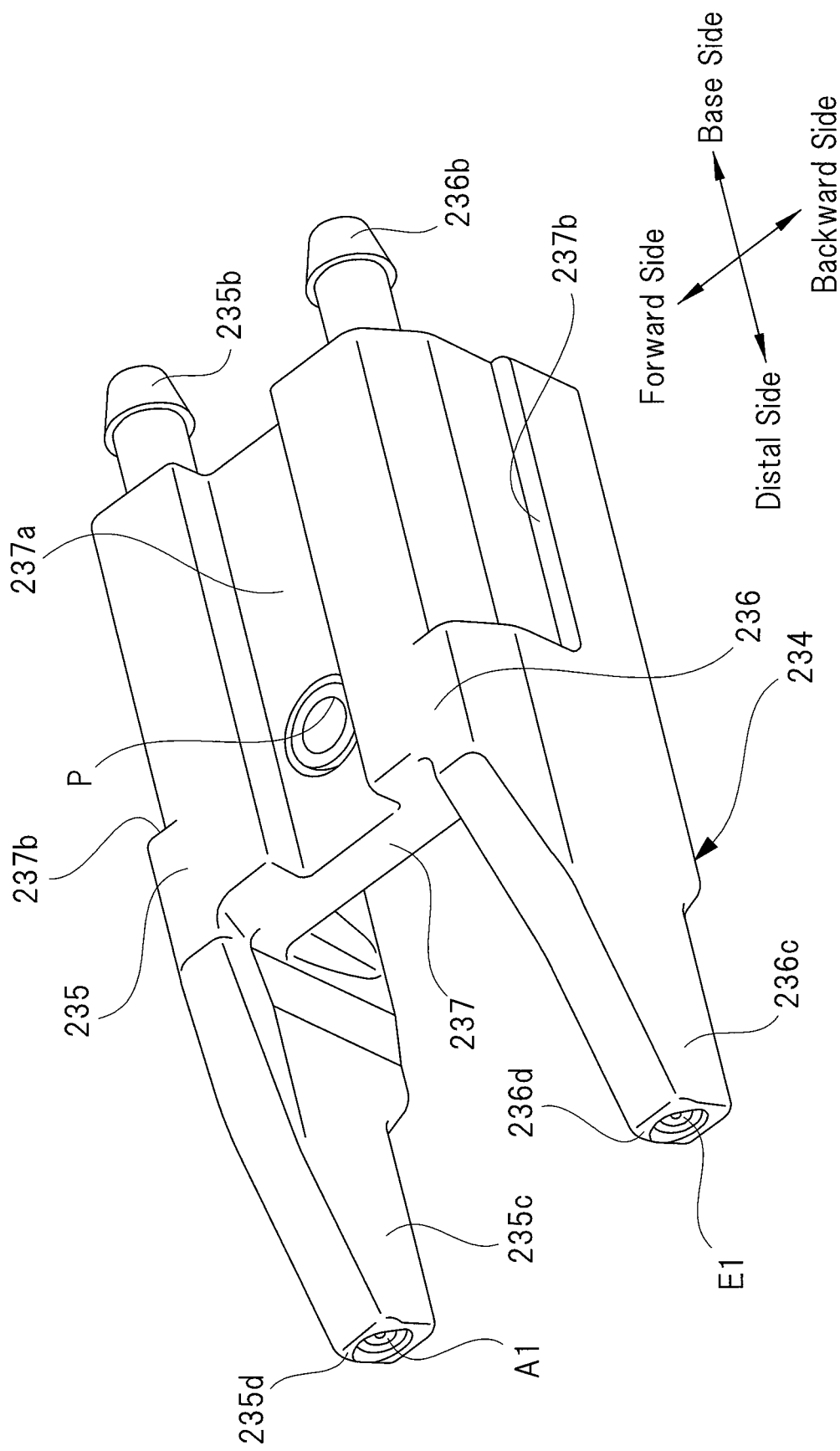
FIG. 28 is a perspective view of the nozzle unit, seen from its front side.
Figure 29:
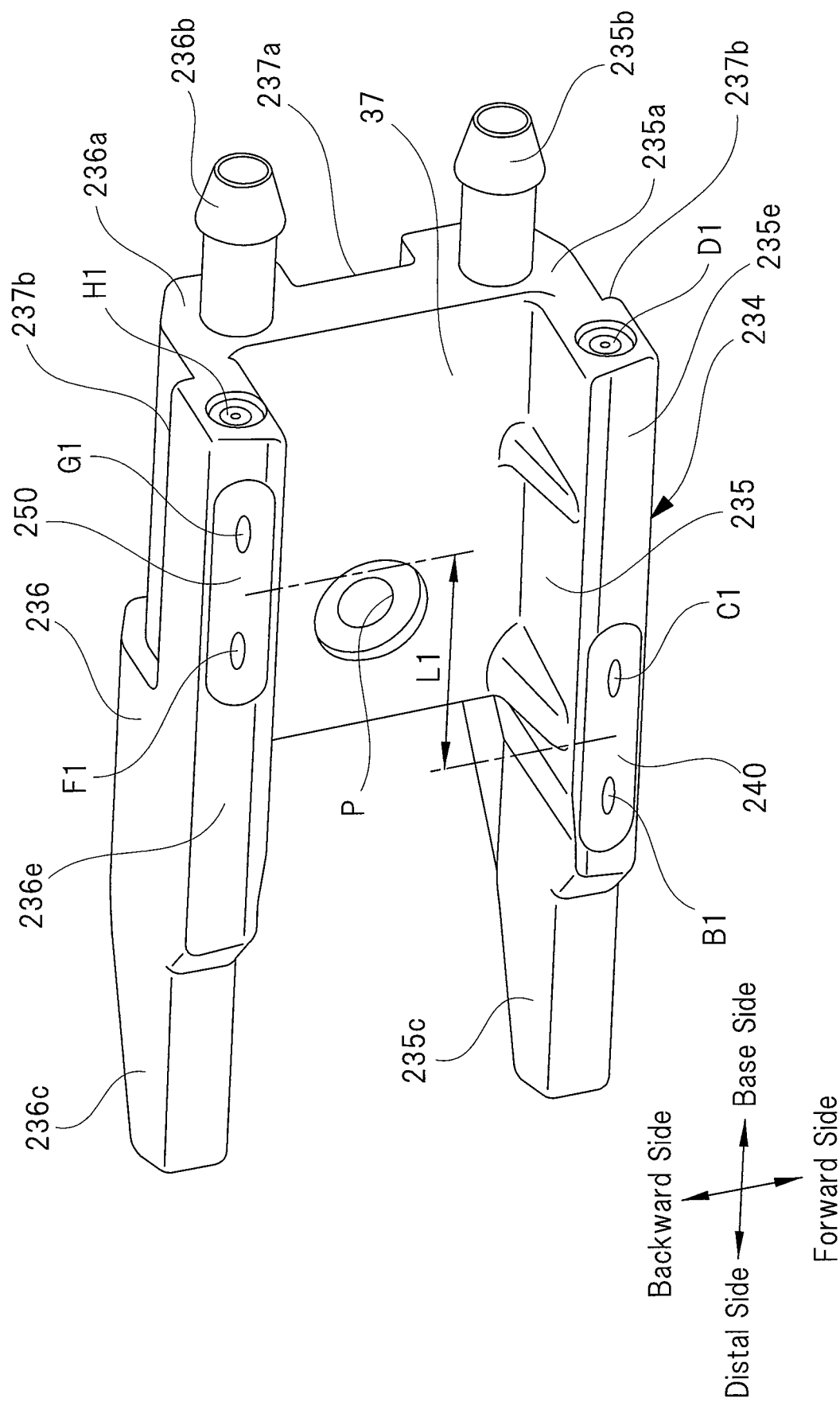
FIG. 29 is a perspective view of the nozzle unit, seen from its back side.
Figure 32:
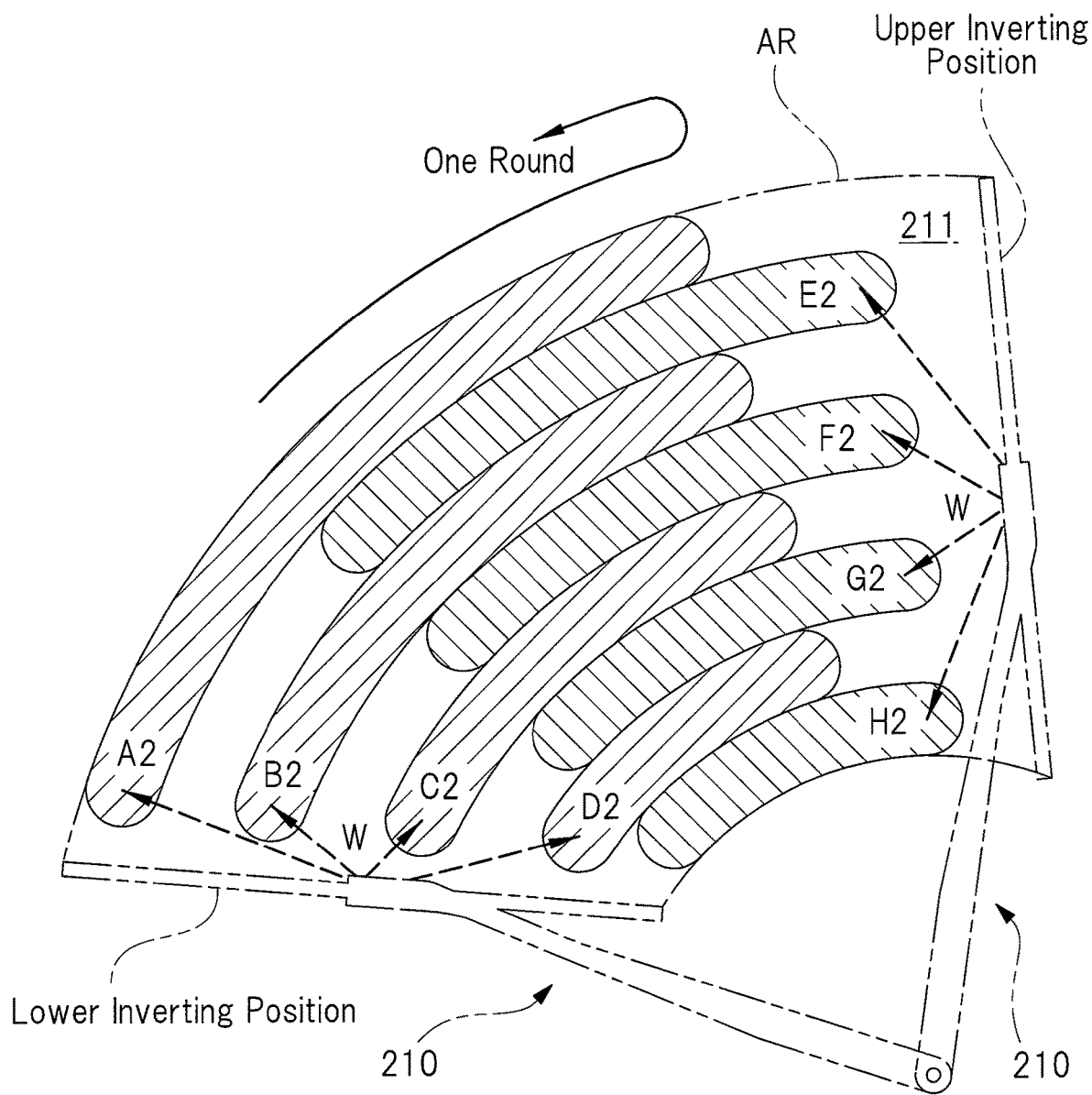
FIG. 32 is an explanatory view of the injection-target locations (A2 to H2) of washer fluid.

FIG. 23 is an overall perspective view of a wiper apparatus including a nozzle unit according to a fourth embodiment; FIG. 24 is an enlarged perspective view of a surrounding portion of a connecting portion, seen from its front side; FIG. 25 is an enlarged perspective view of the surrounding of the connecting portion, seen from its back side; FIG. 26 is a sectional view taken along an A-A line of FIG. 23; FIG. 27 is a sectional view taken along a B-B line of FIG. 24; FIG. 28 is a perspective view of the nozzle unit, seen from its front side; FIG. 29 is a perspective view of the nozzle unit, seen from its back side; FIG. 30A is a perspective view explaining a nozzle cap; FIG. 30B is a perspective view explaining the nozzle cap; FIG. 31A is a perspective view explaining a pipeline in the nozzle unit; FIG. 31B is a perspective view explaining the pipelines in the nozzle unit;

and FIG. 32 is an explanatory view of the injection-target locations (A2 to H2) of washer fluid.

As shown in FIG. 23, a wiper apparatus 210 includes a wiper blade 220 and a wiper arm 230. The wiper blade 220 is rotatably fitted to a front end side of the wiper arm 230, and moved in sliding contact with a windshield (surface to be wiped) 211 disposed on the front side of a vehicle such as automotive vehicle. A base end side of the wiper arm 230 is fixed to a pivot shaft (not shown) disposed on the front side of the vehicle. When switching on a wiper switch (not shown) in the vehicle interior to rotate a wiper motor (not shown), the pivot shaft is driven in a swinging manner. As a result, the wiper apparatus 210 makes reciprocating wiping actions in both forward-path direction and the backward-path direction in a predetermined wiping range AR formed on the windshield 211, as indicated by arrows in figures.

As shown in FIGS. 23 to 27, the wiper blade 220 has a blade rubber 221 in contact with the windshield 211, a holder member 222 holding the blade rubber 221, and a connecting member 223 formed on the middle portion of the holder member 222 in the longitudinal direction. Both ends of the holder member 222 in the longitudinal direction are respectively fitted with a pair of end caps CP. The end caps CP prevent the blade rubber 221 from coming off from the holder member 222.

As shown in FIGS. 26 and 27, the blade rubber 221 has a main body portion 221a held by the holder member 222, a lip portion 221b brought in contact with the windshield 211, and a neck portion 221c connecting the main body portion 221a to the lip portion 221b. The blade rubber 221 is formed into an elongated shape by extrusion molding an elastic material such as rubber, and has a sectional shape which is uniform across the entire part of the blade rubber 221 along the longitudinal direction.

The thickness of the neck portion 221c along the moving direction of the blade rubber 221 (left-hand and right-hand directions in figures) is determined to be smaller than that of the main body portion 221a and that of the lip portion 221b. This allows the neck portion 221c to elastically deform easily. As a result, when the wiper blade 220 is moved toward the forward-side and the backward-side on the windshield 211, the lip portion 221b is allowed to be tilted, permitting its front end side to smoothly follow the main body portion 221a in the moving direction of the wiper blade 220. The wiper blade 220 is thus able to certainly wipe off foreign substance such as rainwater and dust (not shown) from the windshield 211.

As shown in FIGS. 26 and 27, the holder member 222 has a holder main body 222a and a fin portion 222b. The holder main body 222a and the fin portion 222b are molded into an integrated structure by double-molding materials different in hardness from each other, similar to the blade rubber 221, and formed into an elongated shape.

The holder main body 222a is made of flexible resin material such as plastic which gives the holder main body 222a sufficient strength which allows it to hold the main body portion 221a of the blade rubber 221 and allows the holder main body 222a to follow the curved surface (not shown) of the windshield 211. On the other hand, the fin portion 222b is made of elastic material such as rubber which has hardness lower than that of the holder main body 222a. Aerodynamic drag acting on the fin portion 222b creates a downward force acting on the wiper blade 220. This downward force keeps the blade rubber 221 capable of exerting high wiping capability.

In the holder main body 222a, a pair of vertebras 222c is arranged at a predetermined interval. The vertebras 222c are each made of a steel plate having spring property, and they are set mirror symmetric such that one vertebra 222c on the forward-side and the other vertebra 222c on the backward-side sandwich the main body portion 221a of the blade rubber 221. Each vertebra 222c in its natural state with no external force applied thereto is curved at a curvature which is larger than that of the windshield 211, causing the holder member 222 and the blade rubber 221 to be elastically deformed in conformity to the curvature of the windshield 211. As a result, the entire part of the lip portion 221b in the longitudinal direction is stuck firmly to the windshield 211.

As shown in FIGS. 23 and 27, the connecting member 223 is formed on the middle portion of the holder member 222 in the longitudinal direction. The connecting member 223 has a connecting body 223a, a base plate 223b, and a cover member 223c. The connecting body 223a is formed by press working a steel plate into a structure having a substantially U-shaped section, and caulking-fixed to the vertebras 222c with fixing legs (not shown) formed integrally with the connecting body 223a.

A columnar pin 223d made of steel is caulking-fixed to the connecting body 223a. To this columnar pin 223d, a hook fixing member 223e made of resin material such as plastic is rotatably attached. To this hook fixing member 223e, an arm piece 233 fitted to the front end side of the wiper arm 230 (see FIG. 24) is connected at one touch. Each of the columnar pin 223d and the hook fixing member 223e forms part of a connecting portion 223.

The base plate 223b which is made of resin material such as plastic and formed into a tabular shape, is attached to the vertebras 222c with fixing legs 223f formed integrally with the base plate 223b. The connecting body 223a is located closer to the fin portion 222b (front side) of the holder member 222, while the base plate 223b is located closer to the holder main body 222a (back side) of the holder member 222.

The cover member 223c which is made of resin material such as plastic and substantially formed into a box shape, is attached to the exterior of the connecting body 223a with a plurality of engaging claws (not shown) formed integrally with the cover member 223c. The cover member 223c covers up the side faces, etc., of the connecting body 223a, thereby giving the wiper blade 220 a better appearance.

As shown in FIGS. 23 and 24, the wiper arm 230 has an arm head 231, an arm shank 232, and the arm piece 233. The arm head 231 is formed into a predetermined shape by casting, etc. The base end side of the arm head 231 (on the right in FIG. 23) is fixed to the pivot shaft (not shown). To the front end side of the arm head 231 (on the left in FIG. 23), on the other hand, the base end side of the arm shank 232 is rotatably fitted. Between the arm shank 232 and the arm head 231, a tensile spring (not shown) is provided, and the tensile spring applies its spring force to the arm shank 232, thereby pressing it against the windshield 211.

The arm shank (retainer) 232 is formed into a long bar-like shape with a substantially U-shaped section, by press working a steel plate. Aa well as the tensile spring described above, a forward-side washer tube WC1 and a backward-side washer tube WC2 are housed and arranged within the arm shank 232. One end side of each of the washer tubes WC1 and WC2 is led into an engine room of the vehicle via the arm head 231, and connected to a washer device (not shown). On the other hand, the other end side of each of the washer tubes WC1 and WC2 are connected to the nozzle unit 234 fixed to the arm piece 233. In this manner, the washer tubes WC1 and WC2 are laid along the interior of the arm shank 232 and thus concealed. This gives the wiper apparatus 210 a better appearance.

The arm piece 233 is formed into a predetermined shape by press working of steel. The front end side of the arm piece 233 is substantially formed into a U-shape, and connected to the hook fixing member 223e at one touch. The base end side of the arm piece 233 is fixed to the interior of the front end side of the arm shank 232 with a pair of rivets "R". As described above, the arm shank 232 made of a steel plate, and the arm piece 233 made of steel are firmly riveted together to keep them fixed without rattling.

To the arm piece 233, the nozzle unit 234 is fixed with a fixing screw (not shown). As shown in FIG. 24, the fixing screw is screwed into a screw hole "H" from the lower side of this figure, that is, from the same side as the wiper blade 220. As well as this screw hole "H", the arm piece 233 and the nozzle unit 234 are partially covered with the arm shank 232, thereby giving the surrounding of the nozzle unit 234 of the wiper apparatus 210 a neat and better appearance.

As described above, the nozzle unit 234 is fixed to the arm piece 233 fitted to the hook fixing member 223e, and therefore disposed closer to the hook fixing member 223e. Near the hook fixing member 223e, the nozzle unit 234 is fixed firmly to the arm piece 233 with the fixing screw, so that the positional shift of the nozzle unit 234 relative to the wiper blade 220 is reduced to the minimum.

As shown in FIGS. 28 and 29, the nozzle unit 234 is formed by injection molding of resin material such as plastic into a predetermined shape. The nozzle unit 234 has a forward-side block 235 and a backward-side block 236.

The base end side of the forward-side block 235 (on the right in figures) is provided with a forward-side first wall 235a directed to the base end side of the wiper blade 220 in the longitudinal direction. The forward-side first wall 235a is integrally provided with a forward-side plug-in portion 235b which is plugged into the other end portion of the forward-side washer tube WC1 (see FIG. 24). On the other hand, the front end side of the forward-side block 235 (on the left in figures) is integrally provided with a forward-side arm 235c which is gradually tapered toward a front end side thereof. The forward-side arm 235c is integrally provided with a forward-side second wall 235d directed to the front end side of the wiper blade 220 in the longitudinal direction.

A forward-side counter surface 235e is formed between the forward-side first wall 235a and the forward-side second wall 235d of the forward-side block 235, and directed to the windshield 211. A forward-side nozzle cap 235f is disposed as a cover member on a portion of the forward-side counter surface 235e, which is closer to the forward-side second wall 235d.

On the forward-side second wall 235d, a forward-side first injection nozzle A1 is formed, as shown in FIG. 28. The forward-side first injection nozzle A1 constitutes and functions as "front end nozzle" in the present invention, and it is directed to the front end side of the wiper blade 220 in the longitudinal direction. In this manner, the forward-side first injection nozzle A1 jets washer fluid "W" onto an injection-target location A2 on the windshield 211 shown in FIG. 32 when the wiper blade 220 makes a wiping action along the forward path. In other words, the forward-side first injection nozzle A1 is disposed on the front end side of the blade rubber 221 in the longitudinal direction, and so that it can jet washer fluid to an area on the forward path to wet the area.

In this case, an "eyeball type nozzle" capable of varying the injection-target locations of washer fluid "W" is adopted as the forward-side first injection nozzle A1. More specifically, the injection-target locations of the forward-side first injection nozzle A1 can be adjusted by using a needle, etc. so as to pivotally support the nozzle. This allows the injection-target locations of the forward-side first injection nozzle A1 to be optimized according to the length of the wiper blade 220 attached to the wiper arm 230, which length may vary depending on the specification of the wiper blade 220.

As shown in FIGS. 29 and 30, a forward-side nozzle cap 240 has a cap body 241 which blocks an opening 239a of a connection pipeline 239 which will be described later. Reference numerals in parentheses in FIG. 30 denote components of the forward-side nozzle cap 240, which correspond to components of a backward-side nozzle cap 250 which will be described later. In other words, the forward-side nozzle cap 240 and the backward-side nozzle cap 250 are the same in shape as each other and can be standardized. In order to avoid redundant description, the detailed explanation of the structure of the backward-side nozzle cap 250 will be omitted from the following description.

The cap body 241 has a pair of arc portions 241a opposite to each other and a pair of linear portions 241b, and the cap body 241 is formed into a shape substantially the same as that of "athletic field". As shown in FIG. 30B, in the cap body 241, a portion closer to the connection pipeline 239 (upper side in FIG. 30B) is provided with a projection 241c which extends toward the connection pipeline 239. The projection 241c is similar to the cap body 241, and has a section substantially the same in shape as "athletic field".

A nozzle inlet 241d is formed at an approximately center portion of the projection 241c, and the nozzle inlet 241d has a substantially circular section and a bottom. The nozzle inlet 241d extends in a projecting direction of the projection 241c, the nozzle inlet 241d has a length substantially the same as the thickness of the projection 241c. Washer fluid "W" from the connection pipeline 239 flows into the nozzle inlet 241d.

On the opposite side of the cap body 241 to the projection 241c, the forward-side second injection nozzle B1 and the forward-side third injection nozzle C1, each having a substantially elliptic section, are formed, as shown in FIG. 30A. The forward-side second injection nozzle B1 and the forward-side third injection nozzle C1 are arranged in a row across a predetermined gap. An inclined channel 241e is formed between the forward-side second injection nozzle B1 and the nozzle inlet 241d while another inclined channel 241e is formed between the forward-side third injection nozzle C1 and the nozzle inlet 241d such that both inclined channels 241e are opposite to each other with respect to the nozzle inlet 241d. Respective base ends of the inclined channels 241e are connected to the parts of nozzle inlet 241d which are closer to the projection 241c. The front ends of the inclined channels 241e, on the other hand, are connected to the forward-side second injection nozzle B1 and the forward-side third injection nozzle C1, respectively. As a result, flows of washer fluid "W" jetted out of the forward-side second injection nozzle B1 and the forward-side third injection nozzle C1 are each inclined at a predetermined angle against the cap body 241.

As shown in FIG. 30B, base end sides of the inclined channels 241e are formed in such a way as to traverse the projection 241c. This prevents a drop in the rigidity of the forward-side nozzle cap 240 which is caused by the formation of the inclined channels 241e. In addition, the projection 241c formed on the cap body 241 provides the sufficient thickness of the portion in which the inclined channels 241e are formed. Various angles of inclination of the inclined channels 241e thus can be determined.

The front end sides of the inclined channels 241e are directed to the arc portions 241a of the cap body 241 and toward the center portion of the wiper blade 220 in the longitudinal direction, via the forward-side second injection nozzle B1 and the forward-side third injection nozzle C1, respectively. As a result, washer fluid "W" is jetted onto the injection-target locations B2 and C2 shown in FIG. 32 when the wiper blade 220 makes a wiping action along the forward path. In other words, the forward-side second injection nozzle B1 and the forward-side third injection nozzle C1 are disposed on the center portion of the blade rubber 221 in the longitudinal direction, and so that it can jet washer fluid "W" to an area on the forward path to wet the area.

On the forward-side first wall 235a, the forward-side fourth injection nozzle D1 is formed, as shown in FIG. 29. The forward-side fourth injection nozzle D1 is directed to the base end side of the wiper blade 220 in the longitudinal direction. In this manner, the forward-side fourth injection nozzle D1 jets washer fluid "W" onto the injection-target location D2 shown in FIG. 32 when the wiper blade 220 makes a wiping action along the forward path. In other words, the forward-side fourth injection nozzle D1 is disposed on the base end side of the blade rubber 221 in the longitudinal direction, and so that it can jet washer fluid "W" to an area on the forward path to wet the area.

In this case, an "eyeball type nozzle" capable of varying the injection-target locations of washer fluid "W" is adopted as the forward-side fourth injection nozzle D1, as in the case of adopting the goggling nozzle as the forward-side first injection nozzle A1. This allows the injection-target locations of the forward-side fourth injection nozzle D1 to be optimized according to the specification of the wiper blade 220.

Out of the forward-side first injection nozzle A1 to the forward-side fourth injection nozzle D1, the forward-side second injection nozzle B1 and the forward-side third injection nozzle C1 serve as different nozzles included in the present invention, while the forward-side first injection nozzle A1 and the forward-side fourth injection nozzle D1 serve as the nozzles characteristic of the present invention.

On the base end side of the backward-side block 236 (on the right in FIG. 29), a backward-side first wall 236a is formed, which is directed to the base end side of the wiper blade 220 in the longitudinal direction. The backward-side first wall 236a has a backward-side plug-in portion 236b formed integrally thereon, which is plugged into the other end portion of the backward-side washer tube WC2 (see FIG. 24). On the front end side of the backward-side block 236 (on the left in FIG. 29), a backward-side arm 236c is formed integrally thereon, which gradually tapers toward its front end side. The backward-side arm 236c has a backward-side second wall 236d directed to the front end side of the wiper blade 220 in the longitudinal direction.

A backward-side counter surface 236e is formed between the backward-side first wall 236a and the backward-side second wall 236d of the backward-side block 236, and the backward-side counter surface 236e is counter to the windshield 211. On a portion of backward-side counter surface 236e which is closer to the backward-side first wall 236a, a backward-side nozzle cap 250 is disposed, which serves as a cover member.

On the backward-side second wall 236d, the backward-side first injection nozzle E1 is formed, as shown in FIG. 28. The backward-side first injection nozzle E1 is directed to the front end side of the wiper blade 220 in the longitudinal direction. In this manner, the backward-side first injection nozzle E1 jets washer fluid "W" onto an injection-target location E2 shown in FIG. 32 when the wiper blade 220 makes a wiping action along the backward path. In other words, the backward-side first injection nozzle E1 is disposed on the front end side of the blade rubber 221 in the longitudinal direction, and so that it can jet washer fluid to an area on the backward path to wet the area.

In this case, an "eyeball type nozzle" capable of varying the injection-target locations of washer fluid "W" is adopted as the backward-side first injection nozzle E1, as in the case of adopting the goggling nozzle as the forward-side first injection nozzle A1. This allows the injection-target locations of the backward-side first injection nozzle E1 to be optimized according to the specification of the wiper blade 220.

As shown in FIGS. 29 and 30, the backward-side nozzle cap 250 is the same in shape as the forward-side nozzle cap 240, and has the backward-side second injection nozzle F1 and the backward-side third injection nozzle G1. The backward-side second injection nozzle F1 and the backward-side third injection nozzle G1 are directed to the center portion of the wiper blade 220 in the longitudinal direction in the same manner as the forward-side second injection nozzle B1 and the forward-side third injection nozzle C1 of the forward-side nozzle cap 240. In this manner, the backward-side second injection nozzle F1 and the backward-side third injection nozzle G1 of the backward-side nozzle cap 250 jet washer fluid "W" onto injection-target locations F2 and G2 shown in FIG. 32, respectively, when the wiper blade 220 makes a wiping action along the backward path. In other words, the backward-side second injection nozzle F1 and the backward-side third injection nozzle G1 are disposed on the center portion of the blade rubber 221 in the longitudinal direction, and so that it can jet washer fluid to an area on the backward path to wet the area.

On the backward-side first wall 236a, the backward-side fourth injection nozzle H1 is formed, as shown in FIG. 29. The backward-side fourth injection nozzle H1 is directed to the base end side of the wiper blade 220 in the longitudinal direction. In this manner, the backward-side fourth injection nozzle H1 jets washer fluid "W" onto the injection-target location H2 shown in FIG. 32 when the wiper blade 220 makes a wiping action along the backward path. In other words, the backward-side fourth injection nozzle H1 is disposed on the base end side of the blade rubber 221 in the longitudinal direction, and so that it can jet washer fluid to an area on the backward path to wet the area.

In this case, an "eyeball type nozzle" capable of varying the injection-target locations of washer fluid "W" is adopted as the backward-side fourth injection nozzle H1, as in the case of adopting the goggling nozzle as the forward-side first injection nozzle A1. This allows the injection-target locations of the backward-side fourth injection nozzle H1 to be optimized according to the specification of the wiper blade 220.

Out of the backward-side first injection nozzle E1 to the backward-side fourth injection nozzle H1, the backward-side second injection nozzle F1 and the backward-side third injection nozzle G1 serve as different nozzles included in the present invention, while the backward-side first injection nozzle E1 and the backward-side fourth injection nozzle H1 serve as the nozzles characteristic of the present invention.

As described above, respective injection-target locations of the forward-side first injection nozzle A1, forward-side fourth injection nozzle D1, backward-side first injection nozzle E1, and the backward-side fourth injection nozzle H1 are made adjustable, and the forward-side nozzle cap 240 is disposed on a portion of forward-side counter surface 235e which is closer to the forward-side second wall 235d, while the backward-side nozzle cap 250 is disposed on a portion of backward-side counter surface 236e which is closer to the backward-side first wall 236a. A position of the forward-side nozzle cap 240 and a position of the backward-side nozzle cap 250 are thus shifted to each other in the longitudinal direction of the wiper blade 220, by a predetermined distance L1. As a result, as indicated by oblique line areas in FIG. 32, the injection-target locations A2 to H2 (eight injection-target locations) are alternately arranged on the windshield 211, as the forward-side injection-target locations and the backward-side injection-target locations which appear alternately.

The forward-side first injection nozzle A1 to the forward-side fourth injection nozzle D1 (four nozzles) are so positioned that they can wet relatively wide areas which are inside the wiping range AR and which are on the forward side, with washer fluid "W". The backward-side first injection nozzle E1 to the backward-side fourth injection nozzle H1 (four nozzles) are so positioned that they can wet relatively wide areas which are inside the wiping range AR and which are on the backward side, with washer fluid "W". A divergent nozzle capable of jetting mist of washer fluid "W" may be adopted, in which case wider areas inside the wiping range AR can be wetted with smaller amount of washer fluid "W".

When switching on the washer switch (not shown), the washer device is brought into operation to supply washer fluid "W" into the forward-side block 235 and the backward-side block 236 via the washer tubes WC1 and WC2, as indicated by a broken line arrow in FIG. 23. The direction of operation of the washer device is switched so that washer fluid "W" is supplied to the forward-side block 235 only when the wiper blade 220 makes a wiping action along the forward path, and to the backward-side block 236 only when the wiper blade 220 makes a wiping action along the backward path.

A connecting portion 237 is formed between the forward-side block 235 and the backward-side block 236 of the nozzle unit 234, that is, between the forward-side first injection nozzle A1 to the forward-side fourth injection nozzle D1 and the backward-side first injection nozzle E1 to the backward-side fourth injection nozzle H1. The connecting portion 237 has a function of connecting the forward-side block 235 to the backward-side block 236 and keeping them parallel with each other.

The connecting portion 237 has a concave portion 237a in which the arm piece 233 is fitted. The concave portion 237a opens in the direction opposite to the forward-side nozzle cap 240 and the backward-side nozzle cap 250, and extends in the longitudinal direction of the wiper blade 220. In the concave portion 237a, a portion closer to the forward-side arm 235c and the backward-side arm 236c is provided with a screw insertion hole "P", which extends so as to penetrate the connecting portion 237 in the thickness direction thereof. Into the screw insertion hole "P", the fixing screw to be screwed in the screw hole "H" of the arm piece 233 (see FIG. 24) is inserted.

In the nozzle unit 234, a portion closer to the forward-side plug-in portion 235b and the backward-side plug-in portion 236b in the longitudinal direction thereof is provided with a fitting concave portion 237b on which the front end side of the arm shank 232 is fitted. The fitting concave portion 237b is formed in such a way as to straddle the forward-side block 235 and the backward-side block 236.

As described above, the fitting concave portion 237b is formed in this manner, thereby reducing a level difference between the nozzle unit 234 and the arm shank 232, and giving them better appearance. This configuration allows the screw insertion hole "P" and the screw hole "H" (see FIG. 24) to be axially aligned with each other with ease without visual check when the wiper apparatus 210 is assembled, thereby improving workability in assembling the wiper apparatus 210.

Inside the forward-side block 235 and the backward-side block 236, the washer fluid pipelines PL are respectively placed, as shown FIGS. 31A and 31B. The washer fluid pipelines PL of the forward-side block 235 and the backward-side block 236 are substantially formed into the same shape. The structure of the washer fluid pipeline PL of the forward-side block 235 will be therefore described in detail as an example.

Washer fluid "W" flows through the washer fluid pipeline PL, which has an inflow pipeline 238a, a front-end-side pipeline 238b, and a base-end-side pipeline 238c. The inflow pipeline 238a, the front-end-side pipeline 238b, and the base-end-side pipeline 238c each extend straight along the longitudinal direction of the wiper blade 220. The base-end-side pipeline 238c, the front-end-side pipeline 238b, and the inflow pipeline 238a are arranged in parallel with each other in this order, with the base-end-side pipeline 238c being closet to the windshield 211 (on the lower side in FIG. 31A). The front-end-side pipeline 238b and the base-end-side pipeline 238c serve as supply pipelines according to the present invention.

The base end side of the inflow pipeline 238a opens to the forward-side plug-in portion 235b, the front end side of the front-end-side pipeline 238b opens to the forward-side second wall 235d, and the base end side of the base-end-side pipeline 238c opens to the forward-side first wall 235a. The front end side of the front-end-side pipeline 238b and the base end side of the base-end-side pipeline 238c are provided with a globular nozzle support 238d and a globular nozzle support 238e, respectively. Inside the nozzle support 238d and the nozzle support 238e, the forward-side first injection nozzle A1 and the forward-side fourth injection nozzle D1 are attached rotatably, respectively. In other words, the front-end-side pipeline 238b supplies washer fluid "W" to the forward-side first injection nozzle A1, while the base-end-side pipeline 238c supplies the same to the forward-side fourth injection nozzle D1.

The front end side of the inflow pipeline 238a, the base end side of the front-end-side pipeline 238b, and the front end side of the base-end-side pipeline 238c are connected to each other via a connection pipeline 239, which sends a branch of washer fluid "W" having flowed into the inflow pipeline 238a to the front-end-side pipeline 238b and to the base-end-side pipeline 238c. The connection pipeline 239 has a section of a long-hole shape, and extends in a direction substantially perpendicular to (intersecting with) the extension direction of the inflow pipeline 238a, front-end-side pipeline 238b, and base-end-side pipeline 238c. The long-hole sectional shape of the connection pipeline 239 has sides along the longitudinal direction of the wiper blade 220 which are longer than sides along the direction perpendicular to the longitudinal direction of the wiper blade 220. In other words, the inflow pipeline 238a, front-end-side pipeline 238b, and base-end-side pipeline 238c extend along the longitudinal direction of the long-hole sectional shape of the connection pipeline 239. This prevents an increase in the width of the nozzle unit 234 in the direction perpendicular to the longitudinal direction of the wiper blade 220, thus preventing the wiper blade 220 from blocking the driver's field of view upon making a reciprocating wiping action.

The inflow pipeline 238a and the front-end-side pipeline 238b are connected to the connection pipeline 239 from its sides. The area of an overlapped portion between the inflow pipeline 238a and the connection pipeline 239 in a view of the inflow pipeline 238a in the direction perpendicular to the direction of its extension is larger than the channel area of the inflow pipeline 238a. The area of an overlapped portion between the front-end-side pipeline 238b and the connection pipeline 239 in a view of the front-end-side pipeline 238b in the direction perpendicular to the direction of its extension is larger than the channel area of the front-end-side pipeline 238b. When the inflow pipeline 238a and the front-end-side pipeline 238b are seen in the direction of their extension, the inflow pipeline 238a and front-end-side pipeline 238b are connected to the connection pipeline 239 such that each of them partially overlaps the connection pipeline 239. In other words, the inflow pipeline 238a and the front-end-side pipeline 238b are connected to the connection pipeline 239 such that the inflow pipeline 238a and the front-end-side pipeline 238b are offset to each other in a direction perpendicular to the extension direction of the inflow pipeline 238a and the front-end-side pipeline 238b. The inflow pipeline 238a and the front-end-side pipeline 238b are thus connected to the connection pipeline 239 via their respective large opening areas. As a result, the flow of washer fluid "W" from the inflow pipeline 238a to the connection pipeline 239 and the flow of washer fluid "W" from the connection pipeline 239 to the front-end-side pipeline 238b are not restricted and are therefore kept smooth.

As shown in FIG. 31A, the nozzle unit 234 is shaped such that the backward side (the same side as the connecting portion 237) of the forward-side block 235 has a thickness structure, while the forward-side arm 235c has a thin structure. The inflow pipeline 238a has a larger diameter, and connected to the connection pipeline 239 on its backward side in the direction perpendicular to the extension direction of the connection pipeline 239, while the front-end-side pipeline 238b, which has a smaller diameter, is connected to the connection pipeline 239 on its forward side in the direction perpendicular to the extension direction of the connection pipeline 239. This arrangement prevents a drop in the rigidity of the nozzle unit 234. In addition, the inflow pipeline 238a has a channel area larger than that of the front-end-side pipeline 238b and of the base-end-side pipeline 238c. As a result, the flow of washer fluid "W" is not restricted in the inflow pipeline 238a, which is on the upstream side of the washer fluid pipeline PL. This allows washer fluid "W" to be delivered certainly to the front-end-side pipeline 238b and to the base-end-side pipeline 238c.

In addition, the base-end-side pipeline 238c is connected to the connection pipeline 239, is aligned with the connection pipeline 239, and not lateral to the connection pipeline 239. This allows washer fluid "W" to flow smoothly from the connection pipeline 239 to the base-end-side pipeline 238c.

A slide die (not shown) is used when the connection pipeline 239 is formed. As a result, an opening 239a (not shown) is formed on the forward-side counter surface 235e of the connection pipeline 239. The opening 239a of the connection pipeline 239 is blocked with the forward-side nozzle cap 240, as indicated by a broken line arrow "M" in FIG. 31B. As described above, according to this embodiment, the forward-side nozzle cap 240 having the forward-side second injection nozzle B1 and the forward-side third injection nozzle C1 is used as a cover member which blocks the opening 239a. The opening 239a is thus given a function of jetting washer fluid "W".

As shown in FIGS. 31A and 31B, the position of the connection pipeline 239 of the washer fluid pipeline PL in the forward-side block 235 and the position of the connection pipeline 239 of the washer fluid pipeline PL in the backward-side block 236 are shifted to each other in the longitudinal direction of the wiper blade 220. This shifted positioning is made in order that the forward-side nozzle cap 240 is disposed on a portion of the forward-side counter surface 235e, which is closer to the forward-side second wall 235d, and that the backward-side nozzle cap 250 is disposed on a portion of backward-side counter surface 236e which is closer to the backward-side first wall 236a. Because of this arrangement, the front-end-side pipeline 238b of the forward-side block 235 is made shorter than that of the backward-side block 236, while the inflow pipeline 238a and the base-end-side pipeline 238c of the forward-side block 235 are respectively made longer than those of the backward-side block 236.

The operation of the wiper apparatus 210 configured in the above manner will then be described in detail with reference to the to drawings.

[Wiping Action Along Forward Path]

A wiping action along the forward path is an action such that the wiper blade 220 is moved upward from a lower return position up to an upper return position in the wiping range AR on the windshield 211, as shown in FIG. 32.

As shown in FIG. 32, when switching on the washer switch with the wiper blade 220 moved in the forward path direction, washer fluid "W" is jetted out of the forward-side first injection nozzle A1 to the forward-side fourth injection nozzle D1 (see FIG. 25). As a result, washer fluid "W" wets the injection-target locations A2 to D2. To respective areas between the injection-target locations A2 and B2, between the injection-target locations B2 and C2, and between the injection-target locations C2 and D2, a bit of washer fluid "W" is carried by the vehicle's aerodynamic drag and the like. This prevents a problem caused by the wiper blade 220 in contact with the windshield 211 in its dry state, that is, a problem of scratches on the windshield 211 or the partial wear of the blade rubber 221. Thus, the wind shield 211 is wetted with washer fluid "W", which allows foreign substance such as dust on the windshield 211 to be wiped out completely.

[Wiping Action Along Backward Path]

A wiping action along the backward path is an action such that the wiper blade 220 is moved downward from the upper return position up to the lower return position in the wiping range AR on the windshield 211, as shown in FIG. 32.

As shown in FIG. 32, when switching on the washer switch with the wiper blade 220 moved in the backward path direction, washer fluid "W" is jetted out of the backward-side first injection nozzle E1 to the backward-side fourth injection nozzle H1 (see FIG. 25). As a result, washer fluid "W" wets the injection-target locations E2 to H2. The injection-target locations E2 to H2 cover respective areas between the injection-target locations A2 and B2, between the injection-target locations B2 and C2, and between the injection-target locations C2 and D2, which are the areas not wetted sufficiently during the wiping action along the forward path. Hence, as shown in FIG. 32, the windshield 211 is uniformly wetted and wiped through one reciprocating stroke of the wiping action by the blade rubber 221 (wiper blade 220), which is therefore able to completely wipe off dust and the like from the windshield 211.

In addition, areas other than the injection-target locations E2 to H2 are wetted during the wiping action along the forward path and are further wetted with a bit of washer fluid "W" carried to the areas by the vehicle's aerodynamic draft, etc., during the wiping action along the backward path. As a result, a problem caused by the wiper blade 220 in contact with the windshield 211 in its dry state is prevented also during the wiping action along the backward path.

In this embodiment, as described in detail, since the nozzle unit 234 is provided with nozzles A1, D1, E1, and H1, and further provided with connection pipelines 239 extending in a direction intersecting with the inflow pipeline 238a, the front-end-side pipeline 238b, and the base-end-side pipeline 238c, and connecting the inflow pipeline 238a, front-end-side pipeline 238b, and the base-end-side pipeline 238c to each other, and with the nozzle caps 240 and 250 which block the openings 239a of the connection pipelines 239 and have a set of another nozzles B1 and C1 and a set of another nozzles F1 and G1, each nozzle jetting washer fluid "W", respectively. This allows each of the connection pipelines 239 to be molded easily, using a slide die, etc., into a simple and straight shape. The openings 239a of the connection pipelines 239 are then blocked with the nozzle caps 240 and 250 having the nozzles to form the nozzle unit 234. This process allows a reduction in the manufacturing cost of the nozzle unit 234. Nozzle caps of different specification may be readily applied to nozzle units of various specification.

According to the nozzle unit 234 of this embodiment, the forward-side nozzle cap 240 and the backward-side nozzle cap 250 are disposed on the forward side and the backward side in the wiping direction of the wiper blade 220, respectively, such that the forward-side nozzle cap 240 and the backward-side nozzle cap 250 are shifted in position to each other in the longitudinal direction of the wiper blade 220. As a result, as indicated by the oblique line areas of FIG. 32, the surface of the windshield 211 can be wetted with a small amount of washer fluid "W", which realizes significant economization in water consumption.

Next, the fifth embodiment of the present invention will be described in detail with reference to the drawings, members and portions the same in function as those of the fourth embodiment are denoted by the same reference numbers, and the detail descriptions thereof are omitted in this embodiment.

FIG. 33 is a view of a nozzle unit according to the fifth embodiment, the view corresponding to FIG. 29.

As shown in FIG. 33, the fifth embodiment is different from the fourth embodiment in that the structure (specification) of a forward-side nozzle cap (cover) 260 and a backward-side nozzle cap (cover) 270, which forms part of the nozzle unit 234 of the fifth embodiment, is different from the structure (specification) of the forward-side nozzle cap and the backward-side nozzle cap of the fourth embodiment. The fifth embodiment is also different from the fourth embodiment in that the washer fluid pipeline PL of the forward-side block 235 and the washer fluid pipeline PL of the backward-side block 236 are the same in shape as each other, and are set mirror symmetric (not shown) with respect to the screw insertion hole "P".

Specifically, different from the forward-side nozzle cap 240 of the fourth embodiment (see FIG. 30), the forward-side nozzle cap 260 of the fifth embodiment has no forward-side third injection nozzle C1. Likewise, different from the backward-side nozzle cap 250 of the fourth embodiment (see FIG. 30), the backward-side nozzle cap 270 of the fifth embodiment has no backward-side second injection nozzle F1. The forward-side nozzle cap 260 and the backward-side nozzle cap 270 are respectively located on a portion of forward-side counter surface 235e which are closer to the forward-side first wall 235a and a portion of backward-side counter surface 236e which is closer to the backward-side first wall 236a. As a result, the forward-side second injection nozzle B1 and the backward-side third injection nozzle G1 are arranged such that they are shifted to each other in the longitudinal direction of the wiper blade 220 by a predetermined distance L2.

The fifth embodiment achieving the above configuration offers substantially the same effect as the effect offered by the fourth embodiment. In addition, according to the fifth embodiment, the washer fluid pipeline PL of the forward-side block 235 and the washer fluid pipeline PL of the backward-side block 236 are the same in shape as each other, and are set mirror symmetric with respect to the screw insertion hole "P". This allows simplification of a die used for molding the nozzle unit 234, thus allows a further reduction of manufacturing costs.

The present invention is not limited to the above embodiments and may obviously be modified into various forms of applications on the condition that the modification does not deviate from the substance of the invention. For example, according to the above embodiments, the forward-side nozzle cap and the backward-side nozzle cap are the same in shape as each other. The nozzle cap arrangement of the present invention, however, is not limited to this case. For example, depending on the specification of the nozzle unit, the forward-side nozzle cap and the backward-side nozzle cap may be made different in shape from each other such that the forward-side nozzle cap have a greater number of nozzles while the backward-side nozzle cap have a fewer number of nozzles. In this case, the components of the nozzle unit other than their nozzle caps can be provided as common components. This prevents an increase in the manufacturing costs.

According to the above embodiments, the forward-side arm 235c and the backward-side arm 236c, which form part of the nozzle unit 234, have the same length and the same inclination angle against the windshield 211. The present invention, however, is not limited to this case. For example, depending on the specification of the nozzle unit, the backward-side arm 236c may be made shorter than the forward-side arm 235c, or the inclination angle of backward-side arm 236c may be determined to be larger than that of the forward-side arm 235c.

The wiper apparatus 210 which wipes the windshield 211 disposed on the front side of the vehicle, the wiper apparatus 210 having the nozzle unit 234 incorporated therein, is described in the above embodiment. The present invention applies not only to the wiper apparatus 210 but also to a wiper apparatus which wipes a rear window disposed on the rear side of the vehicle. The invention applies not only to a wiper apparatus incorporated in a vehicle such as automotive vehicle, but also to a wiper apparatus incorporated in rail vehicle, airplane, ship, etc.

The wiper apparatus and the nozzle unit are incorporated in vehicles, such as cars, where the wiper apparatus and the nozzle are used to wipe off rainwater, dust, etc., from the windshield to ensure a clear field of view.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A wiper apparatus comprising:
a wiper blade for wiping a windshield;

a connecting portion disposed on the wiper blade;
an arm piece having a front end side fitted to the connecting portion;
a retainer fixed to a base end side of the arm piece; and
a nozzle unit fixed to the arm piece, the nozzle unit jetting washer fluid toward the windshield wherein
the nozzle unit includes a forward-side block and a backward-side block,
the forward-side block has a forward-side nozzle cap;
the backward-side block has a backward-side nozzle cap;
the forward-side nozzle cap and the backward-side nozzle cap are the same in structure as each other, and
the forward-side nozzle cap and the backward-side nozzle are different in position from each other in a longitudinal direction of the wiper blade, the forward-side nozzle cap has two or more injection nozzles corresponding to first injection-target locations on the windshield, and configured to jet washer fluid toward the first injection-target locations, respectively,
the backward-side nozzle cap has two or more injection nozzles corresponding to second injection-target locations on the windshield, and configured to jet washer fluid toward the second injection-target locations, respectively,
the first injection-target locations and the second injection-target locations are alternately arranged on the windshield in the longitudinal direction of the wiper blade.

2. The wiper apparatus according to claim 1, wherein the arm piece and the nozzle unit is partially covered with the retainer.

3. The wiper apparatus according to claim 1, wherein an injection-target location of washer fluid jetted from the forward-side nozzle and an injection-target location of washer fluid jetted from the backward-side nozzle are shifted to each other in the longitudinal direction of the wiper blade.

4. The wiper apparatus according to claim 3, wherein a concave portion in which the arm piece is fitted is formed between the forward-side nozzle and the backward-side nozzle of the nozzle unit.

5. The wiper apparatus according to claim 1, wherein a variable nozzle capable of varying an injection-target location of washer fluid is formed on a front end side of the nozzle unit and on a base end side of the nozzle unit in the longitudinal direction of the wiper blade.

* * * * *